(12) United States Patent
Takahashi et al.

(10) Patent No.: US 6,442,111 B1
(45) Date of Patent: Aug. 27, 2002

(54) TRACK JUMP APPARATUS

(75) Inventors: Kazuo Takahashi; Kiyoshi Tateishi, both of Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/428,943

(22) Filed: Oct. 28, 1999

(30) Foreign Application Priority Data

Oct. 29, 1998 (JP) .......................................... 10-308081

(51) Int. Cl.[7] ................................................ G11B 7/00
(52) U.S. Cl. ................................... 369/44.28; 369/53.3
(58) Field of Search ........................... 369/44.25, 44.27, 369/44.28, 44.29, 44.34, 44.35, 47.38, 47.39, 47.4, 47.45, 53.28, 53.3, 47.55, 53.37, 53.45, 53.43; 360/78.04, 78.06

(56) References Cited

U.S. PATENT DOCUMENTS 5,602,689 A * 2/1997 Kadlec et al. ............ 369/44.28
6,181,651 B1 * 1/2001 Kishimoto et al. ....... 369/44.28

FOREIGN PATENT DOCUMENTS

JP          09167357        6/1997

* cited by examiner

Primary Examiner—Paul W. Huber
(74) Attorney, Agent, or Firm—Morgan, Lewis & Bockius LLP

(57) ABSTRACT

A track jump apparatus for making an actuator jump in order to move a spot position of a laser beam emitted through an objective lens of the actuator from a current position to an object position corresponding to a desired recording track on a recording medium. The track jump apparatus includes: an actuator driving device that moves the actuator in accordance with a driving signal; a tracking error signal detecting device that detects a tracking error signal on the basis of a change of return light from the recording medium caused by a change of the spot position of the laser beam relative to the recording track; a feed-forward control device that applies an acceleration pulse and a deceleration pulse to the actuator driving device; and a position control device that controls a position of the actuator using a feedback of the driving signal so as to reduce a difference between an object value and the tracking error signal detected by the tracking error signal detecting device, when making the actuator jump in order to move the spot position of the laser beam from the current position to the object position. The feed-forward control device sets a constant speed period during which neither of the acceleration pulse and the deceleration pulse is applied to the actuator driving device between an acceleration period during which the acceleration pulse is applied to the actuator driving device and a deceleration period during which the deceleration pulse is applied to the actuator driving device.

37 Claims, 52 Drawing Sheets

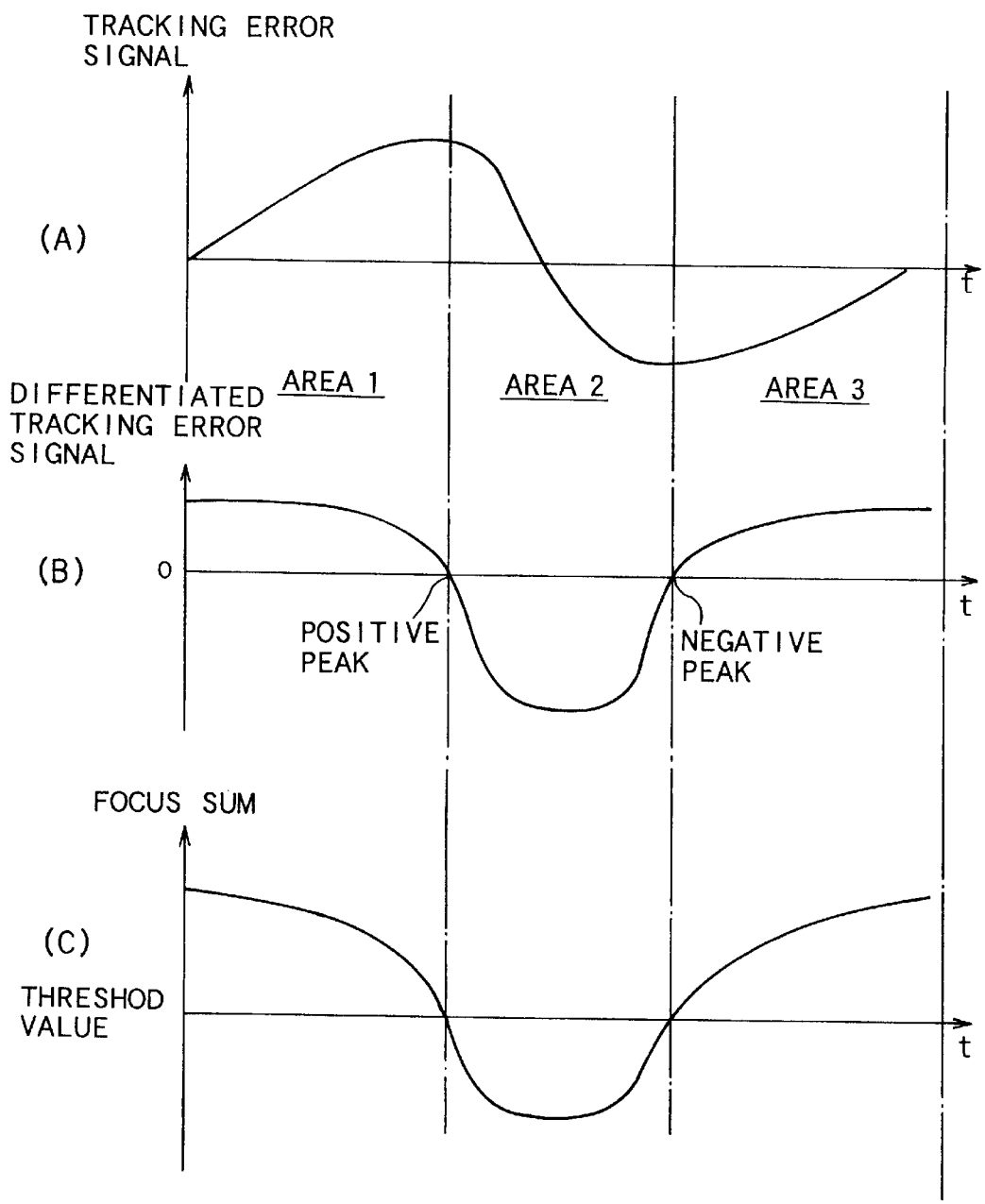

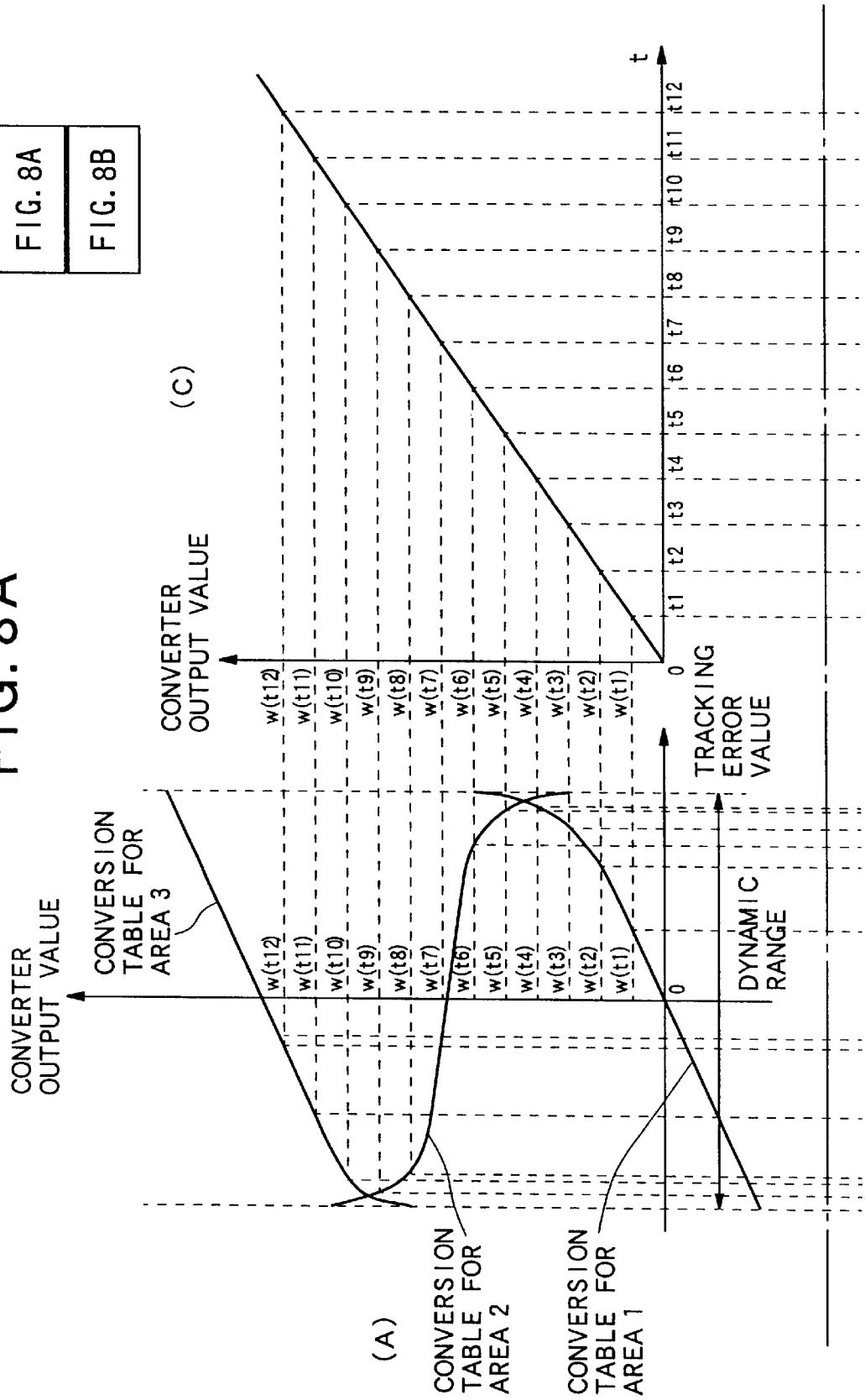

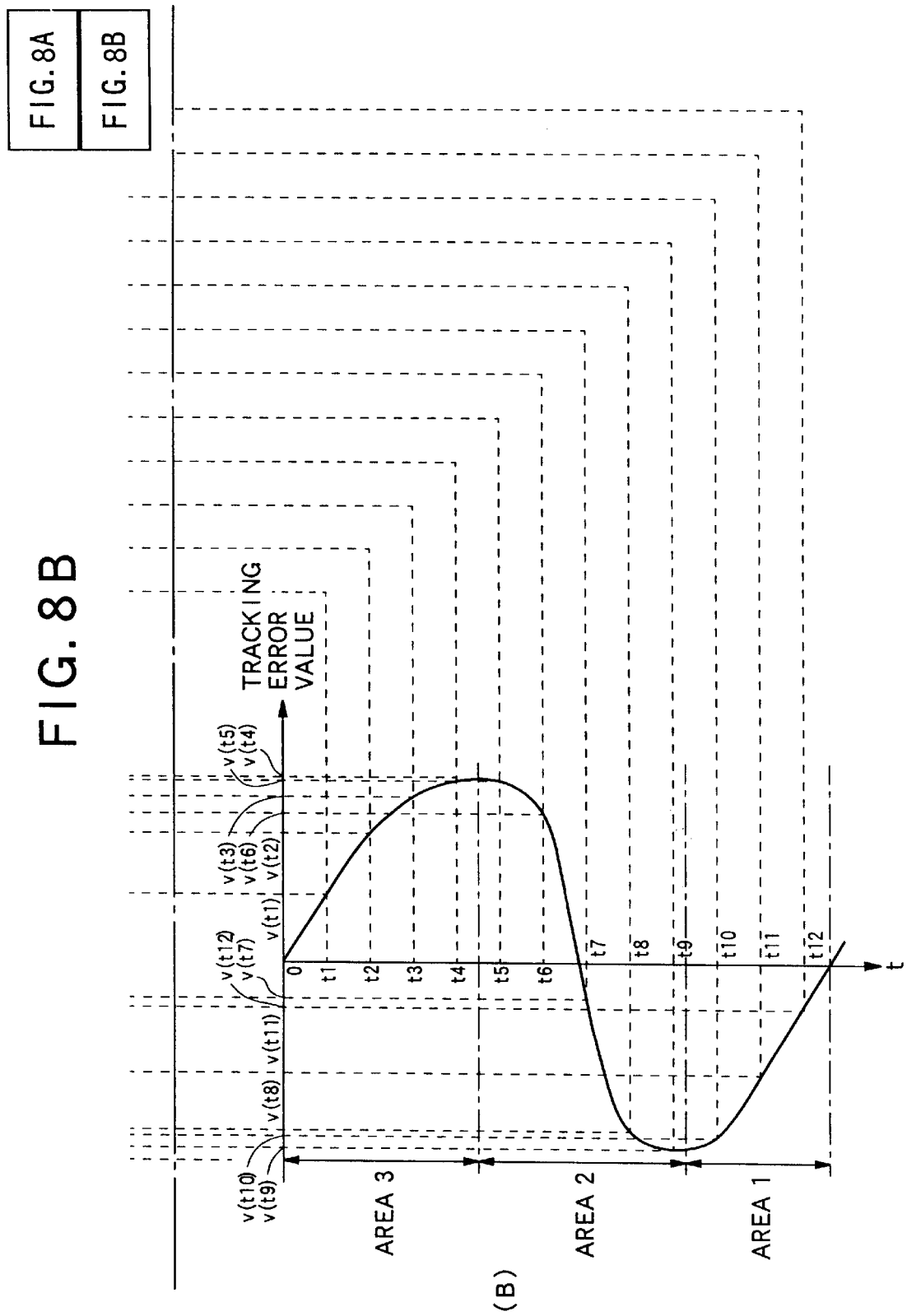

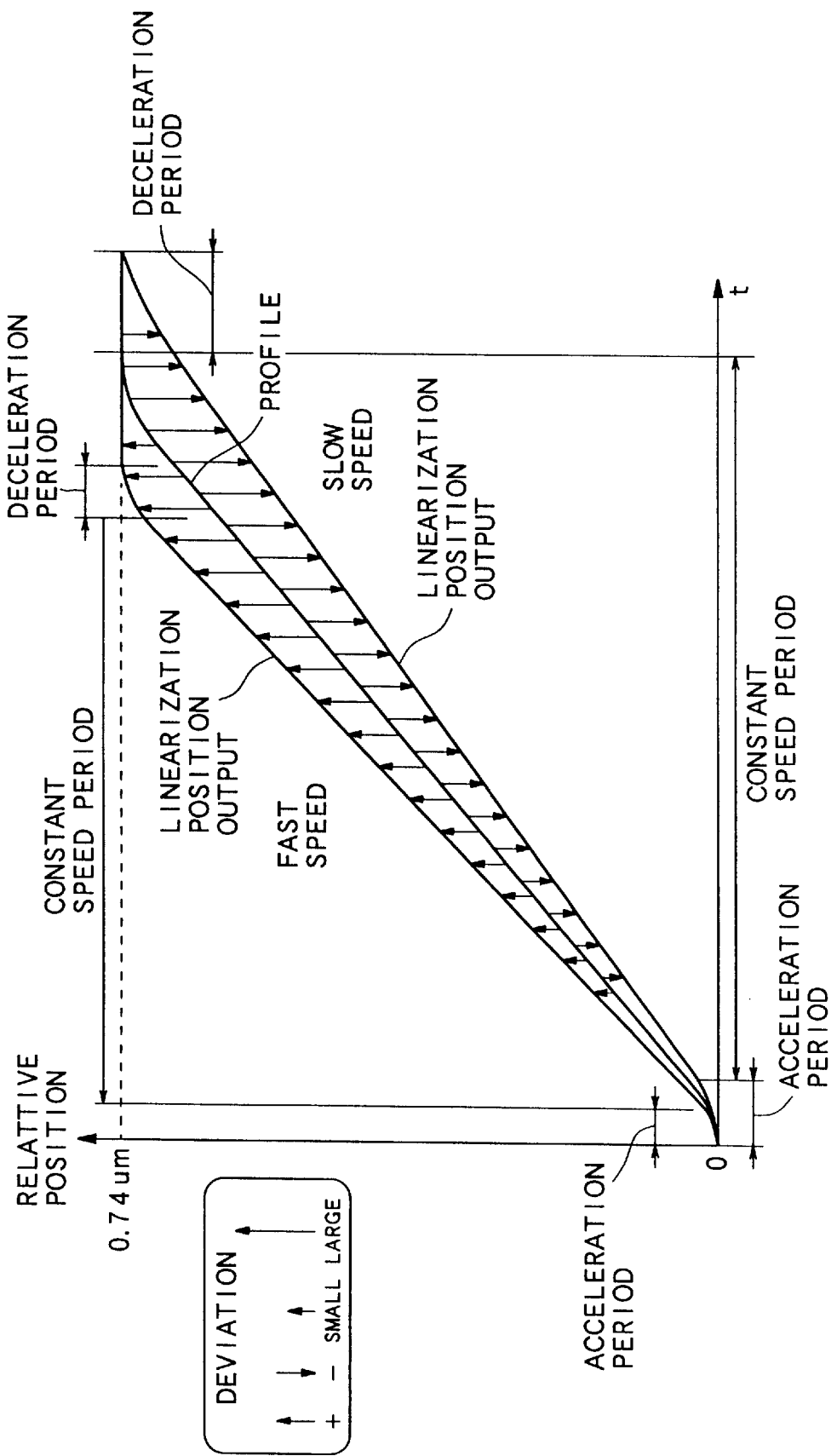

FIG. 11
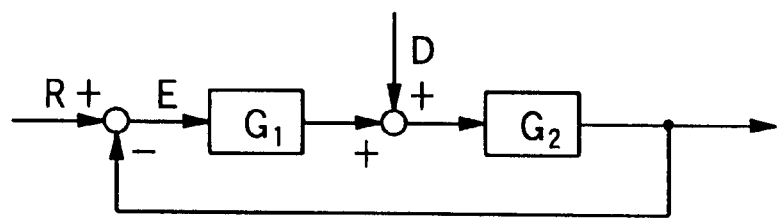
(A)
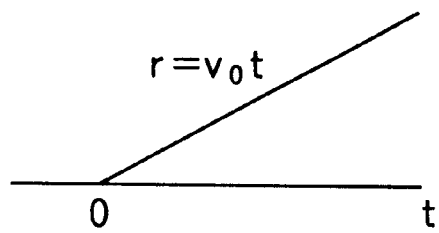
(B)
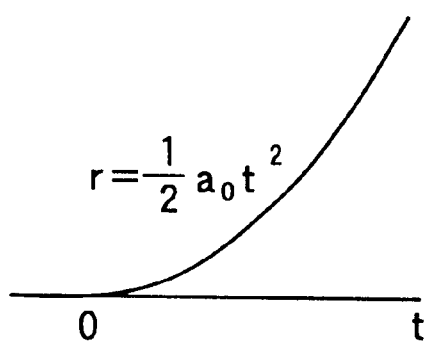
(C)

PROFILE WHICH DECELERATES GRADUALLY (A) POSITION  (B) SPEED  (C) DRIVE INPUT

PROFILE WHICH ACCELERATES GRADUALLY (A) POSITION  (B) SPEED  (C) DRIVE INPUT

PROFILE WHICH ACCELERATION AND DECELERATION ARE REPEATED (A) POSITION  (B) SPEED  (C) DRIVE INPUT

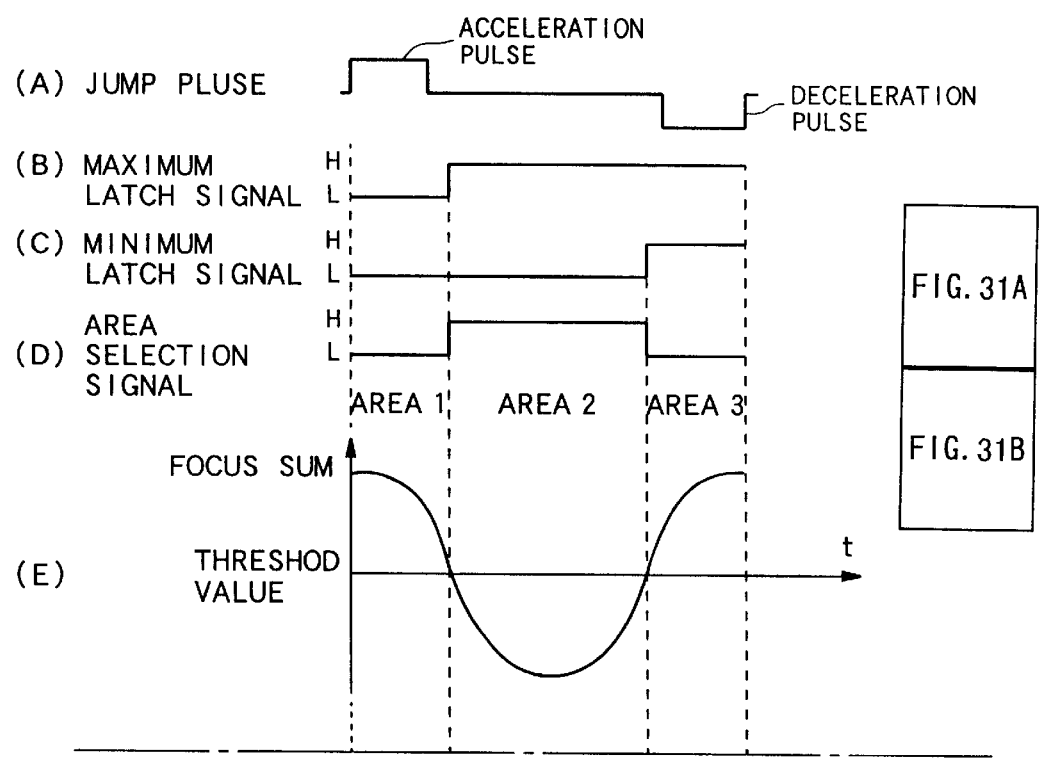

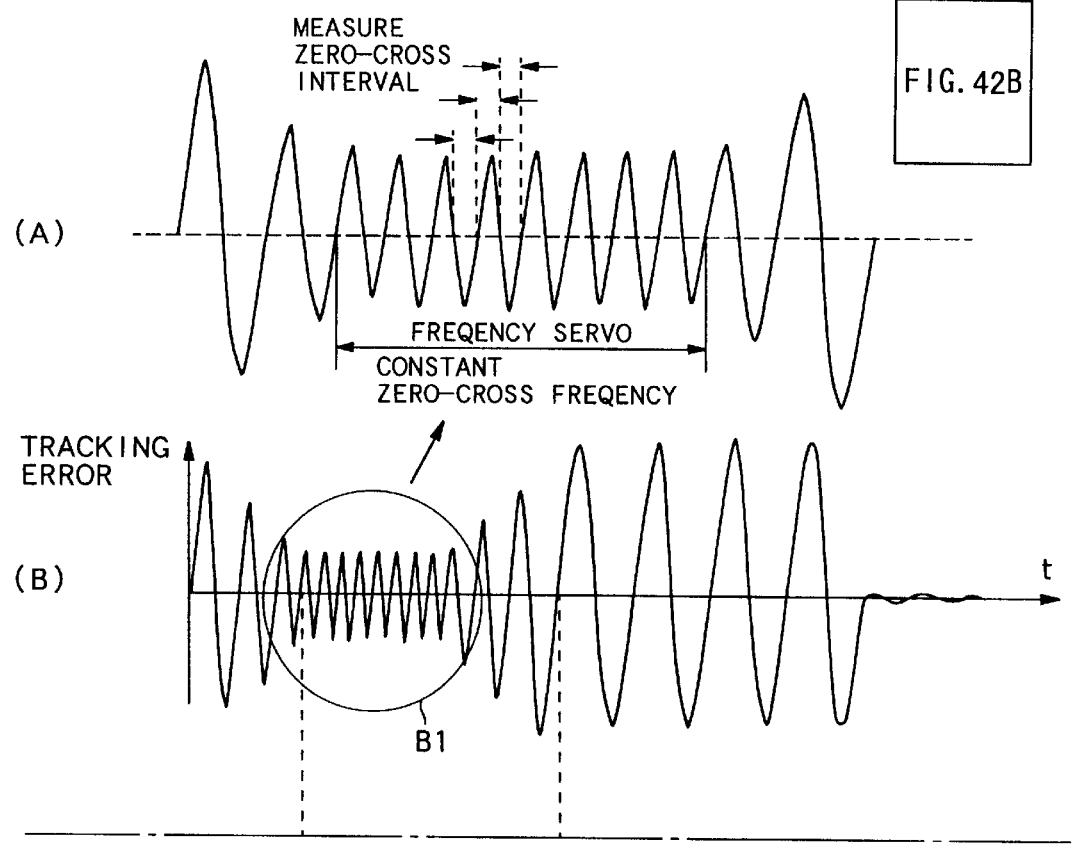

TRACK JUMP APPARATUS

BACKGROUND OF THE INVENTION

1. Field of the Invention

The present invention relates to a track jump apparatus for jumping a position of an actuator to a position corresponding to a target recording track so as to irradiate the target recording track with a laser beam spot to be irradiated to a predetermined recording track on a recording medium via an objective lens of the actuator, the track jump apparatus being used in an information reproducing apparatus, information recording apparatus or information recording/reproducing apparatus using a recording medium such as an optical disk.

2. Description of the Related Art

Conventionally, feed-forward type open control method has been employed for control on track jump in a compact disk (CD) player and the like, in which acceleration pulse of a predetermined amount is applied to an actuator drive at the same time when a jump start instruction is dispatched and deceleration pulse of a predetermined amount is applied to that drive at a desired timing.

However, with current increased density of an optical disk like DVD, as the track pitch is narrowed, the following problem occurs in an open control of a conventional feed forward method. First, because blind zone and a delay of reaction time exist in the driving system and detecting system of the tracking servo, even if a deceleration pulse is applied, sometimes actual driving is delayed or detection of deceleration and servo close timing is delayed. If a sufficient jump time is secured like a case of CD or a so-called capture range which is a range capable of obtaining an effective tracking error signal at the time of lead-in after a servo close is wide, the delay of the driving system or detecting system does not affect stabilization of the tracking servo largely.

However, if the same amount of pulse is used for the acceleration pulse and deceleration pulse like the conventional track jump in case of a narrow track pitch, the jump time decreases. Thus, the aforementioned blind zone and a rate of the delay with respect to the jump time increase so that stabilization of the tracking servo is largely affected. If the track pitch is narrow, the aforementioned capture range is also narrow. As a result, the frequency of overshoot caused at the servo close increases so that it is out of the servo band. Thus, no braking is applied so that the jump fails or it takes long until stabilization is accomplished.

As a method for preventing such a unstable condition of the track jump, a method in which the same amount of pulse is not used for the acceleration pulse and deceleration pulse but after a predetermined amount of the acceleration pulse is applied, an interval between a jump start and zero cross of the tracking error is measured and then the amount of the deceleration pulse is adjusted based on a deviation between a measured zero cross interval and an appropriate zero cross interval, has been proposed.

To measure the zero cross point accurately, some extent of measuring time is required. If the same amount of the acceleration pulse and deceleration pulse is applied when the track pitch is narrow, the jump time becomes shorter than the conventional case, so that a necessary measuring time cannot be obtained. Therefore, the accuracy of the measured zero cross point deteriorates so that a deceleration pulse calculated from the zero cross interval based on this zero cross point becomes not appropriate, thereby further disturbing stabilization of the tracking servo.

Recently, a servo system for digital processing with digital signal processor (DSP) has been developed. In this system, the tracking error signal is sampled upon a track jump and then the output timing of the deceleration pulse and close timing of the tracking servo are determined based on the sampled value, so that a delay of a timing of one sampling at the maximum occurs.

Therefore, if the track pitch is decreased, the jump time becomes shorter, so that the delay of the timing of one sampling affects largely, thereby not only making a unstable jump but also the jump operation not functioning properly sometimes leading to a jump failure.

On the other hand, to prevent an occurrence of a problem due to shortening of the jump time as described above, a method for reducing the acceleration/deceleration amounts can be considered. However, generally if the acceleration pulse and deceleration pulse are decreased, relatively an influence of a disturbance increases. The disturbance is caused by a deflection, a change of slider state, shock or the like and a size of an estimated disturbance is almost determined. Because the track jump method is carried out by open control as described above, basically this is weak against the disturbance. Therefore, even if the acceleration/deceleration amount is decreased in the conventional track jump method, the influence of the disturbance is so strong that the track jump cannot be stabilized.

Thus, a method in which feed back control is carried out even during a track jump by feed forward control to achieve a stabilized jump with some extent of jump time secured has been proposed (Japanese Patent Application Laid-Open No. HEI 9-167357). According to this method, even if the disturbance such as a deflection of disk occurs, a stabilized tracking servo lead-in is possible after the track jump ends.

However, although according to the method disclosed in the aforementioned Patent Application, a trajectory of a beam position at a jump time needs to be provided as an object value for feed back control, because feed forward control of applying a deceleration pulse just after the acceleration pulse ends is carried out, the trajectory of the aforementioned beam position becomes a shape like quadratic curves are combined. As a result, because the object value itself is high in view of band, an effect of the feed back control cannot be expected so high. That is, because according to this method, the constant deviation is relatively large, it is difficult to stabilize the tracking servo in a short time.

SUMMARY OF THE INVENTION

Accordingly, the present invention has been achieved in views of these problems, and therefore, it is an object of the invention to provide a track jump apparatus capable of achieving a stabilized track jump with some extent of jump time secured even if the track pitch is narrow and further stabilizing the tracking servo in a short time.

A track jump apparatus in accordance with the present invention is an apparatus for making an actuator jump in order to move a spot position of a laser beam emitted through an objective lens of the actuator from a current position to an object position corresponding to a desired recording track on a recording medium. The track jump apparatus includes: an actuator driving device that moves the actuator in accordance with a driving signal; a tracking error signal detecting device that detects a tracking error signal on the basis of a change of return light from the recording medium caused by a change of the spot position of the laser beam relative to the recording track; a feedforward control device that applies an acceleration pulse and a deceleration pulse to the actuator driving device; and a position control device that controls a position of the actuator using a feedback of the driving signal so as to reduce a difference between an object value and the tracking error signal detected by the tracking error signal detecting device, when making the actuator jump in order to move the spot position of the laser beam from the current position to the object position. The feed-forward control device sets a constant speed period during which neither of the acceleration pulse and the deceleration pulse is applied to the actuator driving device between an acceleration period during which the acceleration pulse is applied to the actuator driving device and a deceleration period during which the deceleration pulse is applied to the actuator driving device.

In the track jump apparatus in accordance with the present invention, when receiving an instruction of the track jump, the feed-forward control device applies the acceleration pulse to the actuator driving device. By driving the actuator driving device according to the acceleration pulse, the spot position of the laser beam is moved, thereby changing the spot position relative to the recording track. As the spot position relative to the recording track is changed, the return light obtained from the recording medium is also changed. The changes of the return light are detected as the tracking error signal by the tracking error signal detecting device. The position control device compares the tracking error signal with the object value, and controls the position of the actuator using the feedback of the driving signal so as to reduce a difference between the tracking error signal and the object value.

After applying the acceleration pulse to the actuator driving device, the feed-forward control device stops applying the acceleration pulse, and maintains the non-pulse state that neither of the acceleration pulse and the deceleration pulse is applied to the actuator driving device during a predetermined period. This period is the constant speed period. If the feedback control is carried out by the position control device within the constant speed period, the frequency band in the feedback control is substantially lowered, so that the stable servo loop is formed. As a result, the position of the actuator can be moved to the object position in a stable manner.

When decelerating the actuator, the feed-forward control device applies the deceleration pulse to the actuator driving device. As a result, the actuator reaches the object position, so that the spot position of the laser light accurately matches the object position.

Thus, appropriate feedback control about the position of the actuator is carried out, so that with some extent of jump time secured even for a disk having a narrow pitch, accurate, stabilized track jump can be achieved.

In the aforementioned track jump apparatus in accordance with the present invention, to obtain the effect of the feedback control more efficiently, the constant speed period may be longer than the acceleration period and may be longer than the deceleration period.

In the aforementioned track jump apparatus in accordance with the present invention, the feed-forward control device may execute application of the acceleration pulse, and then execute a non-pulse operation that application of the acceleration pulse and application of the deceleration pulse are suspended during a predetermined period, and then execute application of the deceleration pulse. Thus, by performing the non-pulse operation between the application of the acceleration pulse and the application of the deceleration pulse, the effect of the feedback control can be obtained more efficiently even if the pitch between the recording tracks is small.

In the aforementioned track jump apparatus in accordance with the present invention, the feed-forward control device may execute application of the acceleration pulse, and then execute a non-pulse operation that application of the acceleration pulse and application of the deceleration pulse are suspended during a predetermined period, and then execute application of the deceleration pulse, and then alternately repeat the non-pulse operation and the application of the deceleration pulse in this order. Thus, since the deceleration pulse is intermittently applied, the speed of the movement of the actuator is gradually reduced after the actuator is quickly moved near the object position, and finally, the actuator reaches the desired recording track accurately. As a result, the lead-in of the tracking servo can be ended in a short time.

In the aforementioned track jump apparatus in accordance with the present invention, the feed-forward control device may execute application of the acceleration pulse, and then execute a non-pulse operation that application of the acceleration pulse and application of the deceleration pulse are suspended during a predetermined period, and then alternately repeat application of the acceleration pulse and the non-pulse operation in this order, and then execute application of the deceleration pulse. Thus, since the acceleration pulse is intermittently applied, the speed of the movement of the actuator is gradually increased when the track jump is started, the influence of the eccentricity of the recording medium can be removed.

In the aforementioned track jump apparatus in accordance with the present invention, the feed-forward control device may has a plurality of application patterns of the acceleration pulse and a plurality of application patterns of the deceleration pulse, and select one of the plurality of application patterns of the acceleration pulse and one of the plurality of application patterns of the deceleration pulse depending on a distance that the actuator jumps. For example, if the distance between the current position and the object position is short, it is appropriate that the application of the acceleration pulse is carried out once, and next, the non-pulse operation is carried out once, and next, the application of the deceleration pulse is carried out once. On the other hand, if the distance between the current position and the object position is long, it is appropriate to carry out the intermittent application of the acceleration pulse or the intermittent application of the deceleration pulse. Thus, the appropriate application pattern is different depending on the distance between the current position and the object position. In consideration of this fact, the feed-forward control device may select one of the plurality of application patterns of the acceleration pulse and one of the plurality of application patterns of the deceleration pulse depending on the distance between the current position and the object position, namely, depending on the distance that the actuator jumps.

In the aforementioned track jump apparatus in accordance with the present invention, the feed-forward control device may include: a profile setting device that sets a profile which represents a change of a position of the actuator as time passes; and a feed-forward compensation device that includes a second order differentiator and that uses the profile set by the profile setting device as an internal object value. The profile includes a acceleration part representing the change of the position of the actuator when a movement of the actuator is accelerated, a constant speed part representing the change of the position of the actuator when a speed of the movement of the actuator is constant, and a deceleration part representing the change of the position of the actuator when the movement of the actuator is decelerated. The constant speed part is located between the acceleration part and the deceleration part. The feed-forward compensation device carries out a second order differential to the profile to apply the acceleration pulse and the deceleration pulse.

The profile setting device sets the profile. The profile is supplied to the feed-forward compensation device. The feed-forward compensation device then carries out the second order differential to the supplied profile. As a result, the feed-forward output is obtained from the feed-forward compensation device. Since the constant speed part is placed between the acceleration part and the deceleration part in the profile, the feed-forward output that the constant speed period is placed between the acceleration pulse and the deceleration pulse is obtained. Then, the feed-forward output is supplied to the actuator driving device. Thus, the feed-forward control and the feedback control is efficiently carried out, so that the accurate track jump can be carried out. Furthermore, since the waveform of the profile can be easily changed or easily replaced with another, the movement pattern of the actuator can be easily changed by changing or replacing the waveform of the profile.

To the aforementioned track jump apparatus in accordance with the present invention, a linearization conversion device that carries out a linearization conversion to the tracking error signal may be added. In this case, the position control device uses the profile as the object value, and controls the driving signal so as to reduce a difference between an output value obtained from the linearization conversion device and the object value.

The tracking error signal obtained from the tracking error signal detecting device is a non-linear signal. The linearization conversion device converts this non-linear tracking error signal into the linear tracking error signal. Then, the position control device uses the profile as the object value, and controls the driving signal so as to reduce a difference between the linear tracking error signal and the profile. The profile includes the constant speed part between the acceleration part and the deceleration part. Therefore, the feedback control is carried out on the basis of the comparison between the profile including the constant speed part and the linear tracking error signal. Accordingly, the substantial frequency band in the feedback control is lowered, so that the stable servo loop is formed. As a result, the position of the actuator matches the object position accurately after the track jump, and the lead-in of the tracking servo is ended in a short time.

To the aforementioned track jump apparatus in accordance with the present invention, a determining device that determines at least whether a value of the tracking error signal increases or decreases may be added. In this case, the linearization conversion device includes a first conversion table used when the value of the tracking error signal increases and a second conversion table used when the value of the tracking error signal decreases, and the linearization conversion device selects one of the first conversion table and the second conversion table depending on whether the tracking error signal increases or decreases. By selecting the conversion table depending on whether the non-linear tracking error signal increases or decreases, the appropriate conversion table can be used in the linearization conversion process. Therefore, the accurate linear tracking error signal can be generated.

To the aforementioned track jump apparatus in accordance with the present invention, a first determining device that determines at least whether a value of the tracking error signal increases or decreases may be added. In addition to this, a second determining device that determines a detection method of the tracking error signal may be added. In this case, the linearization conversion device includes a plurality of first conversion tables used when the value of the tracking error signal increases and a plurality of second conversion tables used when the value of the tracking error signal decreases, and the linearization conversion device selects a conversion table from among the plurality of first conversion tables and the plurality of second conversion tables depending on the detection method and depending on whether the tracking error signal increases or decreases. There is a case where the detection method of the tracking error signal differs depending on the type of the recording medium. In consideration of this fact, the second determining device determines the detection method, and the linearization conversion device selects the conversion table suitable for the detection method. Therefore, if the detection method of the tracking error signal differs, the non-linear tracking error signal can be always converted into the appropriate linear tracking error signal.

In the aforementioned track jump apparatus in accordance with the present invention, the determining device may further determine whether the value of the tracking error signal is a positive value or a negative value, when determining that the value of the tracking error signal increases. When the value of the tracking error signal increases, the information indicating whether the value of the tracking error signal is positive or negative is needed to efficiently carry out the linearization conversion. This determining device provides this information.

In the aforementioned track jump apparatus in accordance with the present invention, the determining device may detect a timing at which the value of the tracking error signal reaches a peak value of the tracking error signal, and determine on the basis of the detected timing whether the value of the tracking error signal increases or decreases. The direction of the change of the value of the tracking error signal changes from increase to decrease at the timing at which the value of the tracking error signal reaches its peak. Therefore, the determining device can easily determine on the basis of the detected timing whether the value of the tracking error signal increases or decreases.

In the aforementioned track jump apparatus in accordance with the present invention, the determining device may detect a total amount of the return light obtained from the recording medium, and determine on the basis of the detected total amount whether the value of the tracking error signal increases or decreases.

In the aforementioned track jump apparatus in accordance with the present invention, in a case where the recording track corresponding to the current position and the recording track corresponding to the object position are adjacent to each other, the profile including the acceleration part, the constant speed part and the deceleration part may be used. Since the constant speed part is placed between the acceleration part and the deceleration part, the substantial frequency band in the feedback control can be lowered, so that the effective feedback control can be carried out within the constant speed period. Accordingly, the stability and accuracy of the movement of the actuator is increased.

In the aforementioned track jump apparatus in accordance with the present invention, in a case where there is one or more than one recording track between the recording track corresponding to the current position and the recording track corresponding to the object position, the profile including the acceleration part, the constant speed part and the deceleration part may be used, and the object value and the output value obtained from the linearization conversion device may be replaced with initial values at a timing that the spot position of the laser beam matches an on-track position of the recording track when the spot position traverses the recording track. In addition, the initial values are values used as the object value and the output value when the actuator starts to jump.

In the waveform of the tracking error signal, the zero cross point appears each time the spot position coincides with the on-track position of the recording track when the spot position traverses the recording track. In consideration of this fact, the object value and the linear tracking error signal are replaced with their initial values at the timing that the spot position of the laser beam matches the on-track position of the recording track. In the case where the profile is used as the object value, the profile is created in such a way that the object value is initialized at the timing that the spot position matches the on-track position. Since the initialization of the object value and the linear tracking error signal is repeated during the track jump, the similar operation to the repetition of the single track jump is performed during the long track jump. Therefore, the effective feedback control is repeatedly carried out, so that the stability and accuracy of the track jump can be increased.

In order to improve the stability and accuracy of the track jump, it is preferable that the object value and the output value are replaced with the initial values each time the spot position of the laser beam traverses the recording track. Alternatively, the object value and the output value may be replaced with the initial values when the spot position of the laser beam traverses a predetermined number of the recording tracks. In this case, the track jump period can be shortened.

Furthermore, the object value and the linear tracking error signal may be replaced with the initial values at the timing that the spot position of the laser beam matches the middle position of the recording tracks adjacent to each other.

To the aforementioned track jump apparatus in accordance with the present invention, a speed control device that controls a speed of a movement of the actuator using the feedback of the driving signal so as to reduce a difference between a zero cross frequency of the tracking error signal and an object frequency may be added. By reducing the difference between the zero cross frequency of the tracking error signal and the object frequency, the track jump period can be shortened. By the combination of the speed control device and the position control device, the stability and accuracy of the track jump can be increased and the quick track jump can be achieved.

To achieve the stabile, accurate and quick track jump, a balance of the control of the speed control device and the control of the position control device is important. To balance the two controls, it is determined whether or not the control of the speed control device is carried out, depending on the number of the recording tracks between the recording track corresponding to the current position and the recording track corresponding to the object position. For example, when a number of the recording tracks between the recording track corresponding to the current position and the recording track corresponding to the object position is not greater than a predetermined number, only the control of the position of the actuator with the position control device is carried out. When the number of the recording tracks between the recording track corresponding to the current position and the recording track corresponding to the object position is greater than the predetermined number, both the control of the speed of the movement of the actuator with the speed control device and the control of the position of the actuator with the position control device are carried out.

Moreover, in order to achieve the quick track jump, it is preferable to make the speed of the movement of the actuator when the control of the speed control device is carried out faster the speed of the movement of the actuator when a control of the position control device is carried out.

Moreover, in order to achieve the stable, accurate and quick track jump, the control of the speed of the movement of the actuator with the speed control device may be carried out during the constant speed period, and the control of the position of the actuator with the position control device may be carried out during the deceleration period or until the spot position of the laser beam matches the on-track position corresponding to the object position after the deceleration of the movement of the actuator is finished.

To the aforementioned track jump apparatus in accordance with the present invention, a tracking servo control device that controls the position of the actuator using the feedback of the driving signal so as to set a value of the tracking error signal at zero after a jump of the actuator is finished may be added. And, the speed control device may include a first phase compensation device, the position control device may include a second phase compensation device, and the tracking servo control device may include a third phase compensation device.

The tracking servo control device controls the position of the actuator so as to set the value of the tracking error signal at zero after the jump of the actuator is finished. Furthermore, each of the speed control device, the position control device and the tracking servo control device includes a phase compensation device suitable for the property of each control device. Therefore, the controls of the respective control devices are appropriately carried out in different frequency bands.

In the aforementioned track jump apparatus in accordance with the present invention, the second phase compensation device may receive an integration term of the first phase compensation device when shifting from a control of the speed control device to a control of the position control device, and the third phase compensation device may receive an integration term of the second phase compensation device when shifting from the control of the position control device to a control of the tracking servo control device. Thus, if the actuator that jumps under the influence of an inertial system is affected by a spring system when the actuator reaches the object position, the spot position of the laser beam is quickly positioned on the object position, because it is possible to reduce low frequency components of the integration term by providing the integration term of the low frequency components from the former control device to the later control device.

Moreover, in the aforementioned track jump apparatus in accordance with the present invention, the position control device may receive an integration term of a drive amount from the speed control device when shifting from a control of the speed control device to a control of the position control device, and the tracking servo control device may receive the integration term of the drive amount from the position control device when shifting from the control of the position control device to a control of the tracking servo control device. Thus, if the actuator that jumps under the influence of an inertial system is affected by a spring system when the actuator reaches the object position, the spot position of the laser beam is quickly positioned on the object position, because it is possible to control in accordance with the drive amount so as to remove the influence of the spring system by providing the integration term of the drive amount from the former control device to the later control device.

In the aforementioned track jump apparatus in accordance with the present invention, the position control device may receive information representing a number of the recording tracks that the actuator jumps from the speed control device when shifting from a control of the speed control device to a control of the position control device, and the tracking servo control device may receive the information representing the number of the recording tracks that the actuator jumps from the position control device when shifting from the control of the position control device to a control of the tracking servo control device. The displacement of the actuator can be determined on the basis of the information representing the number of the recording tracks that the actuator jumps. Thus, if the actuator that jumps under the influence of an inertial system is affected by a spring system when the actuator reaches the object position, the spot position of the laser beam is quickly positioned on the object position, because it is possible to reduce the displacement amount of the actuator by providing the information representing the number of the recording tracks that the actuator jumps from the former control device to the later control device.

In the aforementioned track jump apparatus in accordance with the present invention, in a case where a control of the speed control device, a control of the position control device and a control of the tracking servo control device are sequentially carried out, an integration term used in a previous control or an integrated drive amount is added as an offset in a feed-forward manner during the control of the position control device or during an open control period during which acceleration or deceleration of a movement of the actuator is executed under a feed-forward control. Thus, if the actuator that jumps under the influence of an inertial system is affected by a spring system when the actuator reaches the object position, the spot position of the laser beam is quickly positioned on the object position, because it is possible to control so as to remove the influence of the spring system by the feed-forward addition of the drive amount.

In the aforementioned track jump apparatus in accordance with the present invention, in a case where the recording medium has a land track and a groove track and information is recorded onto the land track and the groove track, the position control device uses a half wave of the tracking error signal to move the spot position of the laser beam from the land track to the groove track or from the groove track to the land track. Thus, the accurate track jump can be achieved with respect to the recording medium that information is recorded onto both the land track and the groove track.

To reduce the influence of the eccentricity of the recording medium more efficiently, a gain control device that adjusts a gain of the tracking error signal and an offset control device that adjusts an offset of the tracking error signal may be added to the aforementioned track jump apparatus in accordance with the present invention.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 are diagrams showing (A) a tracking error signal to be detected by the track jump apparatus of FIG. 1, (B) a diagram showing a relation between a differential waveform of the tracking error signal and an area, and (C) a diagram showing a relation between focus sum and an area;

FIG. 8(A) is a diagram showing the table of FIG. 6 and FIG. 8(B) is a diagram showing a tracking signal to be inputted into the linearization converter;

FIG. 9 is a diagram showing a deviation between linearization position output in case where a speed relative to a reference position is fast and a case where the speed is slow;

FIG. 11 are diagrams showing (A) a model of direct connection feed back system, (B) a diagram for explaining constant speed input to be inputted to the feed back system, and (C) a diagram for explaining a constant speed input to be inputted to the feed back system;

FIG. 42B illustrates (C) a waveform diagram of a feed forward output, (D) a waveform diagram of a speed change, (E) a waveform diagram of a beam position and (F) a waveform diagram of the reference position;

DETAILED DESCRIPTION OF THE PREFERRED EMBODIMENTS

Hereinafter, the embodiments of the present invention will be described with reference to the accompanying drawings.

(First Embodiment)

The first embodiment of the present invention will be described with reference to FIGS. 1–31.

Figure 1:
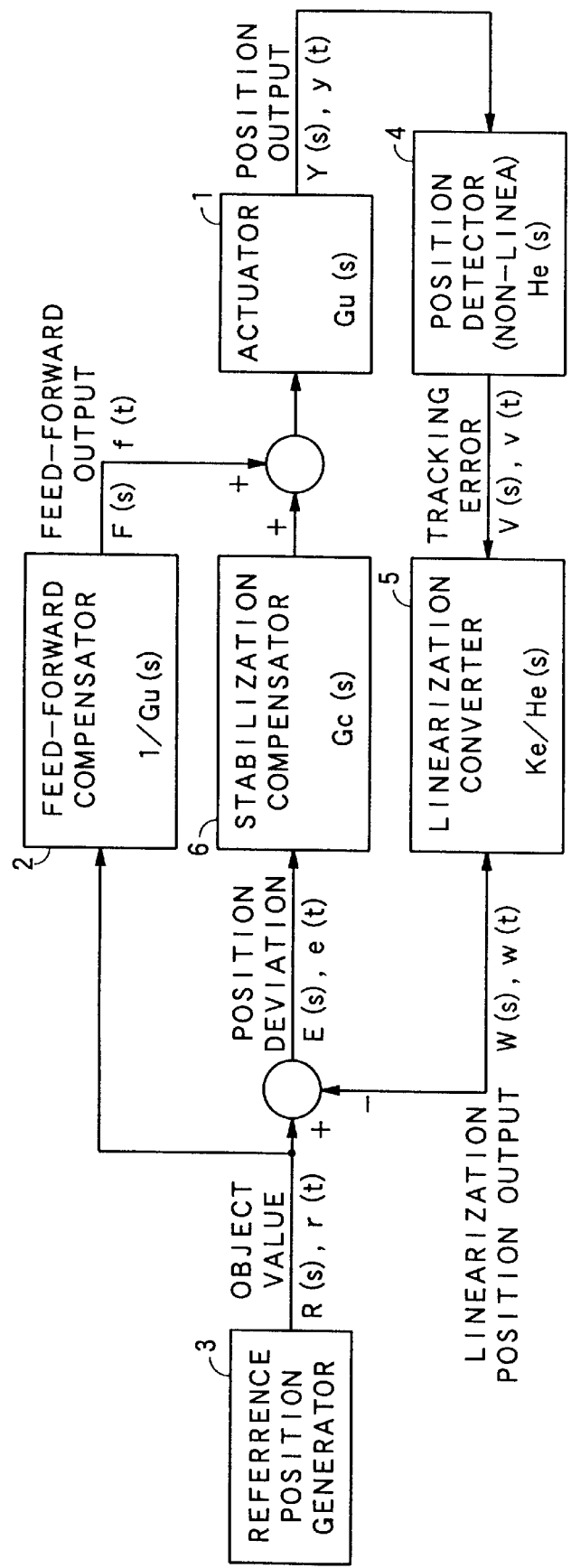
FIG. 1 is a block diagram showing a structure of a track jump apparatus according to a first embodiment of the present invention.

FIG. 1 is a block diagram showing a structure of a track jump apparatus of this embodiment. The track jump apparatus of this embodiment is used in a DVD reproducing apparatus whose track pitch is 0.74 μm, half or less than that of compact disk (CD). The track jump methods include single track jump in which the jump is carried out to a next track adjacent to a current track as an object track and multi-track jump in which the jump is carried out to a track apart from the current track by plural tracks as an object track. In this embodiment, particularly a case in which the single track jump is carried out will be described.

The track jump apparatus shown in FIG. 1 comprises an actuator 1 which is an object of control, a feed-forward compensator 2 for supplying a feed-forward output to the actuator as an operating amount, a reference position generator 3 for supplying the object value, a position detector 4 for detecting a position output indicating a behavior of the actuator 1 as a control amount, a linearization converter 5 for linearization-converting a tracking error outputted from the position detector 4 and feeding it back as a linearization position output, and a stabilization compensator 6 for supplying a drive signal as an operating amount for matching the behavior of the actuator 1 with the object value based on a deviation of position which occurs between the object value supplied from the reference position generator 3 and the fed-back linearization position output. The respective components will be described in detail.

[1] Actuator

Figure 2:
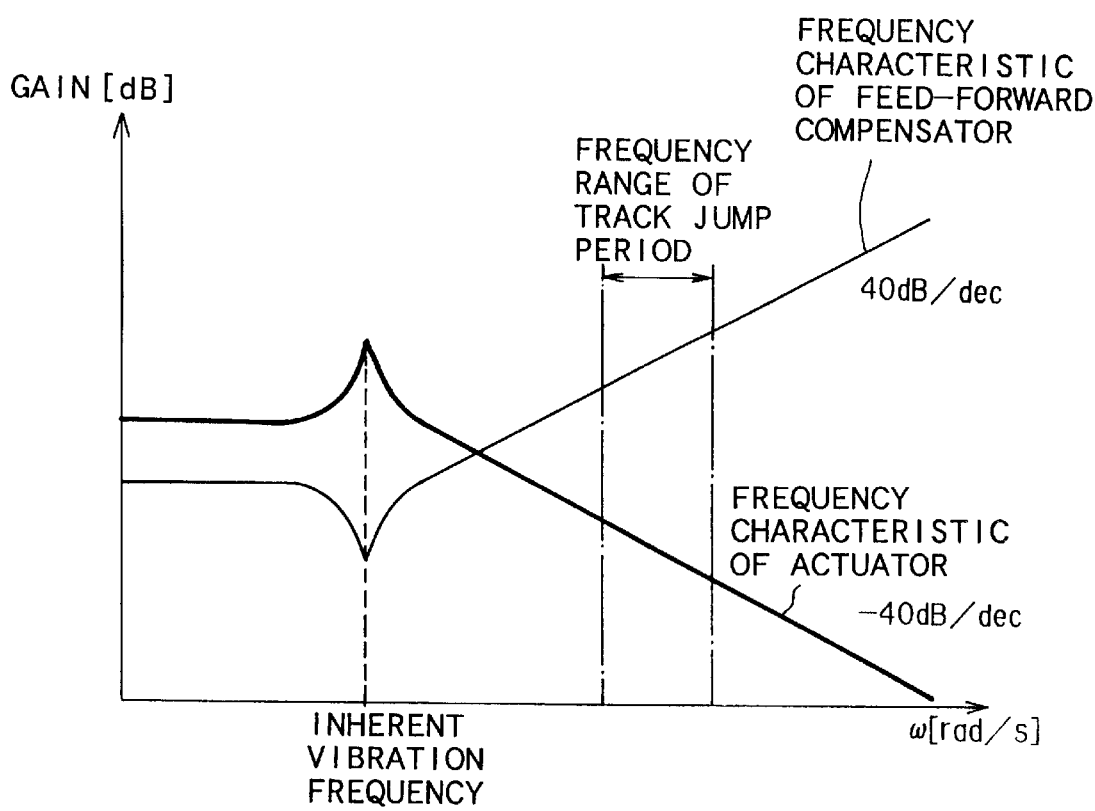
FIG. 2 is a diagram showing frequency characteristic of an actuator and feed forward compensator of the track jump apparatus of FIG. 1.
Figure 3:
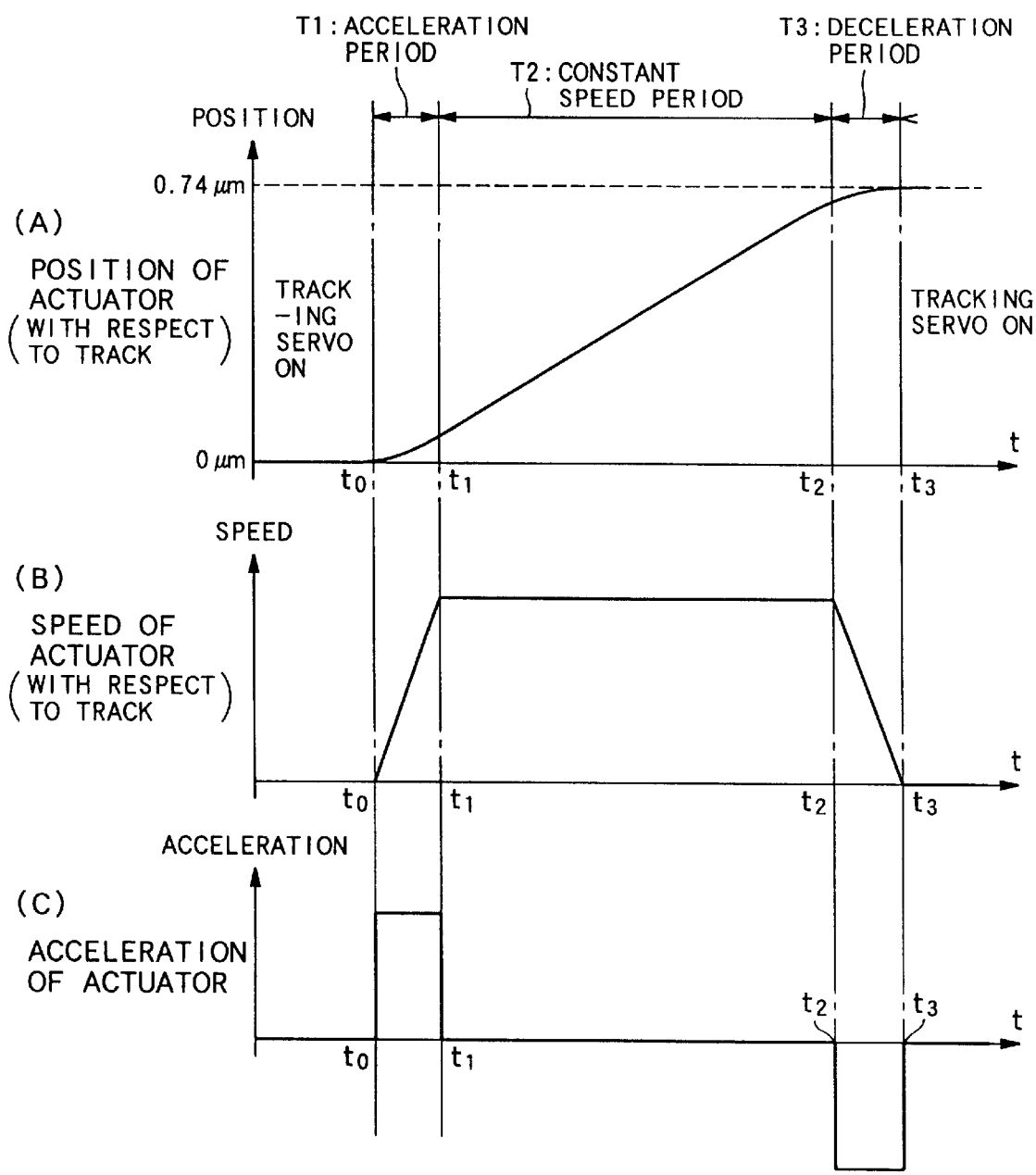
FIG. 3 are diagrams showing (A) a profile outputted from a reference position generator according to the first embodiment of the present invention, (B) a diagram showing a speed change in case where the profile of (A) is subjected to first order differential, and (C) is a diagram showing a feed forward output subjected to second order differential of the profile of (A)
Figure 4:
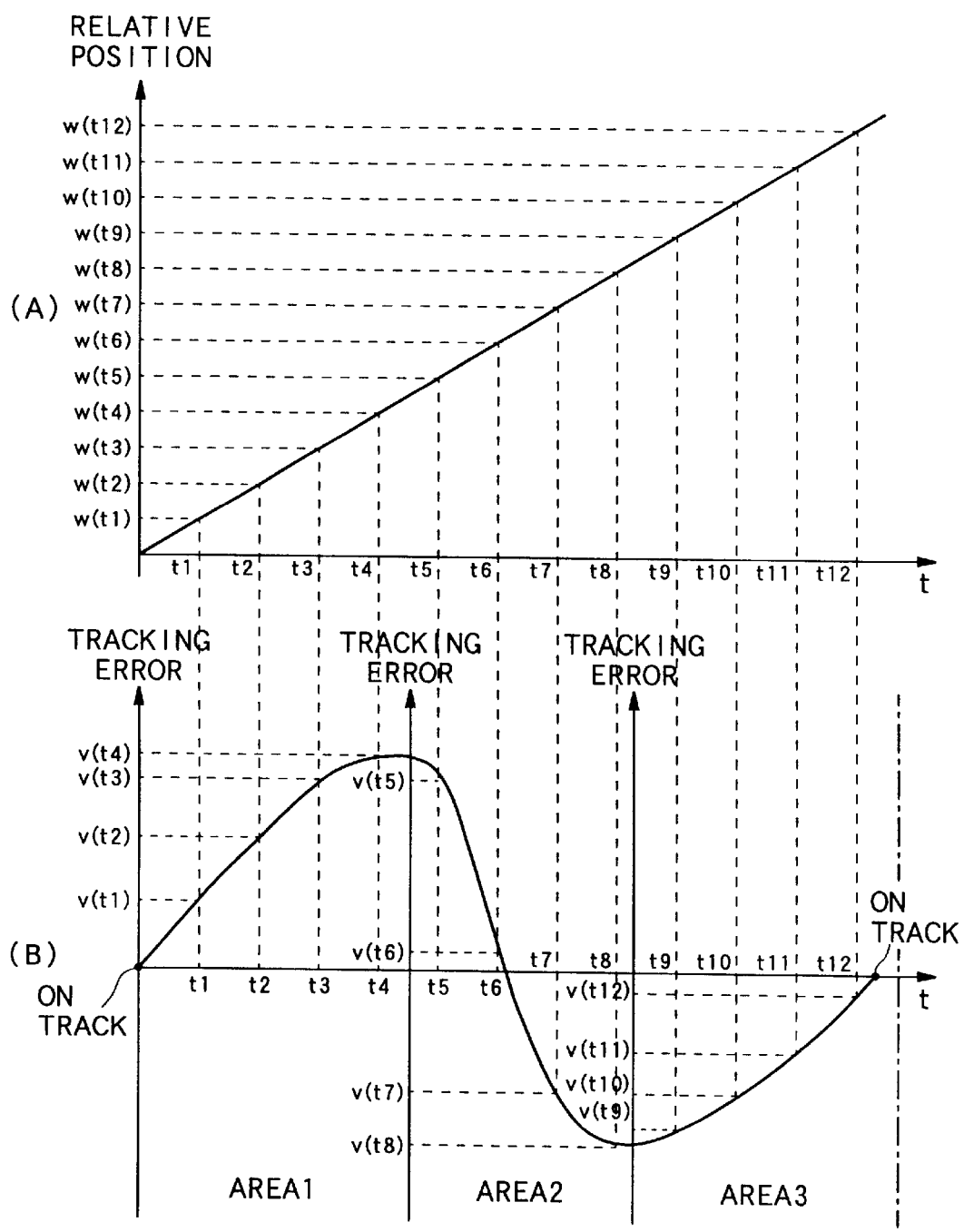
FIG. 4 are diagrams showing (A) a linearization position output obtained by linearization converting a tracking error signal with a linearization converter of the track jump apparatus of FIG. 1 and FIG. (B) a diagram showing a tracking error signal obtained with a position detector of the track jump apparatus of FIG. 1.
Figure 5:
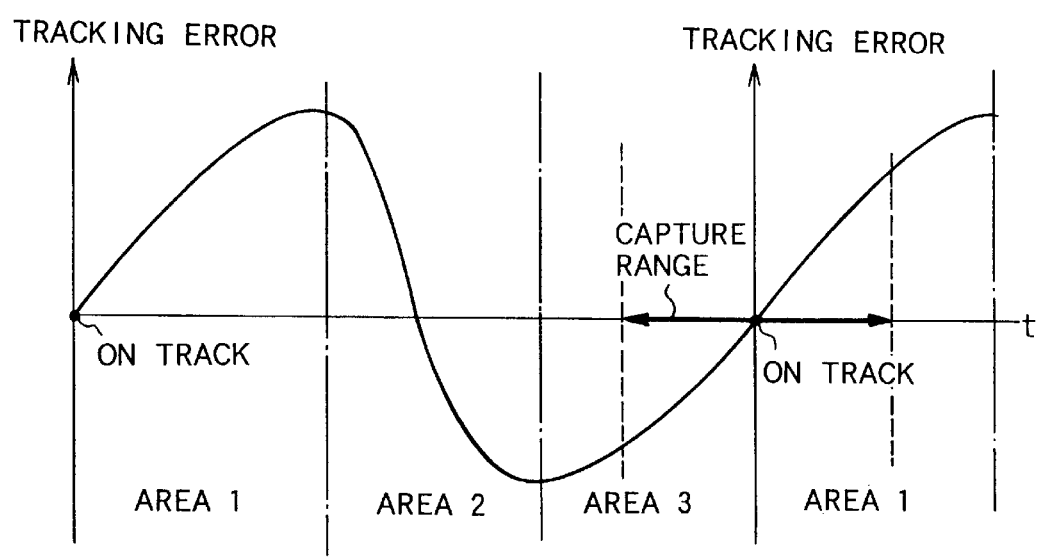
FIG. 5 is a diagram for comparing a reference method for the tracking error signal upon tracking servo control with a tracking error signal upon track jump.

The actuator 1 is a means for moving an objective lens of an optical pickup in a radial direction of the DVD based on a feed-forward output from the feed-forward compensator 2 or a drive signal outputted from the stabilization compensator 6 and has a frequency characteristic shown in FIG. 2. As shown in FIG. 2, a required time for single track jump is 1 msec or less or several kHz if converted to frequency, which exceeds an inherent vibration frequency of the actuator 1. In this track jump range (frequency range of this track jump period), the actuator 1 indicates a frequency characteristic having a gradient of −40 dB/dec.

[2] Feed-Forward Compensator

The feed-forward compensator 2 is a means for supplying a feed-forward output as an operating amount for matching the behavior of the actuator 1 with an object value. Assuming that a position output of the actuator 1 is Y(s), transmission coefficient of the actuator 1 is Gu(s), transmission function of the feed-forward compensator 2 is Gf and the object value is R(s), and it can be expressed as, $$Y(s)=Gu(s) \cdot Gf \cdot R(s).$$

Therefore, to match the position output of the actuator 1 with the object value, it is necessary to satisfy $$Y(s)/R(s)=1=Gu(s) \cdot Gf.$$

Thus, the transmission function Gf of the feed-forward compensator 2 is $$Gf=1/Gu(s),$$

indicating that the transmission function of the actuator 1 must only be converted to be an inverse function. FIG. 2 shows frequency characteristic of the feed-forward compensator 2 having this transmission function 1/Gu(s). As evident from FIG. 2, the frequency characteristic of the feed-forward compensator 2 has a gradient of 40 dB/dec and this characteristic can be approximated by a characteristic of second order differentiator.

[3] Reference Position Generator

The reference position generator 3 is a means for outputting the object value. Because a control amount of the actuator 1 as a control object is a position output, that is a traveling distance which changes on time axis, the object value needs to be given as a traveling distance which changes on time axis. According to this embodiment, a profile shown in FIG. 3(A) is outputted from the reference position generator 3 as an object value. In this profile, the traveling distance rises up like secondary function in an interval T1 from timing t0 with a current track position (0 μm) as a starting position. After that, the distance increases like the primary function in interval T2 and after that, decreases like the secondary function. At timing t3, a position far by 0.74 μm which is equal to a single track is reached at timing t3.

This profile is subjected to first order differential so as to express its result as a speed change as shown in FIG. 3(B). That is, the interval T1 is acceleration period, interval T2 is constant speed period and interval T3 is deceleration period.

Because the feed-forward compensator 2 is capable of approximating to the second order differentiator as described above, if the second order differential is carried out to the above profile, an acceleration pulse having a width of T1 is outputted at timing t0 as shown in FIG. 3(C) and a deceleration pulse having a width of T3 is outputted at timing t2 after period T2 relative to timing t1. According to this embodiment, the profile shown in FIG. 3(A) is supplied to the feed-forward compensator 2 as an object value and as a result, a feed-forward output is obtained with a predetermined gap between the acceleration pulse and deceleration pulse from the feed-forward compensator 2 as shown in FIG. 3(C).

[4] Position Detector

The position detector 4 is a means for detecting a position output as information of position changed by traveling of the actuator 1 as an actual signal change. According to this embodiment, a means for outputting a tracking error signal as shown in FIG. 4(B) based on a change of return light amount accompanied by a traveling of the objective lens is used. FIG. 4(B) shows an example of the tracking error signal in a case where a relative position between the track and objective lens changes at a predetermined rate. As evident from FIG. 4(B), the tracking error signal is sine wave or sawtooth wave signal, indicating a positive peak value and a negative peak value at a border between area 1 in which the signal increases as a positive value and area 2 in which it decreases and a border between the aforementioned area 2 and area 3 in which the signal increases as a negative value respectively, and passing a zero cross point at an intermediate position between on-track position and adjacent on-track position. Although the tracking error signal is a non-linearization signal as indicated here, if looking in respective areas, the signal changes either in a direction for increase or a direction for decrease. Therefore, values v(t1)–v(t4) of tracking error signal in the area 1 and value w(t1)–w(t4) of a relative position between the track and objective lens, values v(t5)–v(t8) of tracking error signal in area 2 and value w(t5)–w(t8) of a relative position between the track and objective lens, values v(t9)–v(t12) of tracking error signal in area 3 and values w(t9)–w(t12) of a relative position between the track and objective lens correspond to each other. If area can be distinguished like this, the tracking error signal can be used as a signal for indicating a position output of the actuator 1.

[5] Linear Converter

The linearization converter 5 is a means for linearization converting a tracking error signal outputted from the position detector 4. For example, the sine wave or sawtooth non-linearization tracking error signal as shown in FIG. 4(B) is converted to a linearization signal as shown in FIG. 4(A).

In the tracking servo control, the tracking error signal is used as a signal indicating a deviation from the on-track position of the objective lens and the servo is carried out with an area between area 3 and area 1, which can be approximated as a linearization signal, as capture range. Thus, no linearization conversion processing is carried out.

However, according to this embodiment, because the tracking error signal is used as a signal for indicating a relative position between the objective lens and track in an interval from the current on-track position to an on-track position of a current track and feedback loop is formed to reduce a deviation between a signal for indicating this relative position and the aforementioned profile for use as a reference position, the tracking error signal has to be referred to with respect to every point in all area of area 1, area 2 and area 3, and the feedback control cannot be carried out easily with the non-linearization signal.

For example, if a value changes in the style of secondary function in a range from the tracking error value v(t3) to a positive peak value or from a negative peak value up to a tracking error value v(t11), feedback control in a high frequency range is demanded. Further, because the polarity of the tracking error signal is inverted in the area 2 shown in FIG. 4(B), the feedback loop is disturbed.

Then, by converting the tracking error signal to linearization signals in every area by means of the linearization converter 5, a stabilized servo loop is formed during a track jump.

Figure 6:
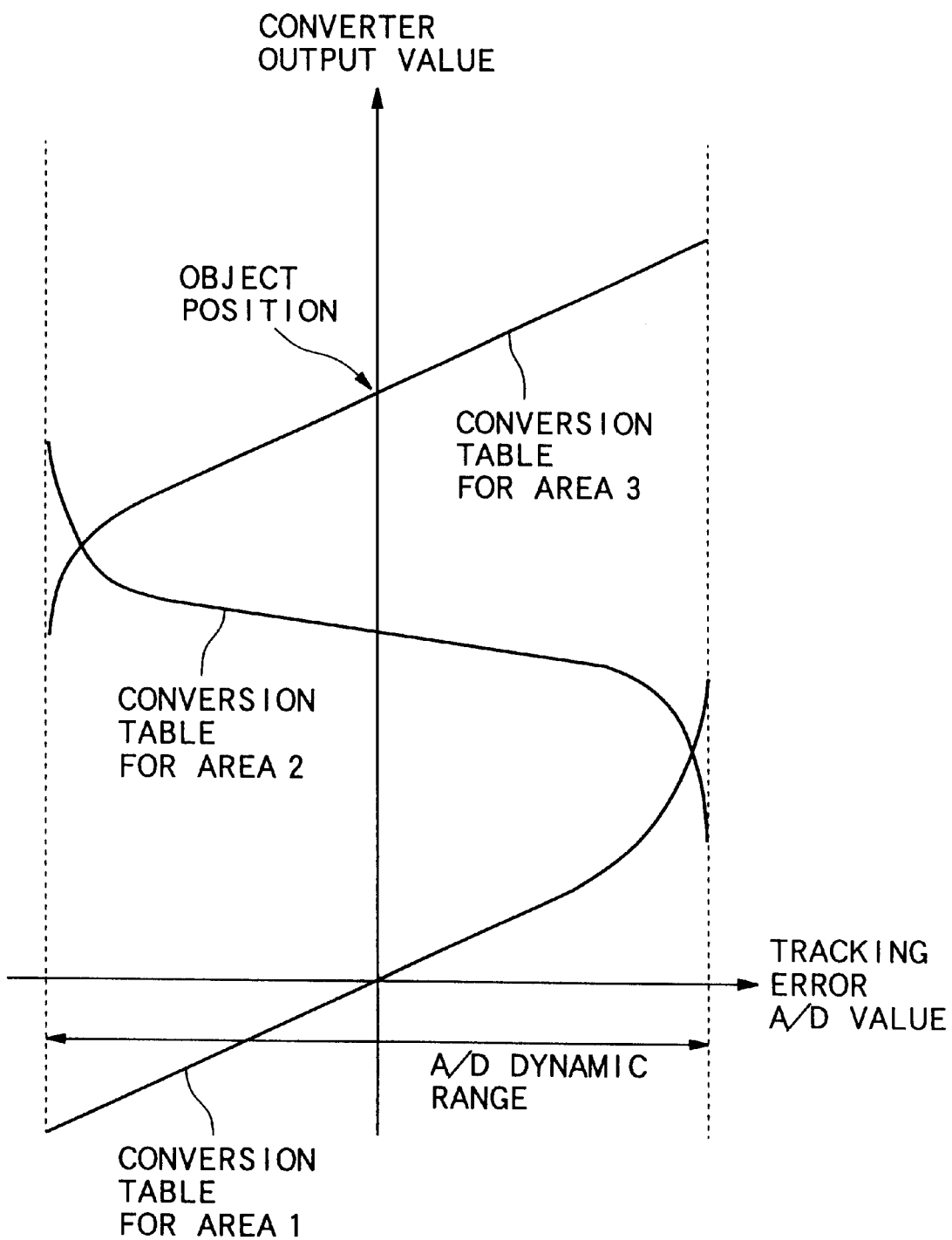
FIG. 6 is a diagram showing a table for linearization conversion for use in a linearization converter of the track jump apparatus of FIG. 1.
Figure 10:
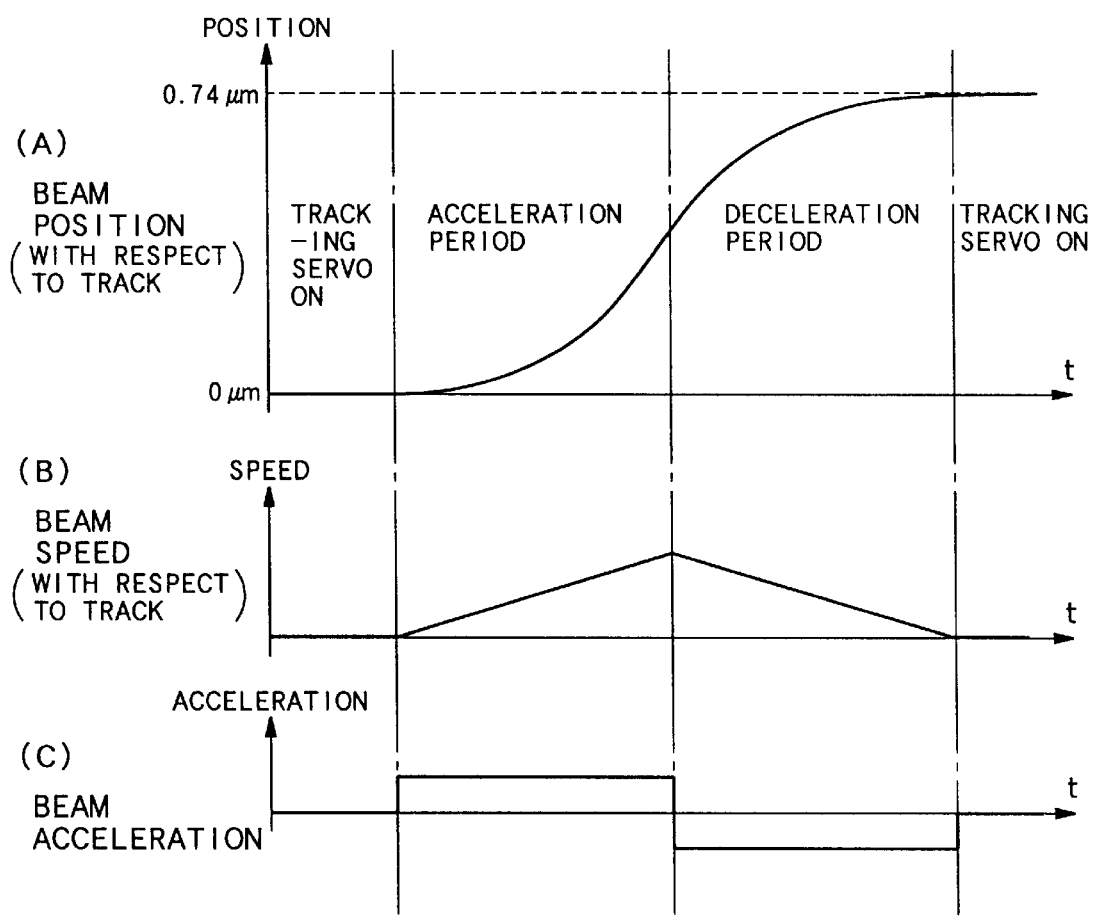
FIG. 10 is a diagram for explaining track jump control as a comparative example for comparing with the track jump apparatus of this embodiment, (A) is a diagram showing a reference position, (B) is a diagram showing a speed change in case where the reference position is subjected to first order differential and (C) is a diagram showing a feed forward output obtained by subjecting the reference position to second order differential.
Figure 12:
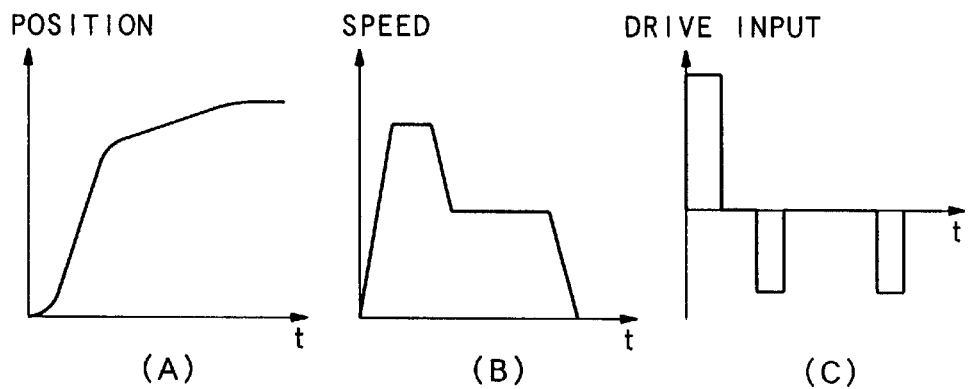
FIG. 12 are diagrams showing (A) a profile to be gradually decelerated, (B) a diagram showing a speed change obtained by subjecting the profile of (A) to first order differential and (C) a diagram showing a feed forward output obtained by subjecting the profile of (A) to second order differential.
Figure 13:
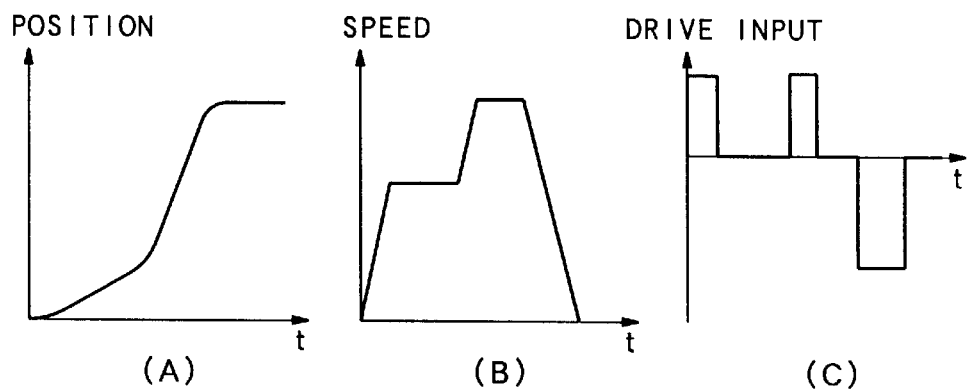
FIG. 13 are diagrams showing a profile to be gradually decelerated, (B) a diagram showing a speed change obtained by subjecting the profile of (A) to first order differential and (C) a diagram showing a feed forward output obtained by subjecting the profile of (A) to second order differential.
Figure 14:
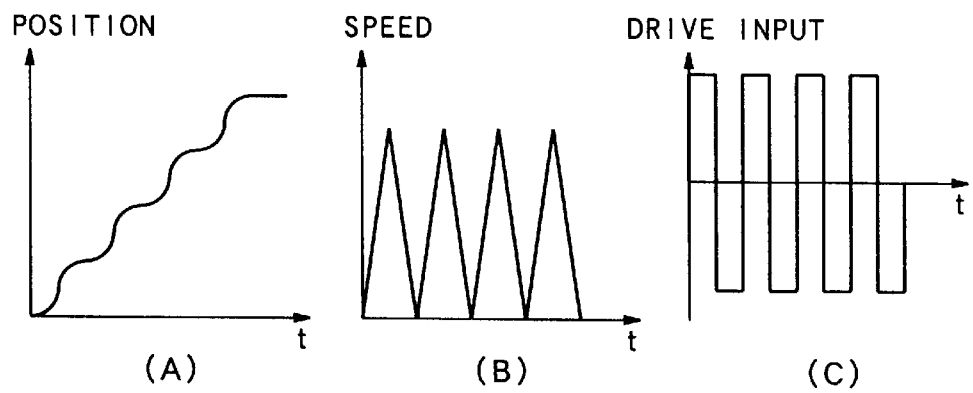
FIG. 14 are diagrams showing (A) a profile in which an acceleration period and a deceleration period appear alternately without a constant speed period, (B) a diagram showing a speed change obtained by subjected the profile of (A) to first order differential and (C) a diagram showing a feed forward output obtained by subjecting the profile of (A) to second order differential.

Various methods for linearization conversion can be considered, and according to an example thereof, converter output is carried out with reference to a table shown in FIG. 6 using a Digital Signal Processor (DSP). The table shown in FIG. 6 is divided into three kinds of tables, conversion table for area 1, conversion table for area 2 and conversion table for area 3. This is because the tracking error signal is divided to area 1, area 2 and area 3 depending on the magnitude and polarity of the signal as shown in FIG. 4(B). In the area 1, the tracking error signal indicates a positive value and has a polarity in which the magnitude of the signal increases with a passage of time. Because this tracking error signal is generated according to Differential Phase Detection (DPD) method (phase difference method), for example, that signal can be approximated to a linearization signal in an interval from a start of jump until a tracking error value v(t3) is obtained, in the area 1, but it changes in non-linearization style from the tracking error value v(t3) until a peak value is indicated. A positive peak value is indicated on a border between the area 1 and area 2. In the area 2, the tracking error signal changes from a positive value to a negative value with a passage to time and the magnitude of the signal decreases. Further, in an interval from the positive peak value until a tracking error value v(t5) is obtained, and an interval from the tracking error value v(t7) until a negative peak value is obtained, the signal changes in non-linearization fashion and in an interval from the tracking error values v(t5) to v(t7), it changes such that it can be approximated to linearization signal. Then, a negative peak value is indicated on a border between the area 2 and area 3. In the area 3, the tracking error signal indicates a negative value and the magnitude of the signal increases with a passage of time. Further, the signal changes in a fashion of secondary function from the negative value until the tracking error value v(t11) is obtained and it changes such that it can be approximated to linearization signal in an interval from the tracking error value v(t11) up to an on-track position.

To convert the tracking error signal to linearization signal as described above, the conversion tables for area 1 and area 3 increase a converter output value following an increase of the tracking error signal value and the conversion table for area 2 increases the converter output value following a decrease of the tracking error signal value. Further, an offset value of the conversion table for the area 1 is set higher than that of the conversion table for the area 2, and the offset value of the conversion table for the area 2 is set higher than that of the conversion table for the area 3. Depending on a decrease or increase of a change amount of the tracking error signal, gain correction amount is increased or decreased for a portion which changes in the fashion of secondary function in the respective areas.

The area changeover method includes a method for changing over based on a peak value of the tracking error signal and a method for changing over based on a threshold value of a focus sum which is a sum of return light amount. For example, if a tracking error signal shown in FIG. 7(A) is differentiated, a signal of a waveform shown in FIG. 7(B) is obtained. A position where this signal becomes zero in a process in which it decreases from positive to negative is a position in which a positive peak value of the tracking error signal is obtained. A position where it becomes zero in a process in which it increases from negative to positive is a position in which a negative peak value is obtained. Then, a position in which positive peak value is obtained is a border between the area 1 and area 2, and a position in which negative peak value is obtained is a border between the area 2 and area 3. Thus, by using a peak detector, level detector or the like or according to the polarity of a gradient of a sampled tracking error signal, a peak value of the tracking error signal is detected so as to change over the area.

If a focus sum which is a sum of return light amount is detected when the tracking error signal shown in FIG. 7(A) is obtained, a waveform shown in FIG. 7(C) is drawn. As shown in FIG. 7(C), the focus sum passes a predetermined threshold value in a decrease direction or increase direction on the border of the areas. A point in which it passes a predetermined threshold value in the decrease direction is a border between the area 1 and area 2, and a point in which it passes a predetermined threshold value in the increase direction is a border between the area 2 and area 3. Thus, by detecting a sum of the return light amount detected by a photo detector, the focus sum is obtained and by comparing the obtained focus sum with a predetermined threshold value, the area can be changed over.

Here, an example of linearization conversion to be carried out with reference to a table shown in FIG. 6 after the area is changed over by peak detection or focus sum detection will be described with reference to FIG. 8. FIG. 8(A) is a diagram showing a table shown in FIG. 6, FIG. 8(B) is an example of tracking error signal to be inputted to the linearization converter 5 when the actuator 1 is moving at a predetermined change rate (constant speed), and FIG. 8(C) is a diagram showing a result of linearization converting the tracking error signal shown in FIG. 8(B) using the table shown in FIG. 8(A).

In area 1 of FIG. 8(B), the conversion table for area 1 shown in FIG. 8(A) is referred to and w(t1) is outputted corresponding to a tracking error value v(t1) at time t1 and then w(t2)–w(t4) are outputted corresponding to tracking error values v(t2)–v(t4) at times t2–t4 in the same manner. Although the table value increases linearly with respect to the tracking error value up to the tracking error value v(t2) of time t2, a table in which gain is gradually increased corresponding to a gradual decrease of the increase rate of the tracking error signal with respect to tracking error values after the tracking error value v(t2). FIG. 8(C) shows a graph of the above described converter output, according to which it is evident that the track error signal in area 1 is converted linearly.

Next, in area 2 of FIG. 8(B), the conversion table for area 2 shown in FIG. 8(A) is referred to. As shown in FIG. 8(A), the conversion table for area 2 has a polarity different from the conversion table for area 1 and the offset value is set larger than the conversion table for area 1. According to the conversion table for area 2, w(t5) is outputted corresponding to tracking error value v(t5) at time t5 and w(t6)–w(t9) are outputted corresponding to tracking error values v(t6)–v(t9) at time t6–t9. A table for lowering gain gradually corresponding to a gradual increase of the tracking error signal in negative direction is used for from a tracking error signal at a border between area 1 and area 2 to the tracking error value v(t5) at time t5. For the tracking error signal from a tracking error value v(t8) at time 8 up to a border between area 2 and area 3, a table for increasing gain gradually corresponding to an increase rate of the tracking error signal in a negative direction is used. For tracking error value v(t6) up to tracking error value v(t8), a table for increasing gain linearly corresponding to an increase of the tracking signal in a negative direction is used.

Next, in area 3 shown in FIG. 8(B), a conversion table for area 3 shown in FIG. 8(A) is referred to. The polarity of the conversion table for area 3 is the same as the conversion table for area 1 as shown in FIG. 8(A) and its offset value is set larger than the conversion table for area 2. According to the conversion table for area 3, w(t10) is outputted corresponding to a tracking error value v(t10) at time t10 and in the same manner, w(t10)–w(t12) are outputted corresponding to tracking error values v(t10)–v(t12) at time t10–t12. Here, although the table value increases linearly corresponding to tracking error values after a tracking error value v(t10) at time t10, a table for decreasing gain gradually corresponding to a gradual increase of the increase rate of the tracking error signal is used for from a tracking error signal at a border between area 2 and area 3 to a tracking error value v(t10).

FIG. 8(C) graphs the above mentioned converter output, indicating that the tracking error signal shown in FIG. 8(B) is linearly converted so as to obtain a linearization position output.

FIG. 8 shows an example of conversion of a case in which the actuator travels at a constant speed in an entire period from jump start to end. However, upon actual jump, the actuator is accelerated with a start of the jump and gradually moved. After traveling at a constant speed, it is decelerated gradually to the jump end and then reaches a target position. Therefore, In the linearization converter 5 of this embodiment, for a single jump, by using a conversion table in which the converter output is changed in a style of secondary function corresponding to a change in position of the actuator both in the acceleration and deceleration periods so as to obtain a linearization signal in a predetermined speed period, the tracking error signal is converted.

[6] Stabilization Compensator

Referring to FIG. 1 again, the stabilization compensator 6 is a means for outputting a drive signal to the actuator 1 as a control object so as to reduce a deviation of position obtained by comparing a linearization position output outputted from the linearization converter 5 described above with a profile having a constant speed period in a term between the acceleration period and deceleration period shown in FIG. 3(A), outputted from the reference position generator 3. FIG. 9 shows an example of deviation in position of a case in which the actuator 1 travels at a faster speed than when a trajectory like the profile is drawn and a case in which it travels at a slower speed. The linearization position output shown in FIG. 9 uses a linearization position output which changes in the style of secondary function in the acceleration and deceleration periods and changes linearly in a constant speed period in any cases of fast speed and slow speed.

According to this embodiment, a constant speed period is provided in the profile as an object value of feed forward control, a position output as a control amount of the actuator 1 which is a control object is fed back as the linearization position output obtained by linearization converting the tracking error signal, and the aforementioned profile is compared to a reference position so as to form a closed loop. That is, the track jump apparatus of this embodiment carries out the feed forward control which is conventionally achieved by open control, in combination with feed back control so as to reduce an influence of disturbance remarkably thereby achieving a stabilized track jump. As shown in FIG. 2, the frequency band of the track jump is as high as several kHz so that it is difficult to follow up if only the feed back control is used. However, it can be said that by using the feed forward control at the same time, a stabilized control in a high band is achieved. Further, because in a track jump apparatus of this embodiment, the feed back loop is closed during a track jump, it acts as if tracking servo is always ON, thereby reducing a shock when the tracking servo is turned ON after an end of the track jump. Therefore, after the track jump ends, the disorder is low so that conversion of the tracking servo can be accelerated.

Because in the track jump apparatus of this embodiment, an object value is provided and thus, a deviation is obtained like tracking servo time, the same stabilization compensator 6 can be used both at the times of track jump and track servo. However, because the track jump action is terminated instantly, an object of compensation is slightly different from the tracking servo. Therefore, the characteristic of the stabilization compensator may be changed at the times of track jump and tracking servo. Further, it is permissible to change the characteristic of the stabilization compensator gradually from the track jump time to the tracking servo time. For example, although as for constant characteristic, a low band gain is captured widely to suppress a constant deviation in the tracking servo, because this band is out of the track jump band, in track jump, a low band gain may be suppressed so as to ensure a high band phase allowance. Because an evaluation object of the track jump performance is transient response and on the other hand, ordinary tracking servo is constant response, in the stabilization compensator, quick response is highly regarded for the track jump and stabilization is highly regarded for ordinary tracking servo. Position information to be fed back in the track jump period of this embodiment is estimated from a non-linearization tracking error signal, including a disturbance which is generated by an estimation error, particularly when the area is changed over. Therefore, at the time of track jump, it is permissible to attach a filter for removing the disturbance to a stabilization compensator or reduce feed back gain.

[7] Entire Action and Comparison with a Conventional Case

Next, an entire action of the track jump apparatus of this embodiment will be described below. First, a profile having a trajectory shown in FIG. 3(A) is outputted from the reference position generator 3. In this profile, acceleration period T1 and deceleration period T3 are set short and constant speed period T2 is set sufficiently long. If this profile is supplied to the feed-forward compensator 2, acceleration pulse is given to the actuator 1 for a short time as shown in FIG. 3(C), so that traveling of the actuator 1 is started. After that, the feed forward output is not given to the actuator 1 until deceleration pulse is outputted. Therefore, in this constant speed period, the actuator 1 travels at a constant speed with respect to the track and the objective lens also travels at a constant speed. Because in the constant speed period, the profile as an object value changes with a predetermined gradient, a band of the object value is apparently lowered considerably as compared to the track jump band, so that an effective feed back control is carried out. That is, as described above, if the actuator 1 starts to travel, a tracking error signal shown in FIG. 4(B) is outputted from the position detector 4. This signal is linearization converted by the linearization converter 5 and its linearization position is outputted. After that, as shown in FIG. 9, a deviation of position is obtained by comparison between the profile and linearization position output and a drive signal is supplied to the actuator 1 by the stabilization compensator 6 so as to suppress this deviation of position. After the constant speed period is terminated and just before lead-in of the tracking servo is started, deceleration pulse shown in FIG. 3(C) is outputted so that the actuator 1 starts to decelerate. Because the deceleration is achieved in a short time, an influence of a high band region is small so that the lead-in of the tracking servo can be completed quickly. It is permissible to construct to carry out feed back control in the acceleration and deceleration periods.

On the contrary, the conventional track jump apparatus carries out feed forward control by turning ON acceleration pulse at the same time when the track jump starts, turning OFF the acceleration pulse at a zero cross position of the tracking error signal and turning ON deceleration pulse immediately. However, if track pitch narrows with increased density of the disk, time necessary for the track jump shortens in a control ensuring the acceleration amount and deceleration amount in large quantity like the conventional track jump apparatus. Consequently, influences of blind zone existing in a driving system and detection system of the tracking servo system and time delay increase so that a stabilized track jump cannot be achieved. That is, even if the aforementioned deceleration pulse is applied, sometimes an actual drive thereof delays or timing detection for deceleration and servo close delays so that overshoot frequency generated at the time of servo close is intensified, thereby failing in a jump without any braking or taking a long time until the frequency is stabilized. Further, although an appropriate amount of the deceleration pulse can be obtained according to an interval from a jump start to zero cross of the tracking error, a relation between the zero cross interval and appropriate deceleration pulse includes deflection, and as the jump time decreases, measurement time decreases, so that an influence of this deflection is increased. Therefore, sometimes a deceleration pulse calculated from the measured zero cross interval is not appropriate, thereby disturbing the jump. Further, a timing for outputting the deceleration timing and a timing for closing the tracking servo are determined by the tracing error signal, and if the tracking error signal is sampled, a timing delay of one sampling at the maximum occurs. Thus, if the jump time decreases, the timing delay of one sampling affects thereby making the jump unstable and further disabling the jump action which usually is progressed in succession, leading to a jump failure.

However, because, in the track jump apparatus of this embodiment, it is possible to secure some extent of the jump time by decreasing the acceleration amount and deceleration amount, a conventional problem related to reduction of the jump time never occurs. Further, because the track jump apparatus of this embodiment carries out both feed forward control and feed back control, it is highly resistant to disturbance even if the acceleration amount and deceleration amount are reduced, so that a stabilized track jump can be achieved even if a decentering, a change in slider state, shock or the like occurs.

Particularly because, in this embodiment, a profile having a constant speed period is provided between the acceleration period and deceleration period, an effect of the feed back control can be exerted sufficiently. In a structure for providing the acceleration pulse and deceleration pulse of the aforementioned conventional track jump, a profile in which two secondary functions are combined without the constant speed period is obtained.

Here, a difference in constant deviation between a case in which the object value is constant speed input and a case in which it is constant acceleration input will be described. In a description below, to facilitate understanding, a direct connection feedback system in which a compensation element of transmission function $G_1(s)$ is directly connected to a control object of transmission function $G_2(s)$ as shown in FIG. 11 (A) is set up as a model.

In this case, the transmission function $G_2(s)$ of the control object is assumed to be primary delay system.

$$G_2(s)=K/(1+Ts) \qquad (1)$$

[K: gain constant, T: time constant]

An integration element is used as the compensation element. Its transmission function $G_1(s)$ is as follows.

$$G_1(s)=1/s \qquad (2)$$

Therefore, an open-loop transmission function $G(s)$ of a direct connected feedback system as shown in FIG. 11 (A) is as follows.

$$G(s)=G_1(s) \cdot G_2(s)=K/\{(1+Ts)s\} \qquad (3)$$

If the object value is R(s), the control deviation E(s) of the direct connection feedback system is as follows.

$$E(s)=R(s)/\{1+G(s)\} \quad (4)$$

If the control deviation is assumed to be e(t) according to final—value theorem in Laplace transform, the constant deviation e(∞) can be obtained in a following formula.

Expression 1

$$e(\infty) = \lim_{t \to \infty} e(t) = \lim_{s \to \infty} sE(s) \quad (5)$$

Here, the sE(s) of a case of FIG. 11(A) is obtained. First, because $$1+G(s)=1+K/\{(1+Ts)s\}=(Ts^2+s+K)/\{(1+Ts)s\} \quad (6)$$

from the above (3), $$E(s)=R(s)(1+Ts)s/(Ts^2+s+K) \quad (7)$$

is obtained from the formula (6) and formula (4). Then, both sides of the formula (7) are multiplied by s and then sE(s) is obtained.

$$sE(s)=R(s)(1+Ts)s^2/(Ts^2+s+K) \quad (8)$$

Next, a constant deviation e(∞) of a case in which the object value r(t) is a constant speed shown in FIG. 11(B) like the track jump apparatus of this embodiment is obtained according to the above formula (5) and the aforementioned formula (8).

If the constant speed input of FIG. 11(B) is considered, the object values r(t) and R(s) are as follows.

$$r(t)=v_0 t, R(s)=v_0/s^2 \quad (9)$$

Thus, the sE(s) is as follows according to the aforementioned formula (8).

$$sE(s)=(v_0/s^2)(1+Ts)s^2/(Ts^2+s+K)=v_0(1+Ts)/(Ts^2+s+K) \quad (10)$$

Thus, the constant deviation e(∞) is as follows according to the aforementioned formula (5).

Expression 2

$$e(\infty) = \lim_{s \to \infty} v_0(1 + Ts)/(Ts^2 + s + K) = v_0/K \quad (11)$$

Next, the constant deviation e(∞) of a case in which the object value r(t) is a constant acceleration shown in FIG. 11(C) like the conventional track jump apparatus is obtained according to the formulas (5) and (8).

If a constant acceleration input of FIG. 11(C) is considered, the object values r(t) and R(s) are as follows.

$$r(t)=(1/2)a_0 t^2, R(s)=a_0/s^3 \quad (12)$$

Thus, the sE(s) is as follows according to the formula (8).

$$sE(s)=(a_0/s^3)(1+Ts)s^2/(Ts^2+s+K)=(a_0/s)(1+Ts)/(Ts^2+s+K) \quad (13)$$

Thus, the constant deviation e(∞) is as follows according to the formula (5).

Expression 3

$$e(\infty) = \lim_{s \to \infty} (a_0/s)(1 + Ts)/(Ts^2 + s + K) \quad (14)$$
$$= \lim_{s \to \infty} (a_0/K)/s = \infty$$

If the aforementioned formulas (11) and (14) are compared, if the object value is constant speed, the constant deviation is converged to a constant ($v_0/K$) and if the object value is constant acceleration, the constant deviation becomes so that dispersion occurs. Therefore, if the control object and compensator are common, the control deviation becomes larger when the object value is constant acceleration than when it is constant speed. That is, because in the conventional track jump apparatus, as shown in FIG. 10(A), an object value of the constant acceleration is set up, even if feed back control is combined with the conventional track jump apparatus, the control is by far more difficult as compared to the track jump apparatus of this embodiment and apparently the deviation is by far larger than the track jump apparatus of this embodiment.

On the contrary, because in the track jump apparatus of this embodiment, an object value of the constant speed is set up as shown in FIG. 3(A), the feed back control is by far easier than the conventional track jump apparatus and the deviation is by far less than the conventional track jump apparatus.

The profile which can be used in the track jump apparatus of this embodiment is not restricted to a profile shown in FIG. 3(A) in which a constant speed period is provided between the acceleration period and deceleration period.

The constant speed period is divided to fast speed period and slow speed period as shown in FIG. 12(A) and a profile which decelerates by step as shown in FIG. 12(B) may be used. If this profile is used, as shown in FIG. 12(C), it comes that the deceleration pulse is applied twice after the acceleration pulse is applied and consequently, first the object value is approached and then reached by step. Therefore, this embodiment has such an advantage that the track jump can be achieved slowly with some degrees of the acceleration and deceleration and a disturbance generated during a track jump like a track pitch error is easy to cope with. Further, it is permissible to divide the constant speed period to more stages and apply the deceleration pulse by multiple steps after the acceleration pulse is applied.

As shown in FIG. 13(A), the constant speed period is divided to two stages, namely fast speed period and slow speed period. A profile which accelerated gradually as shown in FIG. 13(B) may be used. If this profile is used, as shown in FIG. 13(C), it comes that the acceleration pulse is applied twice and after that, a large deceleration pulse is applied. Consequently, the track jump can be achieved slowly with some degree of the acceleration and deceleration. Because the disturbance generated at the time of track jump is an initial acceleration or the like due to deviation, if feedback is carried out with a slow acceleration, control exerts its effect easily since a track jump start thereby suppressing a disturbance generated by a change of the initial condition of the track jump. In this case also, the frequency of application of the deceleration pulse can be two or more.

As shown in FIG. 14(A), a profile having no constant speed period and in which the acceleration period and deceleration period appear alternately may be used. According to this profile, acceleration and deceleration are repeated as show n in FIG. 14(B) so that the acceleration amount and deceleration amount increase. If the acceleration pulse and deceleration pulses are increased, an influence of the disturbance decreases. Therefore, total amount of the acceleration pulse and deceleration pulse is increased to reduce an influence of the disturbance and the object value is approached in a form of staircase to avoid a disadvantage caused by a reduction of time necessary for the track jump. Although feedback control is difficult if this profile is used, the maximum acceleration and deceleration amounts can be applied thereby minimizing the influence of the disturbance.

Although profiles which draw various trajectories can be used in the track jump apparatus of this embodiment, as described above, if a profile shown in FIG. 3(A) is used, the control system can be simplified and the actuator is capable of responding relatively easily.

Further, it is permissible to so construct that various profiles can be outputted by the reference position generator 3 so as to select and output an appropriate profile corresponding to the state of the disturbance.

Further, the respective profiles are determined according to a result of an experiment and stability against disturbance, tracking servo lead-in speed and the like are considered.

[8] Example of Experiment

Figure 15:
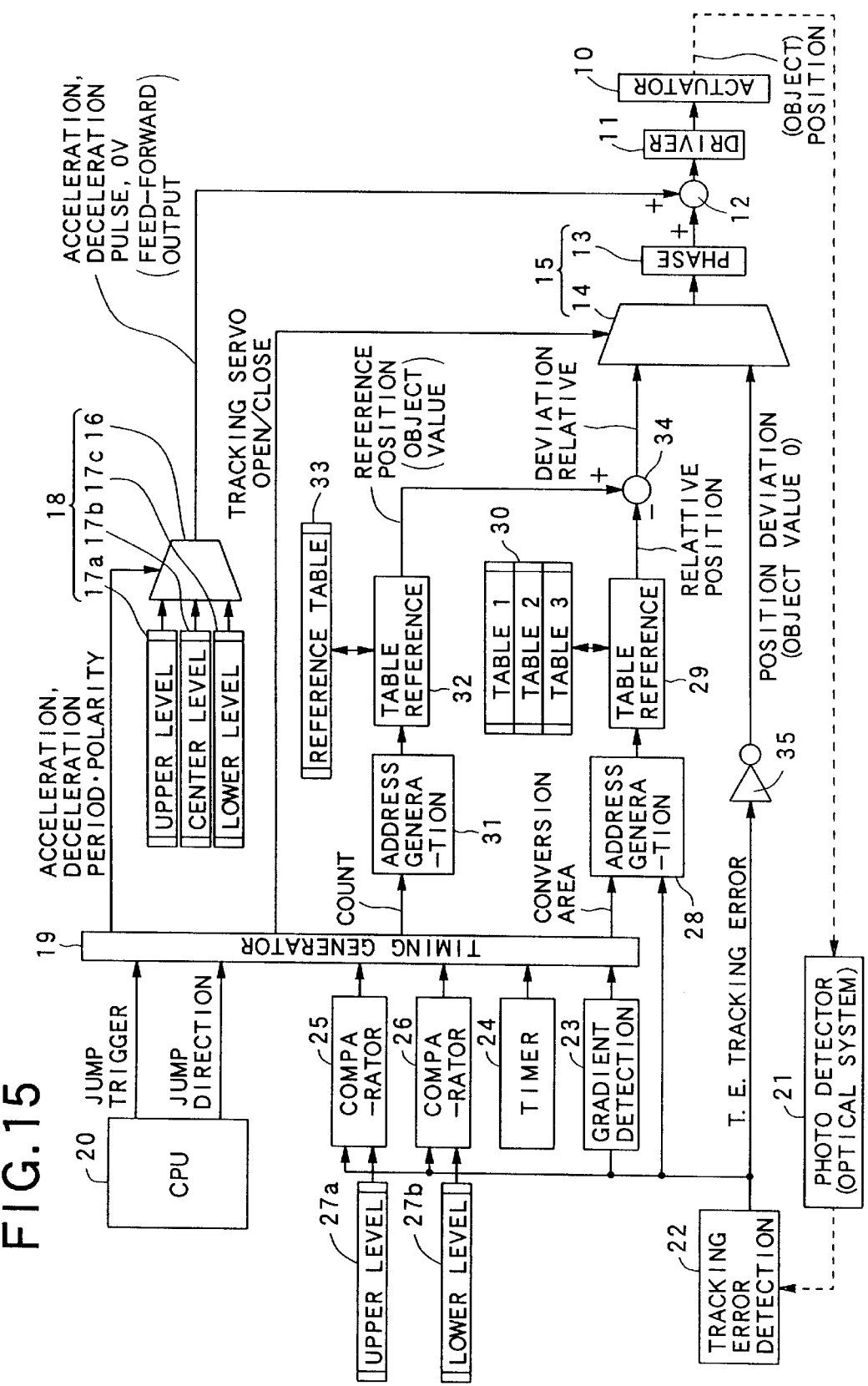
FIG. 15 is a block diagram showing a structure of a track jump apparatus used for the first embodiment of the present invention.

Next, an example of experiment according to this embodiment will be described with reference to FIGS. 15–24. FIG. 15 is a block diagram showing a structure of a track jump apparatus used for this experiment. In this track jump apparatus, each function except the actuator 10, driver 11, photo detector 21 and CPU 20 is achieved by executing a program in DSP.

Referring to FIG. 15, the actuator 10 comprises a movable portion containing an objective lens (not shown) and a supporting portion for supporting this movable portion by means of a spring, and deflects the movable portion in a radius direction with respect to a recording track (not shown) corresponding to a driving signal outputted from the driver 11.

A driver 11 generates the aforementioned driving signal corresponding to an input signal. A phase compensated signal outputted from a stabilization compensating circuit 15 or a feed forward signal outputted from a feed forward compensating circuit 18 is summed by an adding portion 12 and inputted to a driver 11 as an input signal. The actuator 10 and driver 11 are elements corresponding to the actuator 1 of FIG. 1.

The feed forward compensating circuit 18 comprises a selector portion 16, an upper level setting portion 17a connected to the selector portion 16, a center level setting portion 17b and a lower level setting portion 17c. The selector portion 16 selects any one of the upper level setting portion 17a, center level setting portion 17b and lower level setting portion 17c corresponding to a control signal outputted from a timing generator portion 19 and outputs a signal having a voltage value of any level of upper level, center level and lower level in a predetermined period. A signal having a voltage value of upper level becomes an acceleration pulse signal, a signal having a voltage value of lower level becomes a deceleration pulse signal and a signal having a voltage value of center level becomes a constant speed signal.

The timing generator portion 19 selects acceleration period, constant speed period, deceleration period and polarity of signal corresponding to a jump trigger signal and a jump direction signal outputted from the CPU 20 as a control means and then outputs a control signal having a predetermined polarity for outputting the acceleration pulse signal, constant speed signal or deceleration pulse signal to a selector portion 16 of the feed forward compensating circuit 18.

According to information inputted through an operation panel or the like (not shown), CPU 20 as a control means compares a track currently captured with a track to which a jump should be made according to that information, and outputs a jump trigger signal and a jump direction signal.

The feed forward signal is outputted from the CPU 20, timing generator portion 19, and feed forward compensating circuit 18 to the adding portion 12 so as to carry out feed forward control. That is, the feed forward compensator 5 shown in FIG. 1 is constituted of the CPU 20, timing generator portion 19 and feed forward compensating circuit 18. In the track jump apparatus of this experimental example, the pulse-like feed forward output is not obtained by second order differential of the aforementioned profile, but the pulse-like feed forward output is obtained directly by setting a level of a pulse signal corresponding to the profile in the upper level setting portion 17a, center level setting portion 17b and lower level setting portion 17c and further memorizing timing data of a pulse signal in the timing generator portion 19.

The stabilization compensating circuit 15 corresponding to the stabilization compensator 6 of FIG. 1 comprises a phase compensating portion 13 and a selector portion 14. The phase compensating portion 13 outputs a drive signal to a driver 11 so as to minimize a deviation in position upon tracking servo selected by the selector 14 or a deviation in position in feed back control upon track jump.

A photo detector 21 is composed of photoelectric conversion devices (not shown) disposed such that a light receiving plane is divided to two sections or four sections and a return beam of optical beam sent from the recording track is converted to electric signal by these photoelectric conversion devices. The photo detector 21 is connected to a tracking error signal detecting portion 22 and the aforementioned electric signal is outputted to the tracking error signal detecting portion 22.

The tracking error signal detecting portion 22 is composed of a differential amplifier or a phase comparator (not shown) and generates a tracking error signal by the push-pull method or Differential Phase Detection (DPD) method according to an electric signal outputted from the photo detector 21. A gradient detecting portion 23, comparators 25, 26, an address generator portion 28 and a buffer portion 35 are connected to the tracking error signal detecting portion 22 so as to output the aforementioned tracking error signal to these circuits. In the track jump apparatus of this experimental example, the position detector 4 shown in FIG. 1 comprises a photo detector 21 and a tracking error signal detecting portion 22.

The gradient detecting portion 23 is a circuit for detecting a polarity of the gradient of a tracking error signal. When the polarity of the gradient changes from positive to negative, it outputs a falling signal from high level to low level and when the polarity changed from negative to positive, it outputs a rising signal from low level to high level. An output of this gradient detecting portion 23 is supplied to the timing generator portion 19 and the timing generator portion 19 outputs a signal for determining an area shown in FIG. 4(B) according to a change of output of the aforementioned gradient detecting portion 23. A position in which the polarity of gradient of the tracking error signal changes is a peak position of the tracking error signal and if the peak position of the tracking error signal is made evident, the aforementioned area can be determined.

A timer 25 is triggered to start its operation by a start signal outputted from the CPU 20 and when a timer value set by the CPU 20 reaches zero, it outputs a time up signal to the timing generator portion 19. By setting the timer value to an appropriate value and then starting it at an appropriate timing, time measurement is enabled since a desired timing. The track jump apparatus of this experimental example is so constructed to be capable of not only changing-over the area using the gradient detecting portion 23 but also changing over the area at every predetermined time using the timer 24.

The comparators 25, 26 are circuits for comparing a tracking error signal to a predetermined threshold value. A voltage indicating a positive threshold value is supplied to the comparator 25 by a upper level setting portion 27a and a voltage indicating a negative threshold value is supplied to the comparator 26 by a lower level setting portion 27b. The positive threshold value is set to a value lower than a positive peak value of the tracking error signal and the negative threshold value is set to a value higher than the negative peak value of the tracking error signal. When a signal indicating detection of a positive peak value is outputted by the aforementioned gradient detecting portion 23, the timing generator portion 19 outputs a changeover signal for changing over from area 1 to area 2 when the tracking error signal is changed to a value lower than its positive threshold value. If a signal indicating detection of a negative peak value is outputted by the gradient detecting portion 23, the timing generator portion 19 outputs a changeover signal for changing from area 2 to area 3 when the tracking error signal becomes a value higher than the negative threshold value. With such a structure, even if the tracking error signal contains noise, changeover of the area can be carried out accurately. Then, a signal for changing an area to be outputted from the timing generator portion 19 is supplied to an address generator portion 28.

With reference to an area changeover signal outputted from the timing generator portion 19, the address generator portion 28 generates a start address for a conversion table to be referred to for linearization conversion of the tracking error signal. A table reference portion 29 is connected to the address generator portion 28 and the aforementioned start address is supplied to the table reference portion 29.

The table reference portion 29 outputs a value set in the conversion table corresponding to a value of a sampled tracking error with reference to the conversion table preliminarily memorized in a table portion 30, based on the start address to be supplied from the address generator portion 28.

In the table portion 30, a conversion table 1 which is a conversion table for area 1, a conversion table 2 which is a conversion table for area 2 and a conversion table 3 which is a conversion table for area 3 are memorized with each different start address and a value shown in FIG. 6 is set up in each conversion table at a predetermined resolution. Therefore, if each conversion table is referred to by the aforementioned table reference portion 29 and a table value is outputted, linearization conversion of the tracking error signal is carried out as shown in FIG. 8(C).

In the track jump apparatus of this experimental example, the linearization converter 5 shown in FIG. 1 comprises the gradient detecting portion 23, timer portion 24, comparators 25, 26, upper level setting portions 27a, 27b, timing generator portion 19, address generator portion 28, table reference portion 29, and table portion 30.

On the other hand the address generator portion 31 generates a start address of a reference table memorized in the table portion 33 based on a count signal outputted from the timing generator portion 19. The timing generator portion 19 is so constructed to output a different count signal depending on a pulse width of a pulse signal which is a feed forward output and the pulse width is selectable by the CPU 20. Therefore, if a signal for selecting a predetermined pulse width is outputted from the CPU 20 to the timing generator portion 19, the timing generator portion 19 outputs a control signal for generating a pulse signal having that pulse width to the feed forward compensating circuit 18 and just a count signal is outputted to the address generator portion 31. Consequently, the address generator portion 31 generates an address of a reference table corresponding to that pulse width and outputs to the table reference portion 32.

The table reference portion 32 refers to a reference table memorized in the table portion 33 based on an address to be supplied from the aforementioned address generating portion 31 and outputs a value set in the reference table.

A profile for drawing a predetermined trajectory corresponding to feed forward is set up in the table portion 33. For example, a waveform which is non-linearization both in the acceleration period and deceleration period and linearization in the constant speed period as shown in FIG. 9 is outputted by the table reference portion 32. In the track jump apparatus of this experimental case, the reference position generator 3 shown in FIG. 1 comprises the CPU 20, timing generator portion 19, address generator portion 31, table reference portion 32, and table portion 33.

A profile outputted from the table reference portion 32 and a profile outputted from the table reference portion 29 are subjected to addition/subtraction by an addition/subtraction portion 34 and a position deviation is outputted, for example, as shown in FIG. 9. This position deviation is outputted to the selector portion 14 of the stabilization compensating circuit 15 and when an open signal of tracking servo is outputted from the timing generator portion 19 to the selector portion 14, the position deviation is outputted to the phase compensating portion 13 thereby a close loop upon track jump being formed. On the other hand, when a close signal of tracking servo is outputted from the timing generator portion 19 to the selector portion 14, a tracking error signal to be outputted via the buffer portion 35 is outputted to the phase compensating portion 13 as a position deviation, thereby a close loop upon tracking servo being formed.

Figure 16:
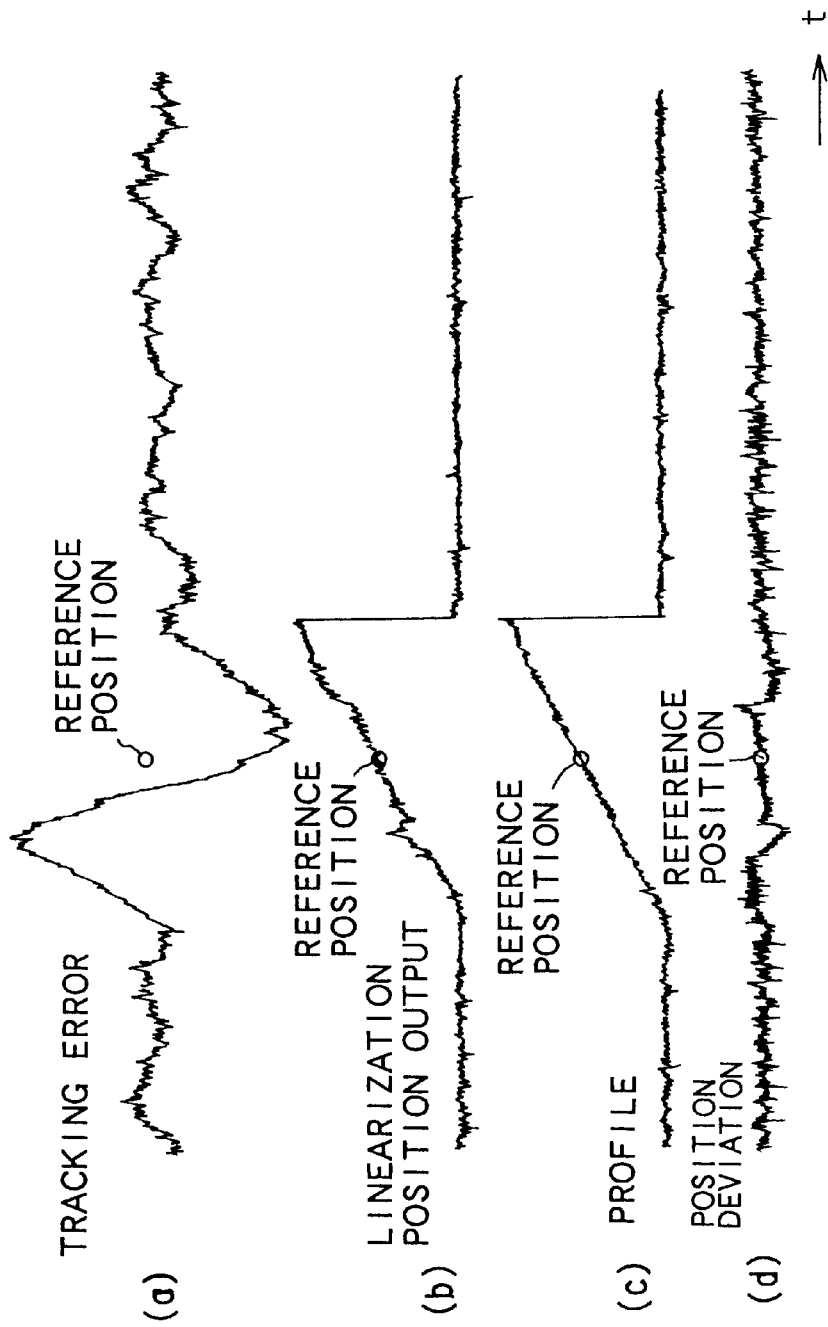
FIG. 16 is a diagram showing a result of an experiment conducted with the track jump apparatus shown in FIG. 15, (a) is a diagram of a tracking error signal in a state in which no feed back loop is formed during a track jump without a disturbance, (b) is a diagram showing a linearization position output obtained by linearization converting the tracking error of (a); (c) is a diagram showing a profile based on the tracking error signal of (a) and (d) is a diagram showing a position deviation of linearization position output relative to the profile of (c)

Next, an example of operation of the track jump apparatus according to this experimental example will be described. First, a profile shown in FIG. 16(c) is outputted from the table reference portion 32 and a feed forward output corresponding to this profile is supplied from the feed forward compensating circuit 18 to the driver 11. At this time, with the tracking servo open, connection between the addition/subtraction portion 34 and the selector portion 14 is separated. That is, the position deviation is investigated in such a condition that no feed back loop is formed. As a result, a tracking error signal shown in FIG. 16(a) is obtained if no disturbance exists and this tracking signal changes linearly as shown in FIG. 16(b). A linearization position output shown in FIG. 16(d) substantially coincides with a profile shown in FIG. 16(c), so that the position deviation becomes substantially zero as shown in FIG. 16(d). The reason why each signal vibrates in FIG. 16 is due to noise.

Figure 17:
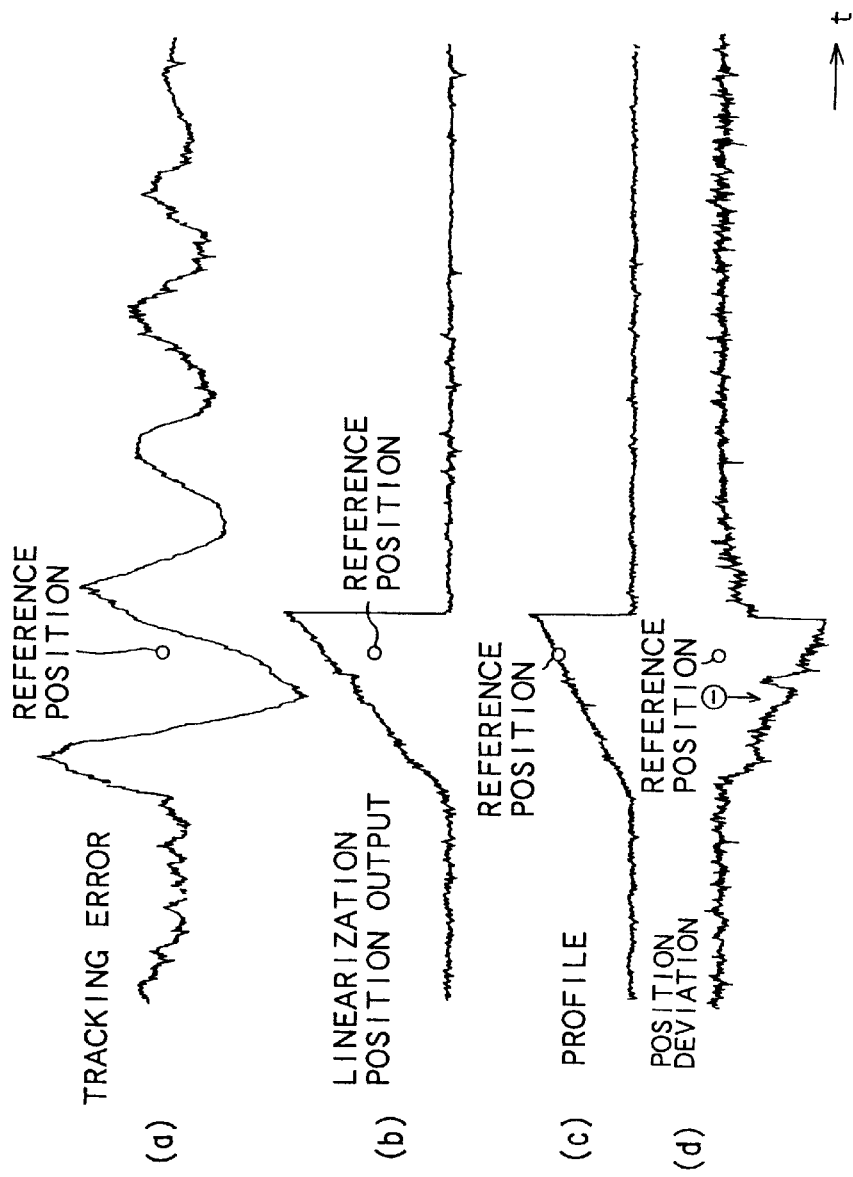
FIG. 17 is a diagram showing a result of an experiment conducted with the track jump apparatus shown in FIG. 15, (a) is a diagram of a tracking error signal in a case in which no feed back loop is formed during a track jump and a small disturbance is applied in the acceleration direction, (b) is a diagram showing a linearization position output obtained by linearization converting the tracking error of (a); (c) is a diagram showing a profile based on the tracking error signal of (a) and (d) is a diagram showing a position deviation of linearization position output relative to the profile of (c)

Next, FIG. 17 shows a case in which a disturbance is applied in the acceleration direction. The other condition is the same as FIG. 16. As evident from comparison between FIG. 16(a) and FIG. 17(a), the tracking error signal is shifted to the left due to an influence of the disturbance in the acceleration direction. Further, as evident from comparison between FIG. 16(b) and FIG. 17(b), an inclination of the linearization position output increases. Therefore, as shown in FIG. 17(d), a position deviation which increases in negative direction is obtained.

Figure 18:
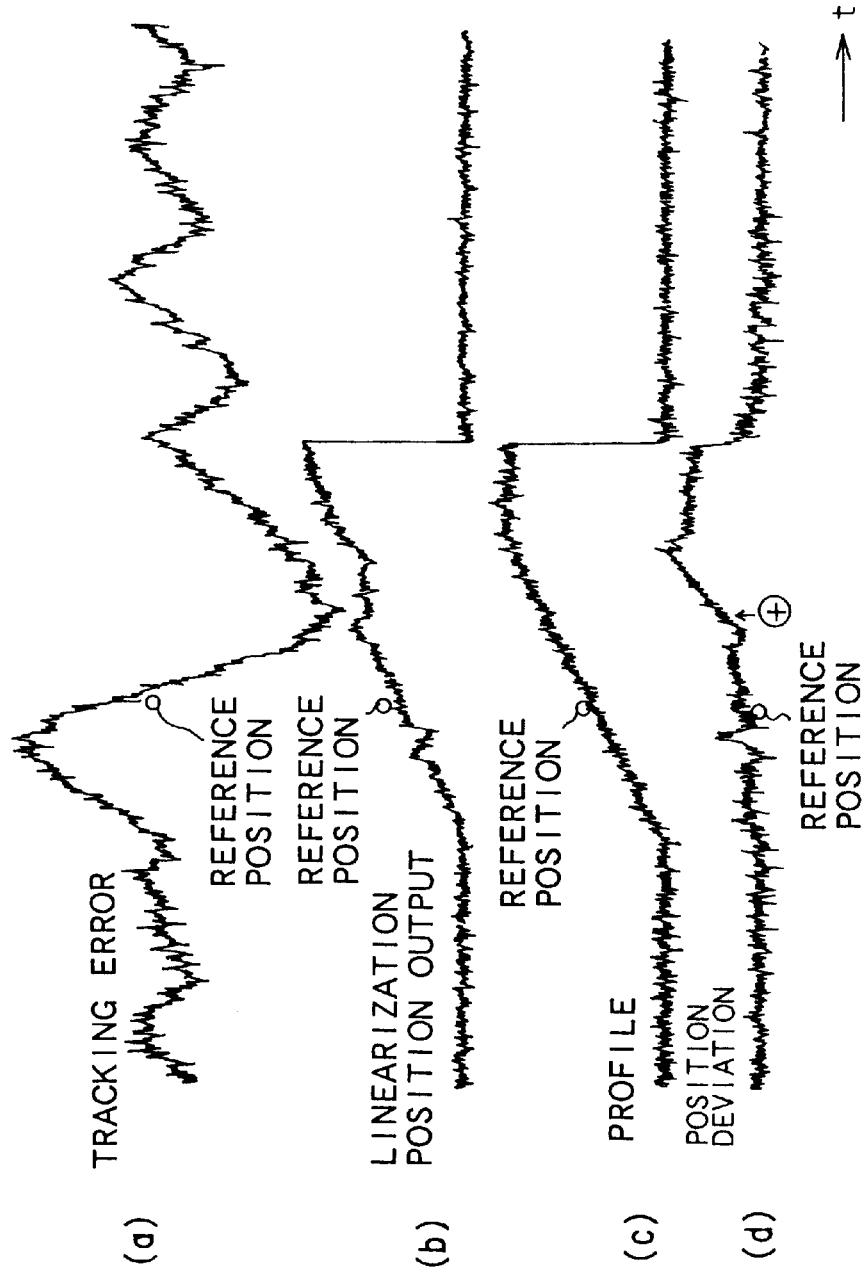
FIG. 18 is a diagram showing a result of an experiment conducted with the track jump apparatus shown in FIG. 15, (a) is a diagram of a tracking error signal in a case in which no feed back loop is formed during a track jump and a small disturbance is applied in the deceleration direction, (b) is a diagram showing a linearization position output obtained by linearization converting the tracking error of (a); (c) is a diagram showing a profile based on the tracking error signal of (a) and (d) is a diagram showing a position deviation of linearization position output relative to the profile of (c)

Next, FIG. 18 shows a case in which a disturbance is applied in the deceleration direction. The other condition is the same as FIG. 16. As evident from comparison between FIG. 16(a) and FIG. 18(a), the tracking error signal is shifted to the right due to a disturbance in the deceleration direction. Further, as evident from comparison between FIG. 16(b) and FIG. 18(b), the gradient of the linearization position output decreases. Therefore, as shown in FIG. 18(d), a position deviation which increases in positive direction is obtained.

Figure 19:
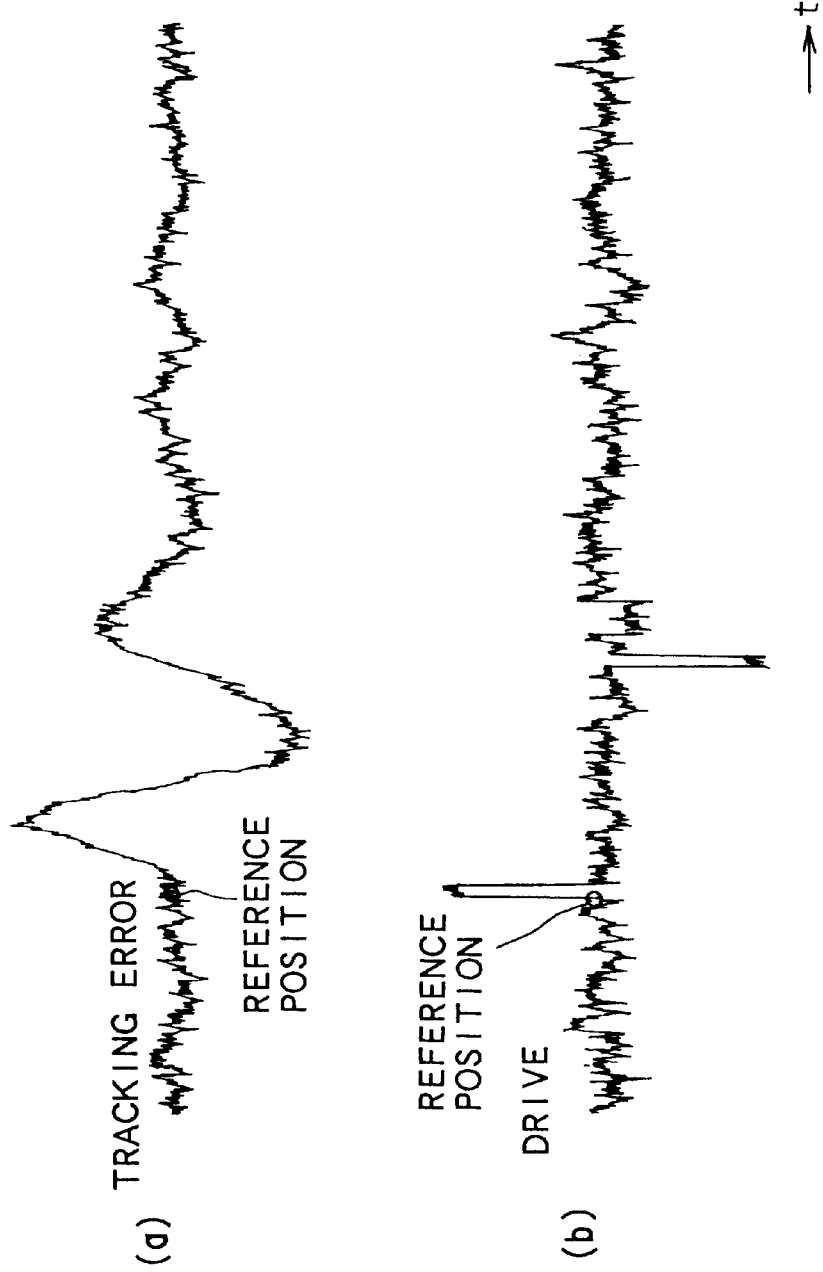
FIG. 19 is a diagram showing a result of experiment conducted with the track jump apparatus shown in FIG. 15, (a) is a diagram showing a tracking error signal in case where a feed back loop is formed during a track jump and a disturbance is applied in the acceleration direction, and (b) is a diagram showing a drive signal to be supplied to a driver of the actuator under the feed forward control and feed back control.
Figure 20:
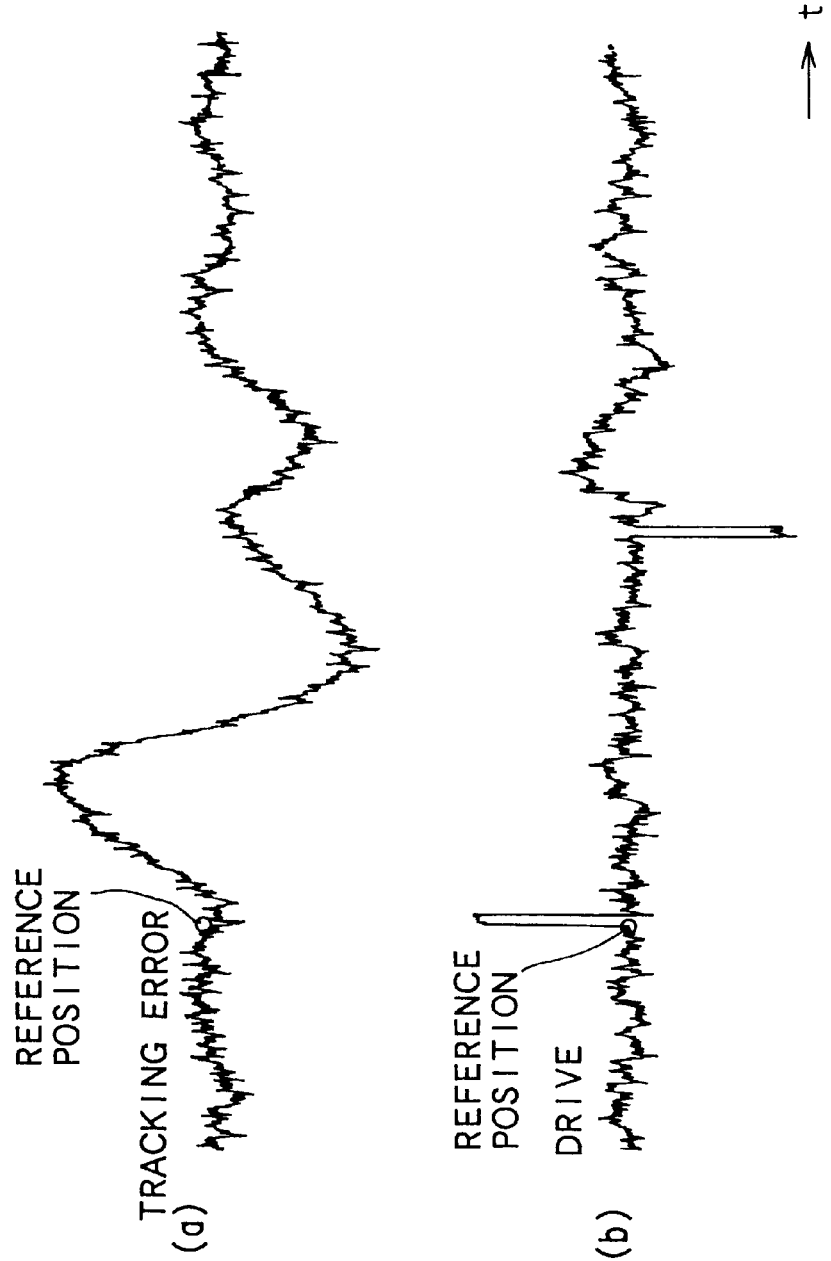
FIG. 20 is a diagram showing a result of experiment conducted with the track jump apparatus shown in FIG. 15, (a) is a diagram showing a tracking error signal in case where a feed back loop is formed during a track jump and a disturbance is applied in the deceleration direction, and (b) is a diagram showing a drive signal to be supplied to a driver of the actuator under the feed forward control and feed back control.

As described above, the track jump apparatus of this experimental case is capable of obtaining an appropriate position deviation based on a linearization position output obtained by linearization conversion of the tracking error signal. Then, because this position deviation is supplied to the stabilization compensating circuit 15 during a track jump, a feed back loop can be formed even during the track jump. Next, FIGS. 19, 20 show a result of experiment carried out so as to form a feed back loop during a track jump with the addition/subtraction portion 34 and the selector portion 14 being connected to each other. FIG. 19 shows an example in which a small disturbance is applied in the acceleration direction and FIG. 20 shows an example in which a disturbance is applied in the deceleration direction. FIGS. 19(b) and 20(b) show a drive signal to be supplied to the driver 11, indicating that the feed back control is carried out with a constant speed period between the acceleration pulse and deceleration pulse. As evident from FIGS. 19(a) and 20(a), by combination of the feed forward control and feed back control, the tracking error signal converges in a short time after a jump ends and the tracking servo lead-in is completed in a short time.

Figure 21:
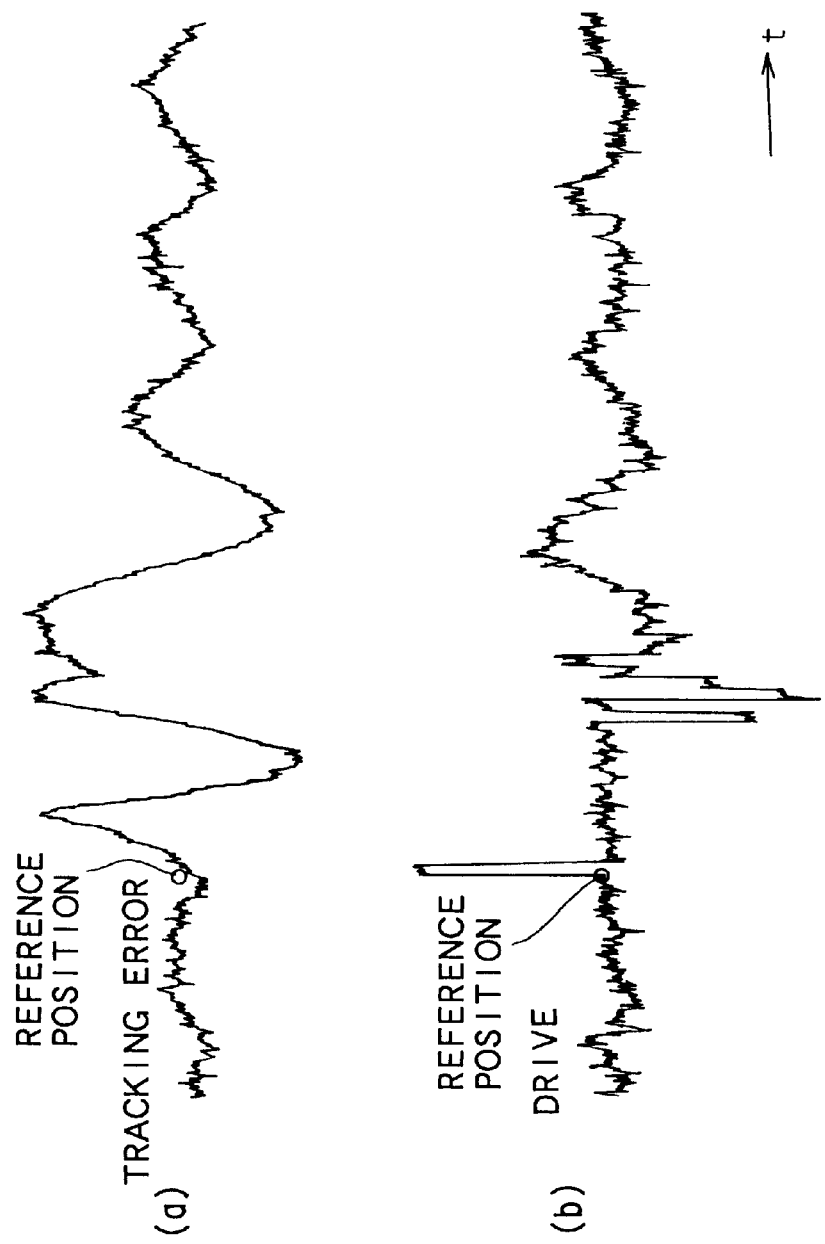
FIG. 21 is a diagram showing a result of experiment conducted with the track jump apparatus shown in FIG. 15, (a) is a diagram showing a tracking error signal in case where a feed back loop is formed during a track jump and a disturbance is applied in the acceleration direction, and (b) is a diagram showing a drive signal to be supplied to a driver of the actuator under the feed forward control and feed back control.
Figure 23:
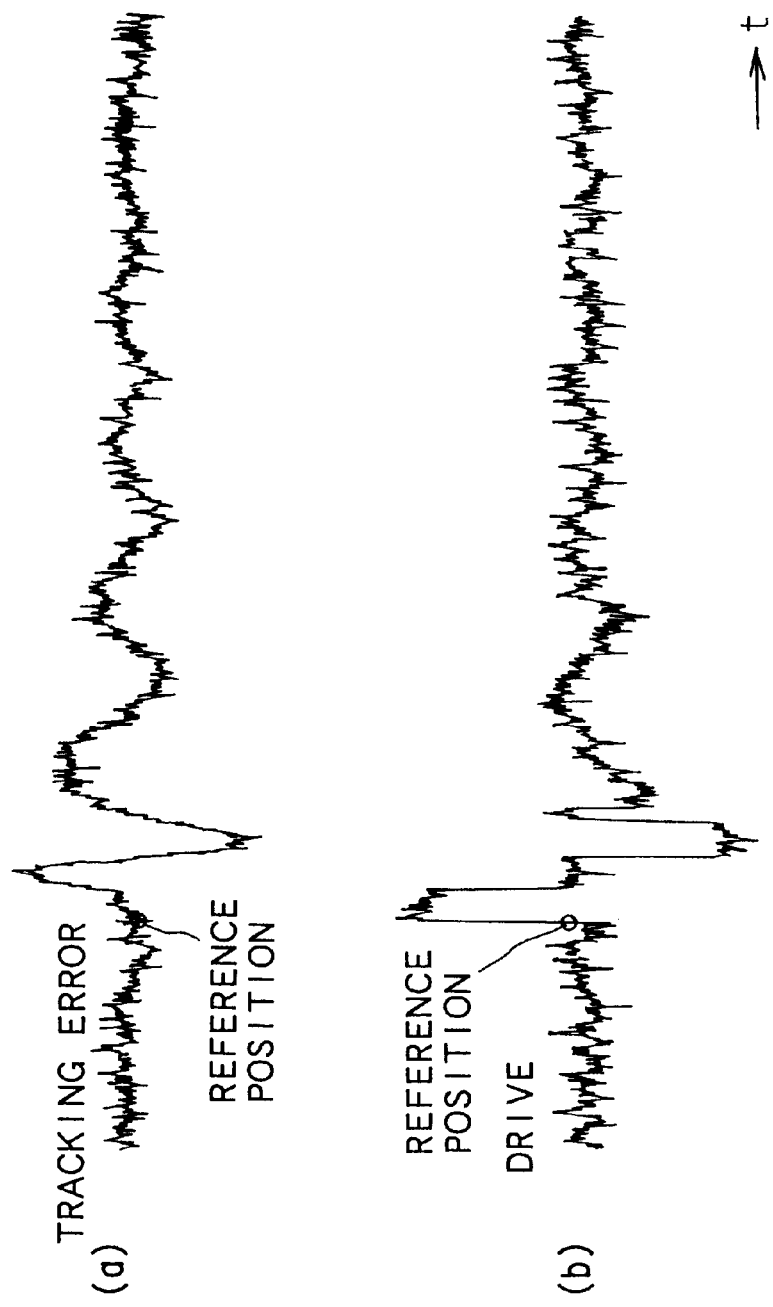
FIG. 23 is a diagram showing a result of experiment conducted with the track jump apparatus shown in FIG. 15, (a) is a diagram showing a tracking error signal in case where a feed back loop is formed during a track jump, only the feed forward control is carried out and a disturbance is applied in the deceleration direction, and (b) is a diagram showing a drive signal to be supplied to a driver of the actuator under the feed forward control.

On the other hand, FIGS. 21 and 23 show a case in which no feed back control was carried out and only the feed forward control was executed. The same condition was applied to FIGS. 19 and 20 except the fact that no feed back control was carried out. FIG. 21 is an example in which a relatively small disturbance was applied in the acceleration direction corresponding to FIG. 19 and FIG. 23 is an example in which a relatively small disturbance was applied in the deceleration direction corresponding to FIG. 20. As evident from comparison between FIG. 21 and FIG. 19, if the feed back control is carried out, even after the deceleration pulse is applied, the tracking error signal did not converge, so that it requires time for tracking servo lead-in. In case of FIG. 23, as evident from comparison with FIG. 20, the tracking error signal does not converge at all, thereby indicating that the tracking servo lead-in fails.

Figure 22:
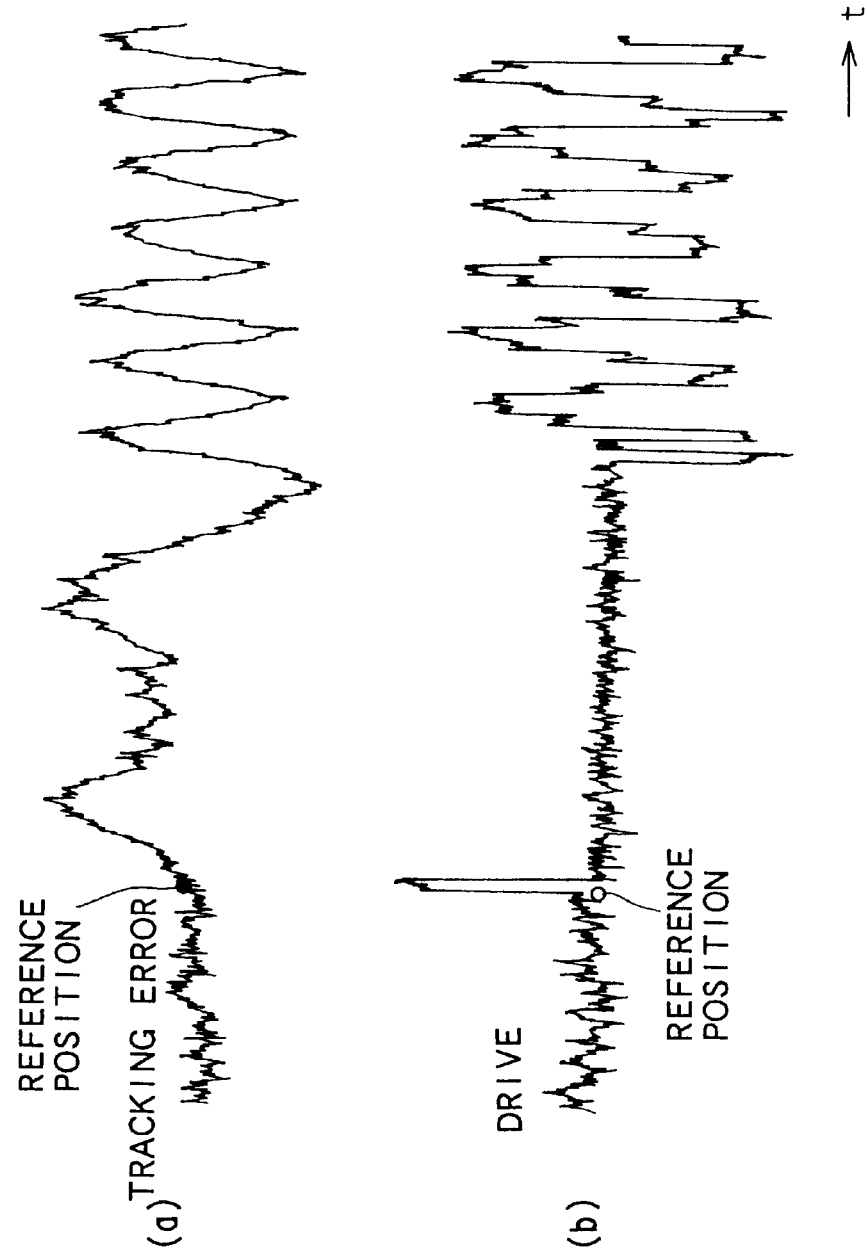
FIG. 22 is a diagram showing a result of experiment conducted with the track jump apparatus shown in FIG. 15, (a) is a diagram showing a tracking error signal in case where a feed back loop is formed during a track jump, the acceleration amount and deceleration amount are increased and a disturbance is applied in the acceleration direction, and (b) is a diagram showing a drive signal to be supplied to a driver of the actuator under that control.
Figure 24:
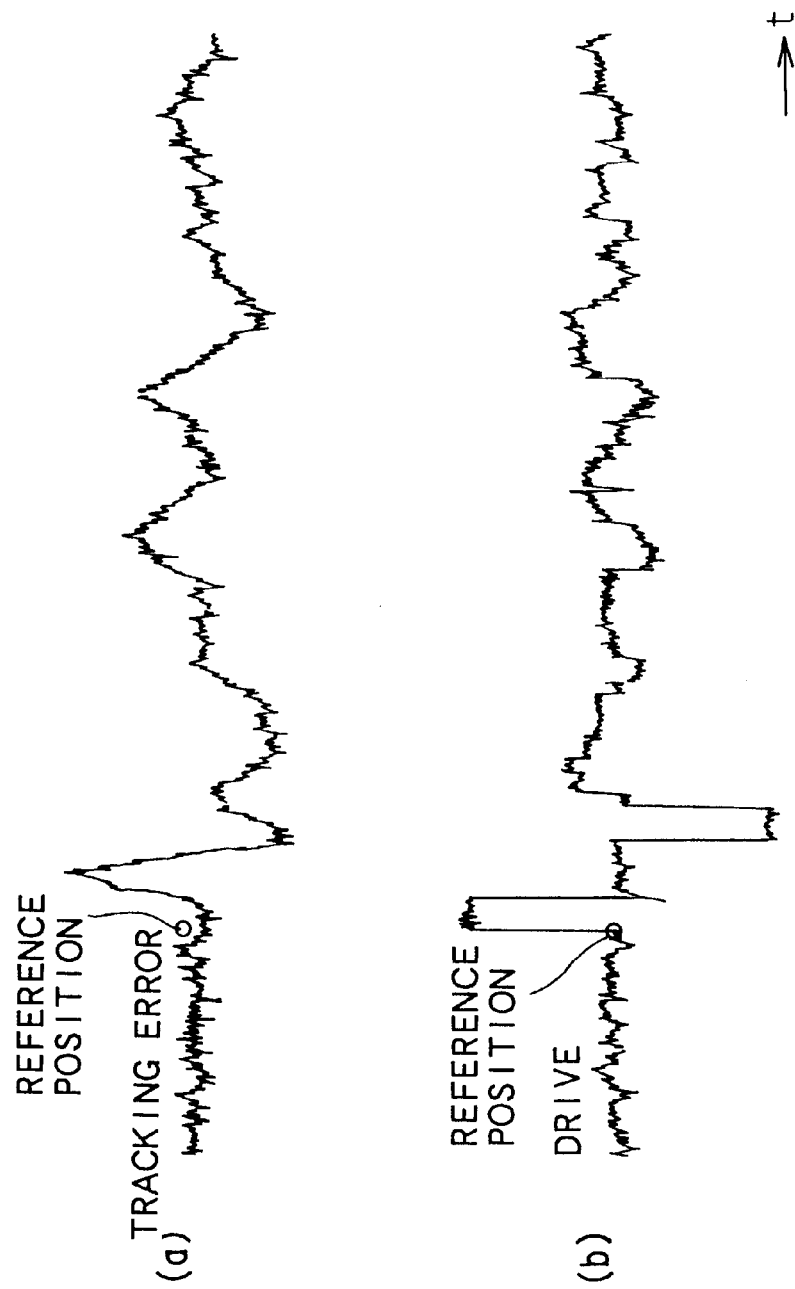
FIG. 24 is a diagram showing a result of experiment conducted with the track jump apparatus shown in FIG. 15, (a) is a diagram showing a tracking error signal in case where a feed back loop is formed during a track jump, the acceleration amount and deceleration amount are increased and a disturbance is applied in the deceleration direction, and (b) is a diagram showing a drive signal to be supplied to a driver of the actuator under that control.

FIGS. 22, 24 show a case in which the acceleration amount and deceleration amount are increased like a conventional track jump apparatus. FIG. 22 shows a case in which a disturbance was applied in the acceleration direction and FIG. 24 shows a case in which a disturbance was applied in the deceleration direction. As shown in FIG. 22(b) and FIG. 24(b), almost no constant speed period is provided between the acceleration pulse and deceleration pulse. In this example, the feed back control is not carried out. Even if the feed back control is carried out, in a case where the constant speed period does not exist like this example, an effective feed back control cannot be achieved because the control range for the track jump is as high as 2 kHz. As evident from FIGS. 22(a) and 24(a), even after a supply of the deceleration pulse ends, the tracking error signal is not stabilized.

From a result of the above experiment, it is made evident that in a case of open control, the track jump at a narrow pitch is affected by a disturbance and likely to be made unstable if its traveling speed is decreased by reducing the acceleration and deceleration. In case where a jump is carried out in a short time by increasing the acceleration/deceleration, it is made evident that the track jump is also likely to be made unstable due to a delay of the driving system or a deflection of timing.

However, in the track jump apparatus of this experiment according to the present invention, it was made evident that a stabilized track jump with some jump time was enabled by providing with a profile as an object and detecting a traveling amount each time so as to feed back it.

Although only by providing with an object profile, the band cannot be raised up to a track jump band using only a closed loop because of characteristic of the control system, according to the present invention, this problem is solved by carrying out feed forward control and further by using the feed back at the same time, a stabilized control in a high band is enabled.

Because the feed back loop is closed during a track jump so that an action just like tracking servo is ON is always executed, a shock when tracking servo is turned ON from a jump can be reduced. Therefore, after a jump ends, there is little disturbance and convergence is carried out fast. Therefore, the track jump apparatus of the present invention is effective for a digital servo system in which its sampling time or the like is restricted.

[9] MODIFICATION EXAMPLES

Next, modification examples of the present invention will be described.

Modification Example 1

According to this modification example, the track jump apparatus of this embodiment further comprises a gain controller and offset controller.

Figure 25:
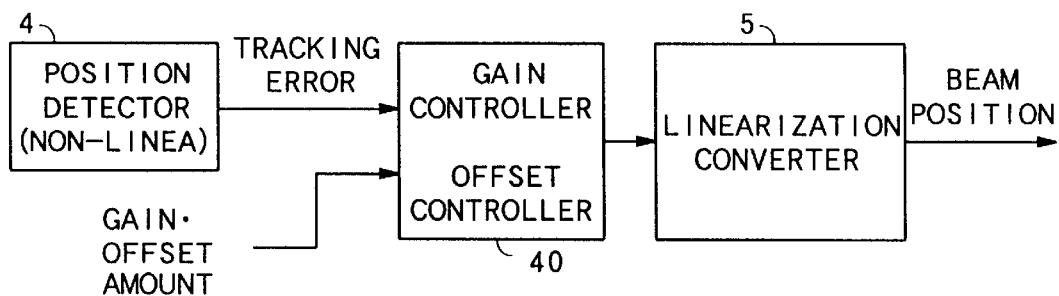
FIG. 25 is a block diagram of modification example 1 in which a gain controller/offset controller are provided in front of the linearization converter of the track jump apparatus of the first embodiment.

In the track jump apparatus of this embodiment, the feed back control during a track jump is facilitated by converting the tracking error signal linearly as described above. When a deflection occurs in the tracking error signal, a gain controller/offset controller 40 are provided in front of the linearization converter 5 as shown in FIG. 25.

In a writable recording disk such as DVD-RAM, DVD-R and the like, a gain deflection is generated in the tracking error signal in recording portion and non-recording portion. When the tracking error signal is generated according to push-pull method, direct current offset appears in the tracking error signal because of a deflection of optical axis of an objective lens, an inclination of a disk in the radius direction, imbalance of groove shape of a disk or the like. The offset also appears if there is a deflection in the disk.

Figure 26:
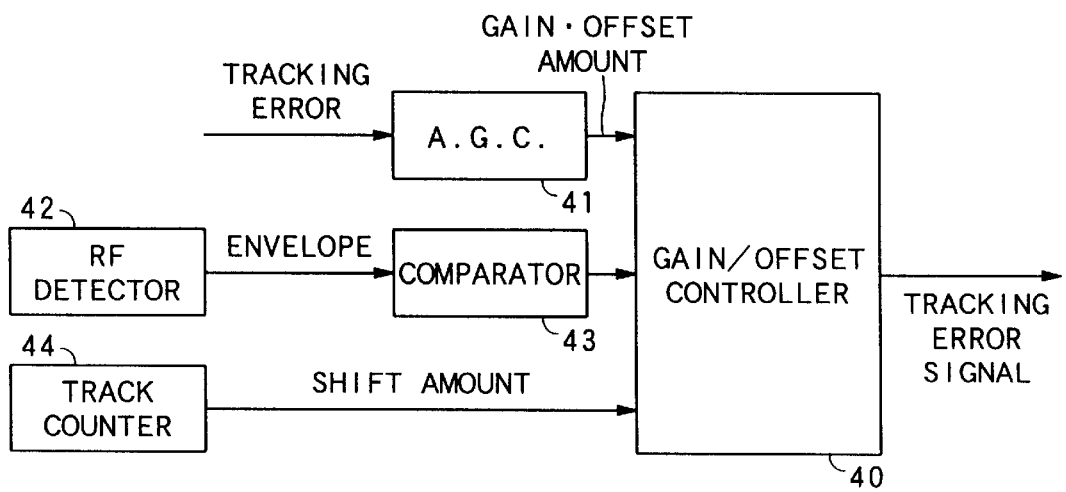
FIG. 26 is a diagram showing a detail of input signal relative to the gain controller/offset controller in FIG. 25.

In this case, as shown in FIG. 26, a maximum value, minimum value and average value of the tracking error signal are obtained by an auto gain controller (A.G.C.) 41 so as to carry out gain adjustment and offset adjustment.

A RF signal is detected in the recording portion of the aforementioned recording disk and no RF signal is detected in the non-recording portion. Thus, an envelope of the RF signal outputted from the RF detector 42 is inputted to the comparator 43 and gain adjustment is carried out so that when the RF signal is detected, gain of the tracking error signal is increased because this is the recording portion and when no RF signal is detected, the gain of the tracking error signal is decreased because it is the non-recording portion.

Figure 27:
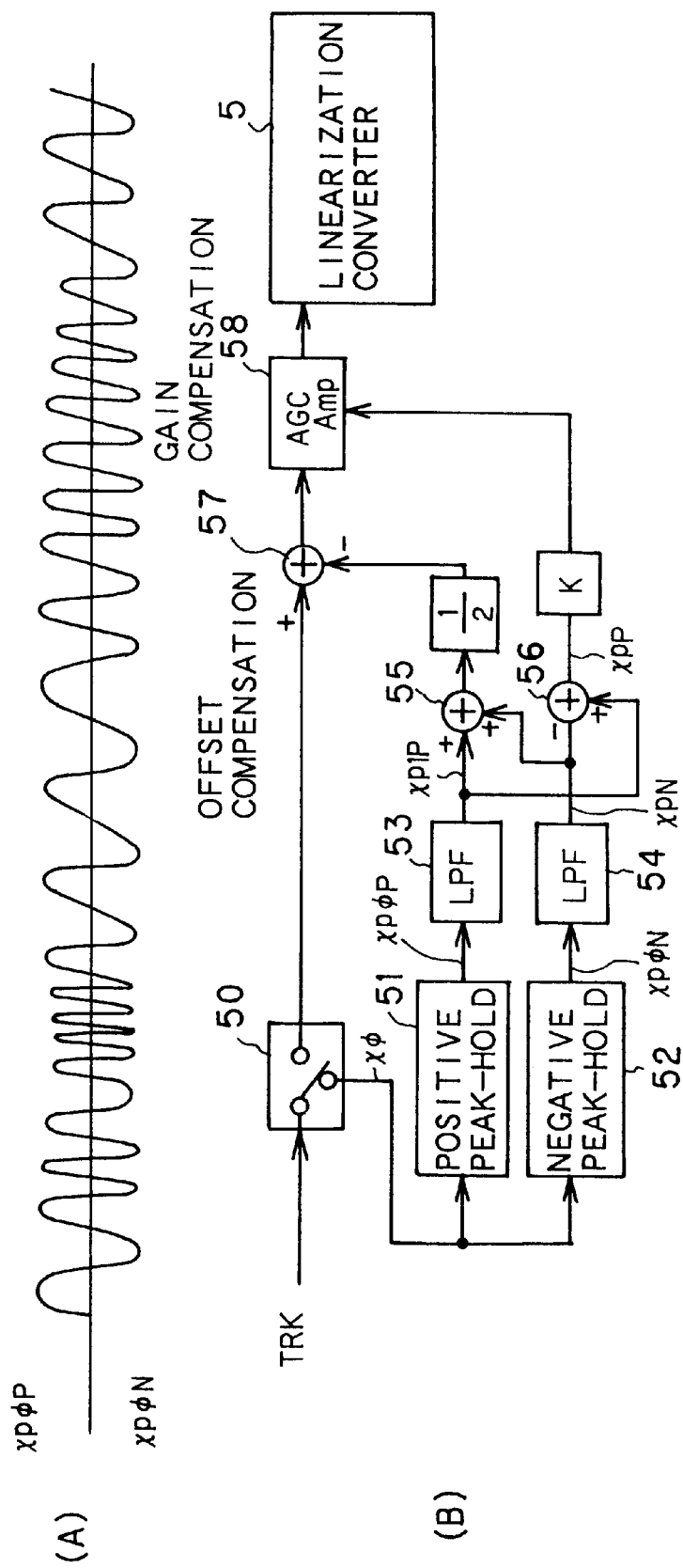
FIG. 27 are block diagrams showing (A) an example of the tracking error signal and (B) showing an example of the gain controller/offset controller.

Next, FIG. 27 shows an example of the gain controller/offset controller 40. FIG. 27(A) shows an example of the tracking error signal and FIG. 27(B) is a block diagram showing a schematic structure of the gain/offset controller using the auto gain controller (A.G.C.).

As shown in FIG. 27(B), the A.G.C. is provided with a changeover switch 50. This changeover switch 50 is capable of opening and closing the tracking servo loop temporarily. The changeover switch 50 is connected to peak hold circuits 51, 52.

The peak hold circuit 51 is a circuit for holding a positive peak value of the tracking error signal. In this circuit, if an inputted tracking error signal is smaller than previous positive peak values, a correction value LE of a very small value is subtracted from the previous positive peak value so as to regard that value as a positive peak value. If the inputted tracking error signal is larger than the previous positive peak values, this value is regarded as an updated positive peak value.

The peak hold circuit 52 is a circuit for holding a negative peak value of the tracking error signal. In this circuit, if the inputted tracking error signal is larger than a negative peak value, the aforementioned correction value LE is added to the previous negative peak value so as to regard that result as a negative peak value. On the other hand, if the inputted tracking error signal is below the negative peak value, that value is regarded as an updated negative peak value.

Because the positive peak hold circuit 51 and negative peak hold circuit 52 use a very small value LE, even if the tracking error signal changes suddenly due to noise, a stabilized peak holding can be carried out by removing noise. If the aforementioned correction value LE is increased, the follow-up performance of the peak hold is improved, and if the correction value LE is decreased, the peak hold value is stabilized. Using this characteristic, the correction value LE is increased when the peak hold is started, and the correction value LE is decreased after that. As a result, accurate peak hold can be carried out in a short time. To make the aforementioned correction value LE variable, for example, the value of a leak resistor connected in parallel to a hold capacitor is changed.

Low Pass Filters 53, 54 are connected to the aforementioned peak hold circuits 51, 52, and the low pass filters 53, 54 are connected to an adder 55 and an adder-subtractor 56.

With such a structure, outputs of the positive peak hold circuit 51 and negative peak hold circuit 52 are sawtooth shaped signals and these signals pass the low pass filters 53, 54. Thus, an output of the low pass filter 53 is a waveform which draws a upper envelope of FIG. 27(A) and an output of the low pass filter 54 is a waveform which draws a lower envelope of FIG. 27(B). By the adder 55, the waveforms which draw these envelopes are summed and then multiplied by ½, and therefore an appropriate offset level can be obtained. Because this appropriate offset level is added to the tracking error signal at the adder 57 when the tracking servo is closed, appropriate offset compensation is carried out.

On the other hand, because the waveform which draws the lower envelope is subtracted from the waveform which draws the upper envelope by the adder-subtractor 56, an average value of peak to peak of the tracking error signal can be obtained. This peak-to-peak average value is multiplied with gain K and supplied to the AGC amplifier 58. The AGC amplifier 58 decreases gain if the peak-to-peak value of the tracking error signal is larger than the average value of the aforementioned peak-to-peak value and increases gain if it is smaller than the average value. As a result, gain of the tracking error signal is compensated to be always constant.

Because gain compensation and offset compensation for the tracking error signal are carried out using the A.G.C., even if gain changes due to a deviation of sensitivity of a laser power or photo detector, the gain adjustment can be automatically achieved without provision of a gain adjustment volume. Further, although there occurs a deviation of several dB because of reflectivity of a disk and the like each time when the disk is replaced, the gain adjustment can be automatically achieved each time when the disk is replaced. As a result, even if there is a deviation in the tracking error signal, the deviation can be killed appropriately so as to carry out appropriate linearization conversion. Thus, the aforementioned stabilized track jump can be carried out.

Modification Example 2

A track jump apparatus of this modification example of this embodiment is used for a playback unit so constructed to be capable of playing back both a read only DVD-ROM and a readable/writable DVD-RAM.

Figure 28:
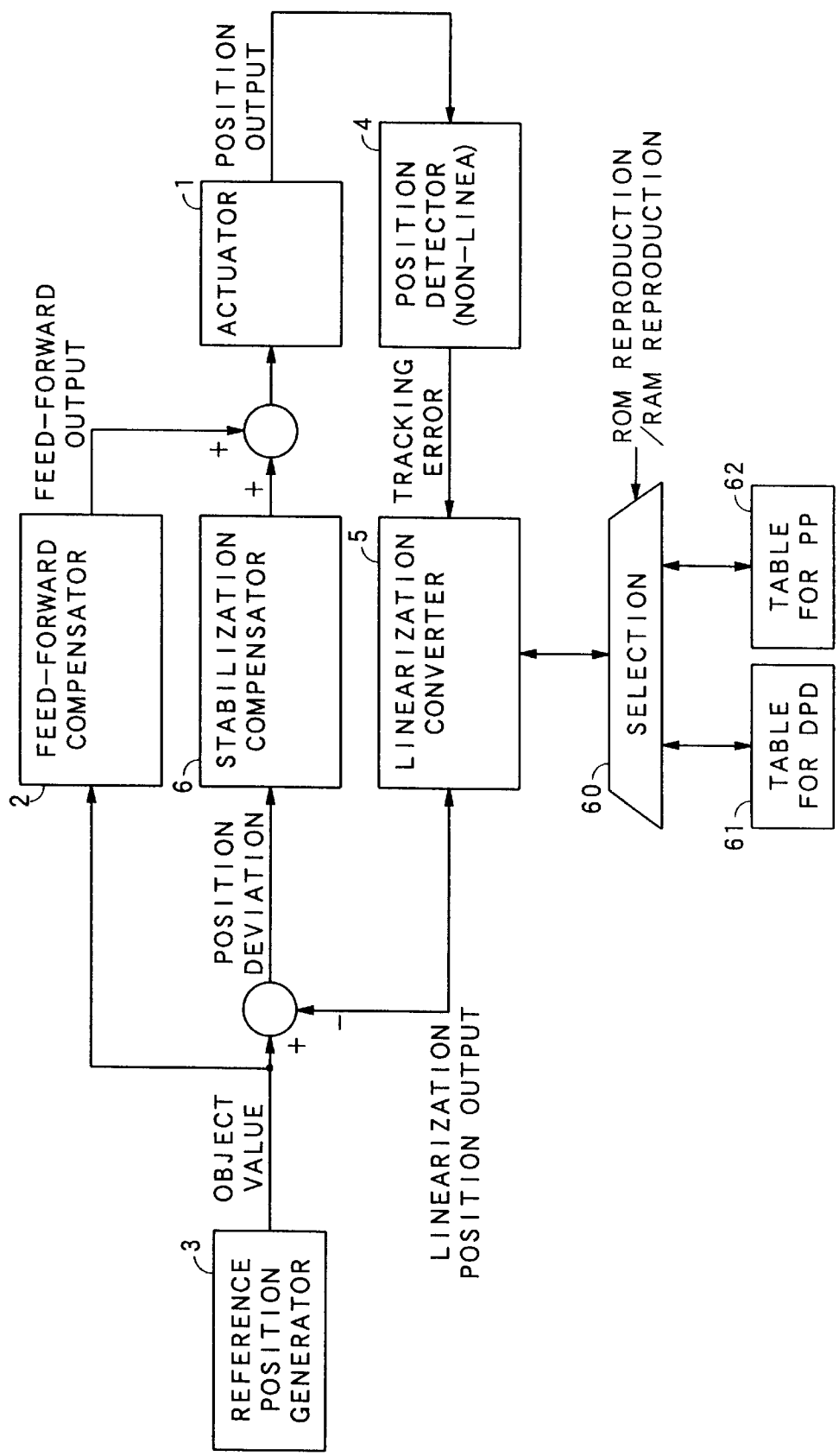
FIG. 28 is a block diagram showing a schematic structure of modification example 2 in which conversion tables for each detection method of the tracking error signal and a selector for the conversion table are provided on the track jump apparatus of the first embodiment.

FIG. 28 is a block diagram showing a schematic structure of a track jump apparatus of this modification example. As shown in FIG. 28, this track jump apparatus is different from the track jump apparatus in that it includes table portions 61, 62 such as ROM for recording linearization conversion for each kind of the tracking error signal and a conversion table selection portion 60. In this track jump apparatus, the aforementioned conversion table is changed by the conversion table selection portion 60 depending on the kind of the tracking error signal. The reference numerals are attached to the components shown in FIG. 1 and a description thereof is omitted.

Figure 29:
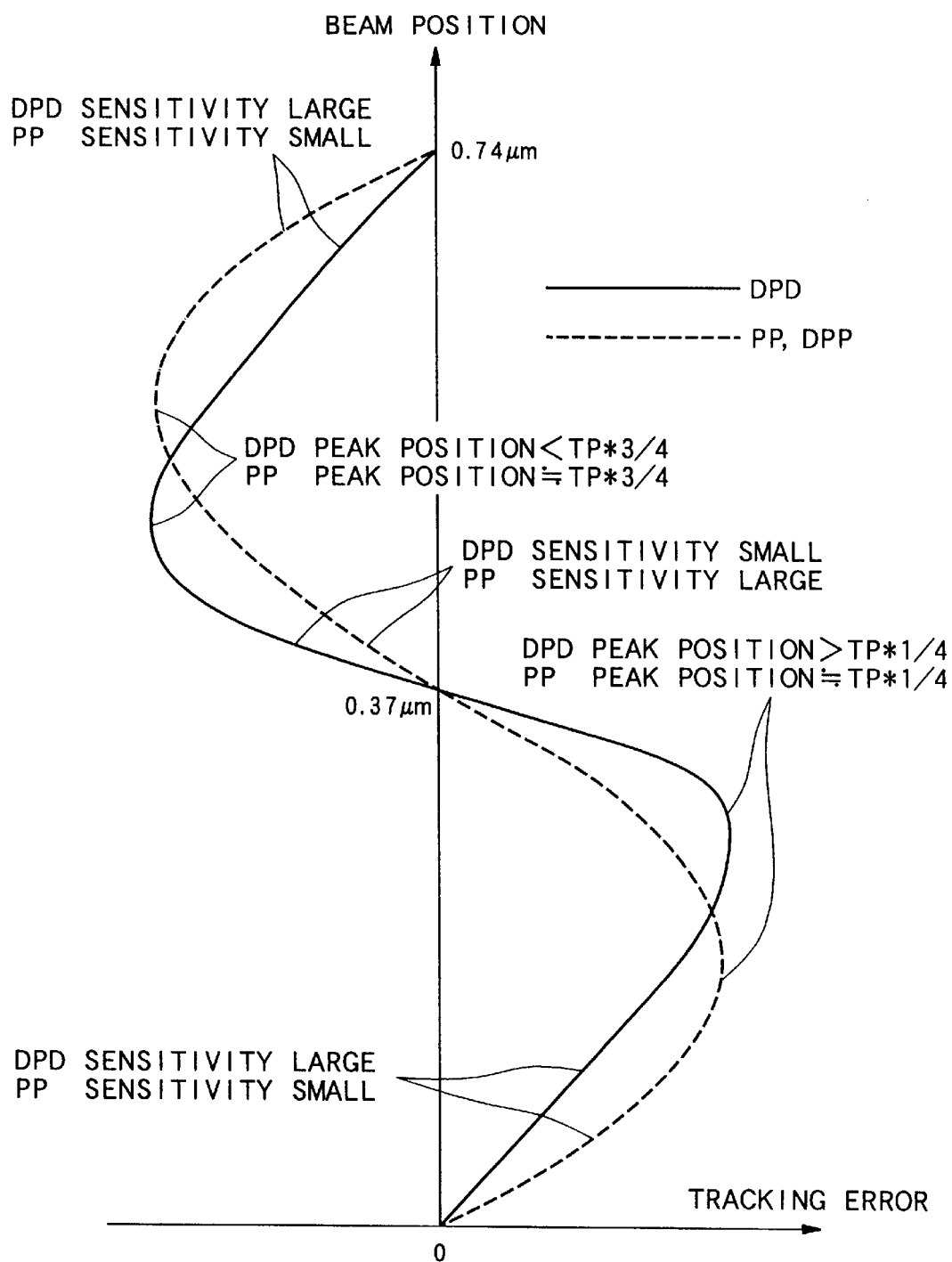
FIG. 29 is a diagram showing a tracking error signal generated by the differential phase detection method and a tracking error signal generated by the push-pull method.

Referring to FIG. 28, the DPD conversion table recorded in the table portion 61 is a conversion table for use in linearization conversion of the tracking error signal generated according to the differential phase detection (DPD) method. The DPD method is called phase difference method, according to which the tracking error signal is obtained by a phase difference of diagonal sums of main beam signal returning to a four-division detector. FIG. 29 shows an example of the tracking error signal produced according to the DPD method with solid line. As shown in FIG. 29, the tracking error signal of this case is a sawtooth shaped waveform. This method is not so affected by track pitch or signal level, therefore suitable for playback of the DVD. Currently, this is used in a playback unit for the DVD-ROM.

On the other hand, the conversion table for push-pull (PP) recorded in the table portion 62 is a table for use for linearization conversion of the tracking error signal generated according to the PP method. The PP method is a method for obtaining the tracking error signal by picking out a light reflected and diffracted by a land portion of a disk as a difference of output at two light receiving portions of a two-division detector. An example of the tracking error signal generated according to the PP method is shown with dotted line of FIG. 29. As shown in FIG. 29, the tracking error signal of this case has a sine wave shaped waveform. Because the DVD-RAM uses not only groove but also land groove format for recording information in land, it is necessary to distinguish between groove track and land track.

Thus, because in the DVD-RAM playback unit, the DPD signal cannot be detected depending on the shape of the groove, the PP method is applied.

Discrimination information indicating which a DVD of playback object is DVD-ROM or DVD-RAM is supplied to the conversion table selection portion 60 from a DVD discriminator (not shown). According to the discrimination information, the conversion table selection portion 60 selects a conversion table to be referred to by the linearization converter 5 from any one of the conversion table for DPD recorded in the table portion 61 and the conversion table for PP recorded in the table portion 62. That is, if the DVD of playback object is DVD-ROM, the conversion table for DPD is referred to by the linearization converter 5 and if the DVD of playback object is DVD-RAM, the conversion table for PP is referred to.

Because the track jump apparatus of this modification example has such a structure, either the DVD-ROM or DVD-RAM is used as the DVD of playback object and if two kinds of the tracking error signals having very different shapes are generated as shown in FIG. 29, the linearization conversion of the tracking error signal can be carried out using a conversion table corresponding to each tracking error signal. Therefore, appropriate feedback control about the position of the actuator is always carried out, so that with some extent of jump time secured even for a disk having a narrow pitch, accurate, stabilized single track jump can be achieved.

Modification Example 3

Figure 30:
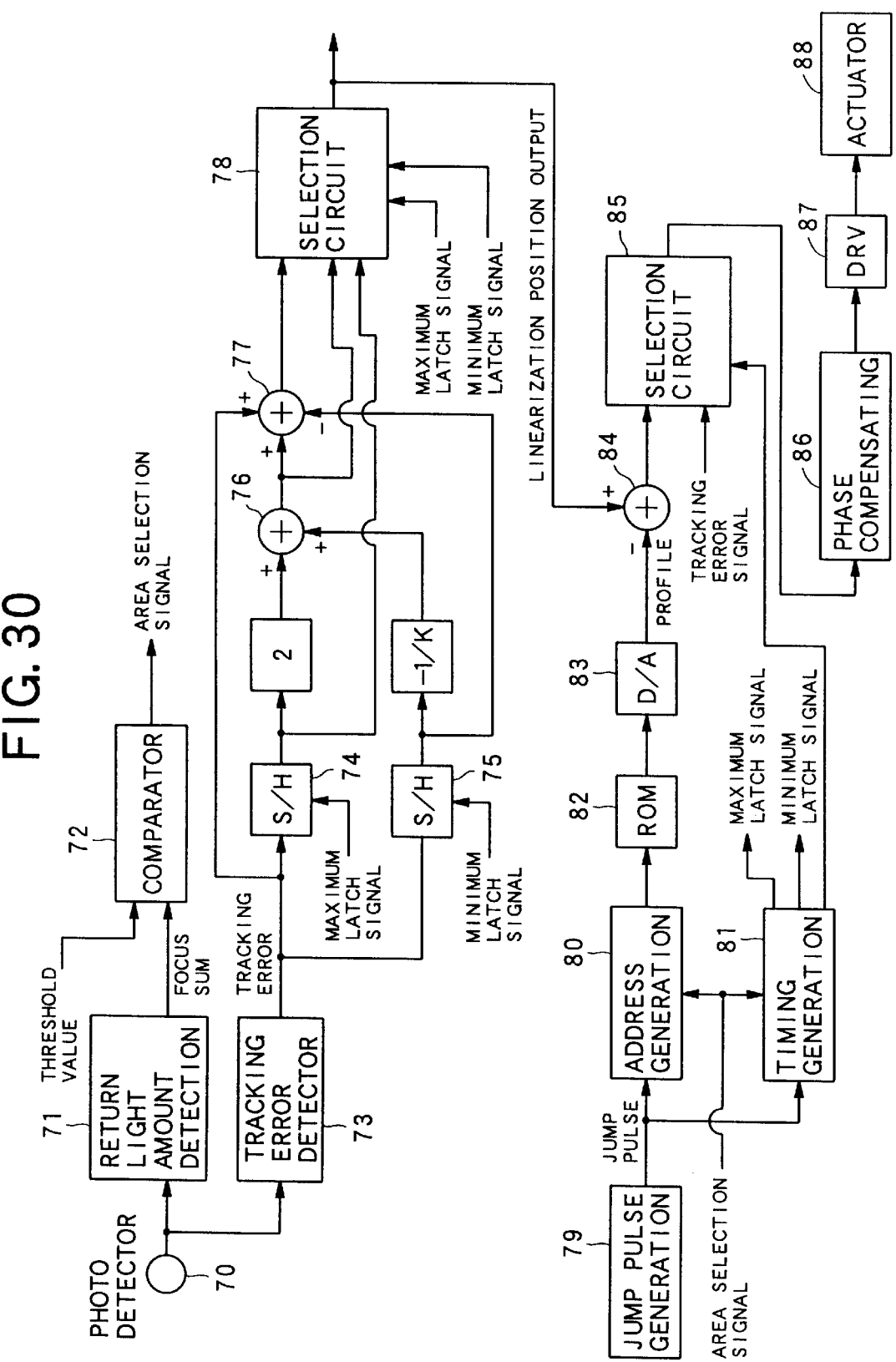
FIG. 30 is a block diagram showing a structure of an analog circuit of a linearization converter according to the first embodiment.

This modification example is an example in which the linearization converter 5 is constituted of an analog circuit. FIG. 30 is a block diagram showing a schematic structure of a linearization converter of this modification example.

Referring to FIG. 30, the photo detector 70 receives a return light from the DVD by a two-division or four-division light receiving device and outputs an electric signal corresponding to an amount of return light.

A return light amount detecting circuit 71 detects a return light amount from the DVD by a total sum of electric signal output from respective light receiving devices 7 of the photo detector 70 and outputs a focus sum signal shown in FIG. 31(E) to the comparator 72 corresponding to the amount of return light.

A predetermined threshold value is supplied to the comparator 72. The comparator 72 compares a focus sum signal with the predetermined threshold value. If the focus sum signal is larger than the threshold value, a low level area selection signal is outputted. If the focus sum signal is smaller than the threshold value, a high level area selection signal is outputted. As a result, an area selection signal which changes in a style of low level-high level-low level as shown in FIG. 31(D) is obtained from the comparator 72. This area selection signal is supplied to a timing generation circuit which will be described later.

On the other hand, a tracking error signal detecting circuit 73 outputs a tracking error signal shown in FIG. 31(F) based on an output signal of each light receiving device of the photo detector 70.

A tracking error signal outputted from the tracking error signal detecting circuit 73 is supplied to a sample hold circuit 74. As a result, when a maximum latch signal described later becomes high level, the supplied tracking error signal value is held. If the maximum latch signal is of low level, a supplied tracking error signal is outputted just as it is.

A tracking error signal outputted from the tracking error signal detecting circuit 73 is also supplied to a sample hold circuit 75. As a result, when a minimum latch signal described later becomes high level, the supplied tracking error signal value is held. If the minimum latch signal is of low level, the supplied tracking error signal is outputted just as it is.

An output of the sample hold circuit 74 is supplied to a selection circuit 78 as it is and at the same time, multiplied by two and supplied to an adding circuit 76. On the other hand, an output of the sample hold circuit 75 is supplied to an adding/subtracting circuit 72 as a subtraction input and at the same time multiplied by −1/K and supplied to an adding circuit 76. An output of the adding circuit 76 is supplied to the aforementioned adding/subtracting circuit 77 as an addition input and at the same time, supplied to the aforementioned selection circuit 78. Further, an output of the tracking error signal detecting circuit 73 is supplied directly to the adding/subtracting circuit 77 and an output of the adding/subtracting circuit 77 is supplied to the selection circuit 78.

An output of the sample hold circuit 74, an output of the adding circuit 76 and an output of the adding/subtracting circuit 77 are supplied to the selection circuit 78. When a maximum latch signal and minimum latch signal are of low level, the output of the sample hold circuit 74 is selected. Further, if the maximum latch signal becomes high level, the output of the adding circuit 76 is selected. If the maximum latch signal and minimum latch signal become high level, the output of the adding/subtracting circuit 77 is selected. Each of the selected outputs is supplied to an adding/subtracting circuit 84 described later as a linearization position output shown in FIG. 31(G).

A jump pulse generating circuit 79 outputs a jump pulse comprising acceleration pulse and deceleration pulse as shown in FIG. 31(A). A constant speed period is provided between the acceleration pulse and deceleration pulse and the deceleration pulse is outputted in a short time just before the tracking servo is led in.

Figure 31B:
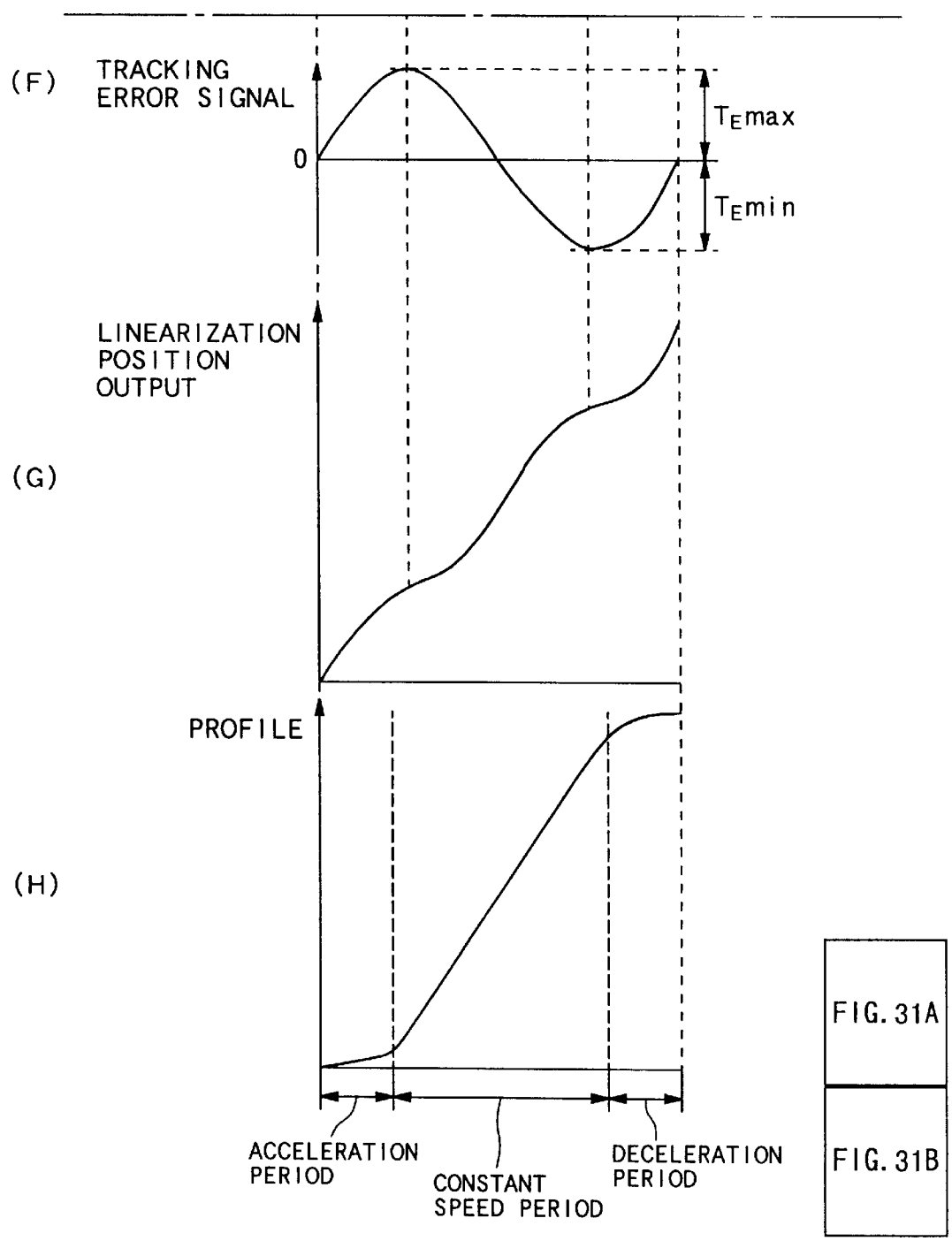
FIG. 31 is a diagram showing waveforms of various signals in a linearization converter, FIG. 31A are diagrams showing (A) a waveform of a jump pulse to be inputted, (B) a waveform diagram of a maximum latch signal, (C) a waveform diagram of a minimum latch signal, (D) a waveform diagram of an area selection signal, and (E) a waveform diagram of a focus sum, FIG. 31B are diagrams showing (F) a waveform of a tracking error signal, (G) a waveform of a linearization position output, and (H) a waveform diagram showing a profile.

According to the area selection signal supplied from the comparator 72 and a jump pulse outputted from the jump pulse generating circuit 79, a timing generation circuit 81 outputs a maximum latch signal, minimum latch signal, and servo close/open control signal. More specifically, when the area selection signal is of low level and the deceleration pulse ends, a control signal for closing the servo is outputted. If an acceleration pulse is outputted when the area selection signal is of low level, a control signal for opening the servo is outputted. Until the deceleration pulse ends after the area selection signal is changed from low level to high level, as shown in FIG. 31(B), the maximum latch signal is changed from low level to high level. Until the deceleration pulse ends after the area selection signal is changed from high level to low level, as shown in FIG. 31 (C), the minimum latch signal is changed from low level to high level. Then, when the deceleration pulse ends, the maximum latch signal and minimum latch signal become low level and at the same time, a control signal for closing the servo is outputted. The maximum latch signal is supplied to the aforementioned sample hold circuit 74 and selection circuit 78 and the minimum latch signal is supplied to the sample hold circuit 75 and selection circuit 78. A servo close/open control signal is supplied to a selection circuit 85 described later.

An address generation circuit 80 outputs address data for outputting a profile corresponding to an output of the jump pulse generation circuit 79. More specifically, if the acceleration pulse is outputted, an address of a profile table for an acceleration period is outputted. If the acceleration pulse ends, an address of a profile table of the constant speed period is outputted. If the deceleration pulse is outputted, an address of a profile table of a deceleration period is outputted.

In a ROM 82, respective profiles of the acceleration period, constant speed period and deceleration period are memorized with a predetermined address at a head and according to address data outputted from the aforementioned address generation circuit, digital values of the profile tables are outputted in succession.

A D/A conversion circuit 83 converts a digital value of a profile table outputted from the ROM 82 to analog value. As a result, a profile shown in FIG. 30 is outputted from the D/A conversion circuit 83 and supplied to an adding/subtracting circuit 84 as a subtraction input.

The adding/subtracting circuit 84 compares a linearization position output shown in FIG. 31(G) outputted from the aforementioned selection circuit 78 with the aforementioned profile and supplies a differential therebetween to a selection circuit 85 as a position deviation.

The selection circuit 85 selects any of a tracking error signal outputted from the tracking error signal detecting circuit 73 and a position deviation outputted from the aforementioned adding/subtracting circuit 84 based on a close/open control signal of the tracking servo outputted from the timing generation circuit 81 and outputs the selected one to a phase compensation circuit 86. If a control signal for closing the servo is outputted from the timing generation circuit 81, the tracking error signal itself is supplied to the phase compensating circuit 86 so as to carry out the tracking servo control. If a control signal for opening the servo is outputted from the timing generation circuit 81, a position deviation outputted from the adding/subtracting circuit 84 is supplied to the phase compensating circuit 86 so as to achieve feed back control upon track jump.

The phase compensating circuit 86 outputs a drive signal to the driver 87 to approach a tracking error signal supplied from the selection circuit 85 or phase deviation to zero.

The driver 87 moves an actuator 88 corresponding to a drive signal supplied from the phase compensating circuit 86 and then, the actuator 88 is so controlled to jump toward an object track or follow up an object track.

Next, linearization conversion processing with a linearization converter having such a structure will be described in detail.

If an acceleration pulse is outputted from the jump pulse generation circuit 79 as shown in FIG. 31(A), address data of a profile table for the acceleration period is outputted from the address generation circuit 80 successively and digital value of a profile table for the acceleration period is outputted from the ROM 82. This digital value is converted and outputted by the D/A conversion circuit 83 so as to obtain a profile output as shown in FIG. 31(H). Although the profile output is supplied to the adding/subtracting circuit 84 and compared with a linearization position output, because the linearization position output has not yet been obtained here, a position deviation minus that of the profile output is supplied to the phase compensating circuit 86. As a result, the phase compensating circuit 86 outputs a drive signal to the driver 87 to move the actuator 88 in a positive direction for jump and the actuator 88 starts to jump.

As a result, because a position of the objective lens with respect to a track changes, the output value of the photo detector 70 is converted and in the tracking error signal detecting circuit 73, a tracking error signal as shown in FIG. 31(F) is generated. On the other hand, in the return light amount detecting circuit 73, a focus sum signal as shown in FIG. 31(E) is obtained and outputted to the comparator 72. Because the focus sum is larger than a predetermined threshold value as evident from FIG. 31(E), a low level area selection signal is outputted from the comparator 72 to the timing generation circuit 81.

Because in the timing generation circuit 81, the area selection signal is of low level and this is in acceleration pulse output period, both the maximum latch signal and minimum latch signal are set to low level.

Because the maximum latch signal is of low level although this is supplied to the sample hold circuit 74, it is not held by the sample hold circuit 74, but the tracking error signal is outputted from the sample hold circuit 74. On the other hand, the maximum latch signal and minimum latch signal are supplied to the selection circuit 78. Because the these latch signals are of low level, the selection circuit 78 selects an output signal of the sample hold circuit 74 as an input signal and outputs to the adding/subtracting circuit 84. As a result, the tracking error signal is outputted from the selection circuit 78 and a linearization position output is obtained as shown in FIG. 31(G). Then, in the adding/subtracting circuit 84, the linearization position output is compared with the profile and a differential thereof is supplied from the selection circuit 85 to the phase compensating circuit 86 as a position deviation. The phase compensating circuit 86 outputs a drive signal for moving the actuator 88 in a positive direction of jump to the driver 87.

The same processing is repeated, so that a tracking error signal as shown in FIG. 31(F), a linearization position output as shown in FIG. 31(G) and a profile as shown in FIG. 31(H) are obtained. If a predetermined time elapses after a track jump starts, the acceleration pulse ends as shown in FIG. 31(A), however the maximum latch signal and minimum latch signal remain low level. Further, a processing described below is repeated.

However, if the actuator 88 reaches a border between area 1 and area 2 and then moves to area 2, the focus sum outputted from the return light amount detecting circuit 71 becomes smaller than the threshold as shown in FIG. 31(E). An area selection signal outputted from the comparator 72 is changed from low level to high level as shown in FIG. 31(D). The maximum latch signal outputted from the timing generation circuit 81 is changed from low level to high level by a change of this area selection signal and outputted to the sample hold circuit 74. Therefore, the sample hold circuit 74 holds and outputs a positive maximum value TEmax of the tracking error signal as shown in FIG. 31(F). An output of this sample hold circuit 74 is doubled and supplied to the adding circuit 76. On the other hand, because the minimum latch signal remains low level, the tracking error signal is outputted from the sample hold circuit 75 and multiplied with −1/K and then supplied to the adding circuit 76. Therefore, assuming that a value of the tracking error signal is TE, an output of the adding circuit 76 is as follows.

$$2|TE\text{max}|-(1/K)|TE| \qquad (15)$$

Because the maximum latch signal becomes high level, the selection circuit 78 selects an output of the adding circuit 76 as an input signal of the selection circuit 78. Thus, a result of the aforementioned formula (15) is supplied to the adding/subtracting circuit 84 as a linearization position output. The linearization position output at this time is obtained by subtracting a tracking error signal multiplied with (1/K) from a double the positive maximum value Temax of the tracking error signal. Thus, the linearization position output increases drawing a trajectory approximate to a straight line in area 2 as shown in FIG. 31(G).

Because the jump pulse does not output a pulse as a constant speed period after the acceleration pule ends, a straight line profile having a predetermined gradient is obtained from the D/A converter 83 as shown in FIG. 31(H). Therefore, because the feedback control is carried out based on a position deviation between such a linearization profile and an increased linearization position output drawing a trajectory approximate to a straight line as described above, even if a disturbance occurs, the actuator 88 can be moved along that profile.

Next, if the actuator 88 reaches a border between area 2 and area 3 and moves to area 3, the focus sum becomes larger than the threshold value as shown in FIG. 31(E). As a result, the area selection signal outputted from the comparator 72 changes from high level to low level as shown in FIG. 31(D) and the timing generation circuit 81 changes the minimum latch signal from low level to high level as shown in FIG. 31(C). This high level maximum latch signal is supplied to the sample hold circuit 75 and the sample hold circuit 75 holds and outputs a negative maximum value TEmin of the tracking error signal as shown in FIG. 31(F). As a result, an output of the adding circuit 76 is as follows.

$$2|TEmax|-(1/K)|TEmin| \tag{16}$$

Then, the minimum latch signal of high level is supplied to the selection circuit 78 and the selection circuit 78 selects an output of the adding/subtracting circuit 77 as an input signal. A result of the aforementioned formula (16) which is an output of the adding circuit 76 and the tracking error signal are supplied as an addition input and a negative maximum value TEmin of the aforementioned tracking error signal is supplied as a subtraction input to the adding/subtracting circuit 77. Therefore, assuming that a value of the tracking error signal is TE, an output of the adding/subtracting circuit 77 is as follows.

$$2|TEmax|-(1+1/K)|TEmin|+TE| \tag{17}$$

The TEmax is positive and TEmin is negative and in area 3, the value of the tracking error signal is negative. Thus, assuming that the value of TEmax is equal to that of TEmin, the aforementioned formula (17) is as follows.

$$\{3+(1/K)\}TEmax-TE \tag{18}$$

Because the tracking error signal is subtracted from a value of $\{3+(1/K)\}$ times the Temax, the linearization position output draws a trajectory which gradually increases as shown in FIG. 31(G). Further, because in area 3, the deceleration pulse is outputted as shown in FIG. 31(A), the tracking error signal reaches an object value in an appropriate time as shown in FIG. 31(F). Then, if the deceleration pulse ends, a control signal for closing the servo is outputted from the timing generation circuit 81 to the selection circuit 85, the selection circuit 85 supplies the tracking error signal to the phase compensating circuit 86 as a deviation. As a result, a tracking servo loop is formed so as to carry out tracking servo.

Because as described above, even if an analog circuit is used, a linearization converter can be constructed so that linearization conversion of the tracking error signal can be carried out appropriately, appropriate feedback control about the position of the actuator is always achieved. With some jump time secured for even a disk having a narrow pitch, accurate, stabilized single track jump can be carried out.

(Second Embodiment)

Next, a second embodiment of the present invention will be described with reference to FIGS. 32, 33. Like reference numerals are attached to the same components as the first embodiment and a description thereof is omitted.

Although according to the first embodiment, after the tracking error signal is linearization converted, it is compared to a profile having a linearization area, a track jump apparatus of this embodiment does not carry out linearization conversion but uses a tracking error signal obtained from a position detector just as it is. Thus, an object value for feed back is not a profile for use in feed forward control unlike the first embodiment, but a reference signal equal to sine wave or sawtooth shaped tracking error signal.

On the other hand, like the first embodiment, an acceleration period in which the actuator 1 moves gradually, a constant speed period in which the actuator moves at a constant speed after the acceleration period and a profile in which the actuator decelerates gradually after the constant speed period are supplied to a feed-forward compensator 2. Thus, no pulse is outputted from the feed forward compensator 2 in a predetermined period after the acceleration pulse is outputted. Instead, after a predetermined period just before servo lead-in ends, feed-forward output for outputting the deceleration pulse is obtained.

Figure 32:
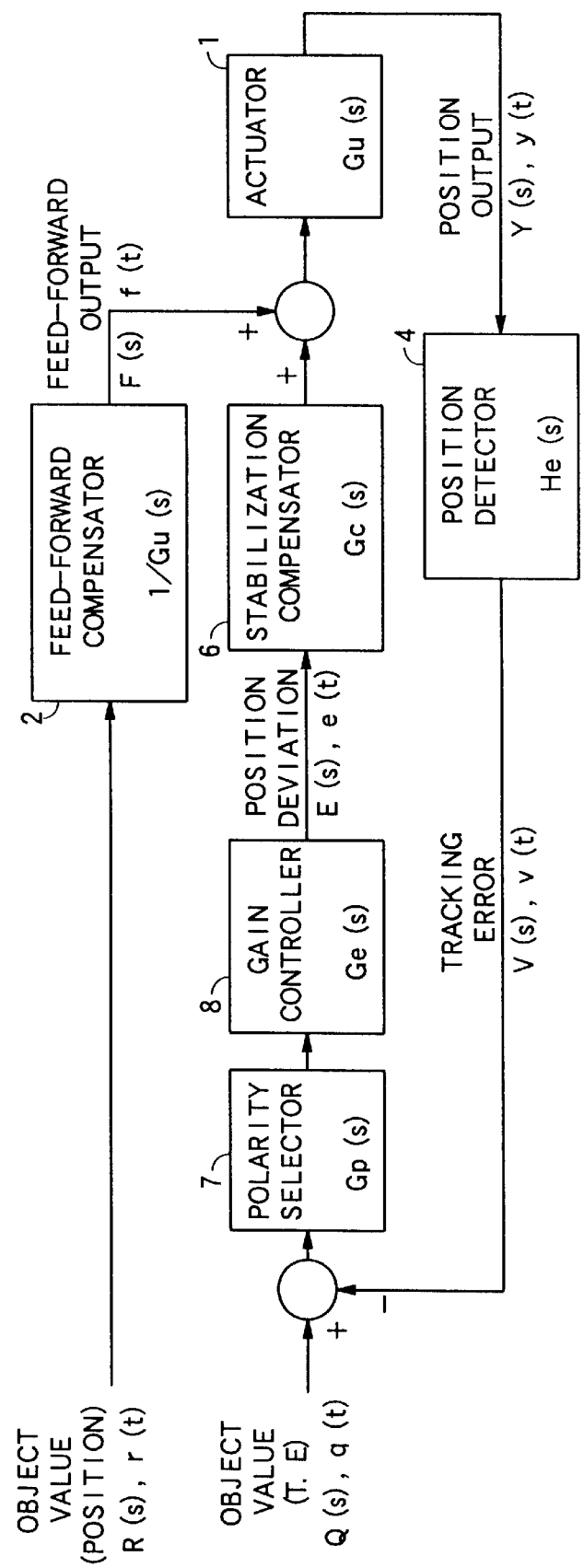
FIG. 32 is a block diagram showing a structure of a track jump apparatus according to a second embodiment of the present invention.

FIG. 32 is a block diagram showing a schematic structure of a track jump apparatus of this embodiment. Like reference numerals are attached to the same components as shown FIG. 1 and a description thereof is omitted.

As shown in FIG. 32, in the track jump apparatus of this embodiment, the tracking error signal outputted from the position detector 4 is not linearization converted but used for comparing directly with an object value.

A polarity selector 7 is a means for selecting a reference signal as an object value and the polarity of a position deviation obtained as a result of comparison with the tracking error signal. An output of this polarity selector 7 is supplied to the gain controller 8.

The gain controller 8 is a means for adjusting gain of a position deviation whose polarity is changed over by the aforementioned polarity selector 7 for each area and depending on the tracking error level. An output of the gain controller 8 is supplied to the stabilization compensator 6 as a position deviation.

Figure 33:
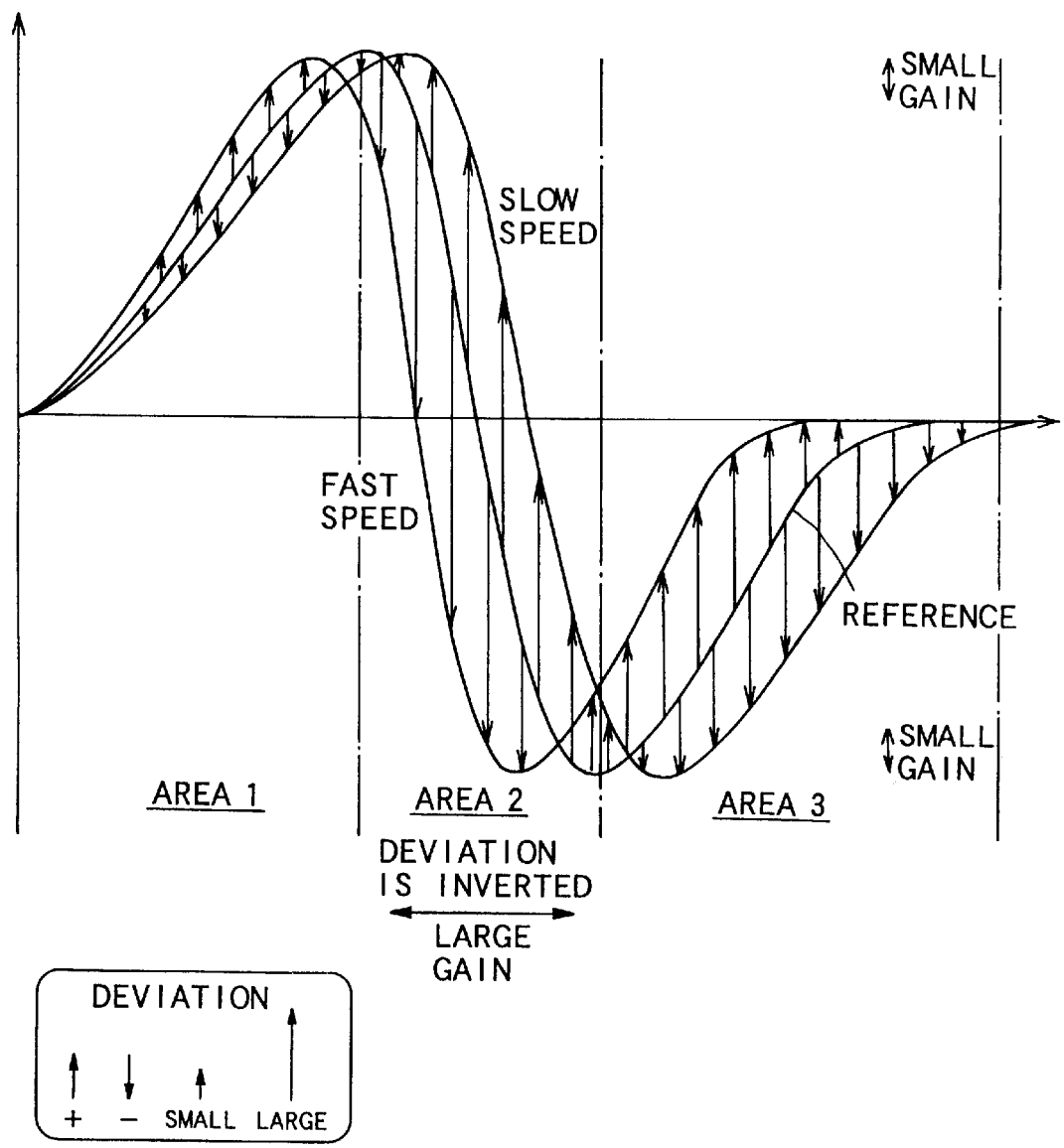
FIG. 33 is a block diagram showing a deviation between a reference signal and a tracking error signal, which are object values in the track jump apparatus of FIG. 32.

FIG. 33 shows a reference signal as an object value, a tracking error signal obtained when the actuator 1 moves at a speed faster than a constant speed of the aforementioned profile and a tracking error signal obtained when the actuator 1 moves at a speed slower than the constant speed of the aforementioned profile.

If the tracking error signals and reference signals are compared with respect to cases in which the actuator 1 moves at the faster speed or slower speed in FIG. 33, it is evident that the polarity of the deviation is opposite between area 1/area 3 and area 2. Then, in the polarity selector 7 of this embodiment, the polarity of the deviation obtained in area 2 is inverted so as to equalize the polarity of the deviation.

Because change rates of the reference signal and tracking error signal decrease near a border of each area, gain of the deviation drops. In the gain controller 8 of this embodiment, after the area is changed over, the gain of the deviation is increased in a predetermined period. It is permissible to so construct that the gain changes depending on the tracking error level.

With such a structure, even if the tracking error signal as a control amount and the reference signal as an object value are both non-linearization signals, because the respective signals can be approximated to linearization if they are seen in each area, apparent frequency band can be reduced, thereby making it possible to achieve feed-back control during a track jump.

Therefore, appropriate feed-back control about the actuator position is carried out, so that accurate stabilized single track jump can be carried out even for a disk having a narrow pitch with some jump time secured.

In this embodiment also, area changeover by peak detection or using the focus sum can be achieved like the first embodiment.

This embodiment is the same as the first embodiment in that feedback control is carried out using the tracking error signal. Like the first embodiment, it is permissible to suppress a deflection of the tracking error signal by providing a gain/offset controller in back of the position detector 4.

If the track jump apparatus of this embodiment is used in a playback unit so constructed to be capable of playing back any DVD of a read only DVD-ROM and readable/writable DVD-RAM, it is so constructed that the reference signal can be outputted in any waveform of a tracking error signal based on the DPD method and a tracking error signal based on the PP method and the reference signal is selected depending on a DVD of playback object. More specifically, if the playback object is DVD-ROM, the tracking error signal based on the DPD method is selected as a reference signal and if the playback object is DVD-RAM, the tracking error signal based on the PP method is selected as the reference signal.

(Third Embodiment)

Next, a third embodiment of the present invention will be described with reference to FIGS. 34–40. This embodiment is different from the aforementioned first and second embodiments and the present invention is applied to a unit for achieving multi-track jump.

Figure 34:
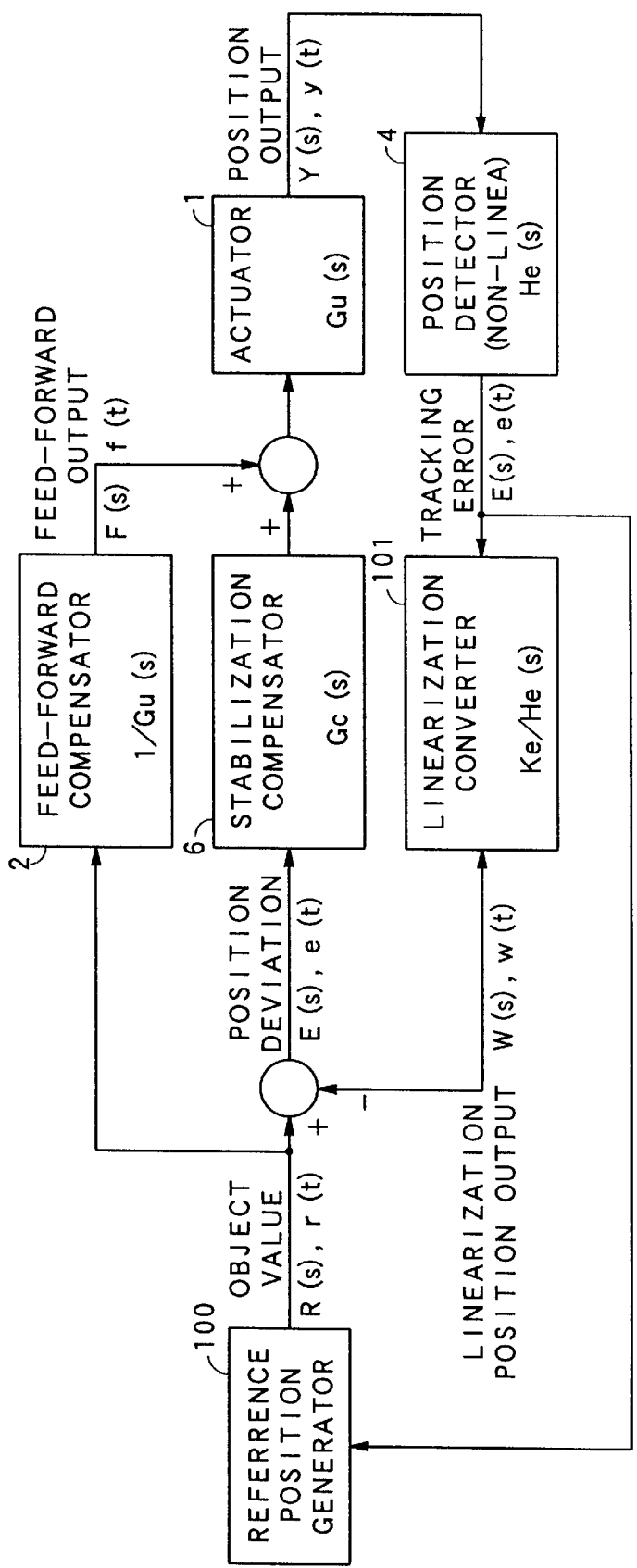
FIG. 34 is a block diagram showing a structure of a track jump apparatus according to a third embodiment of the present invention.
Figure 35:
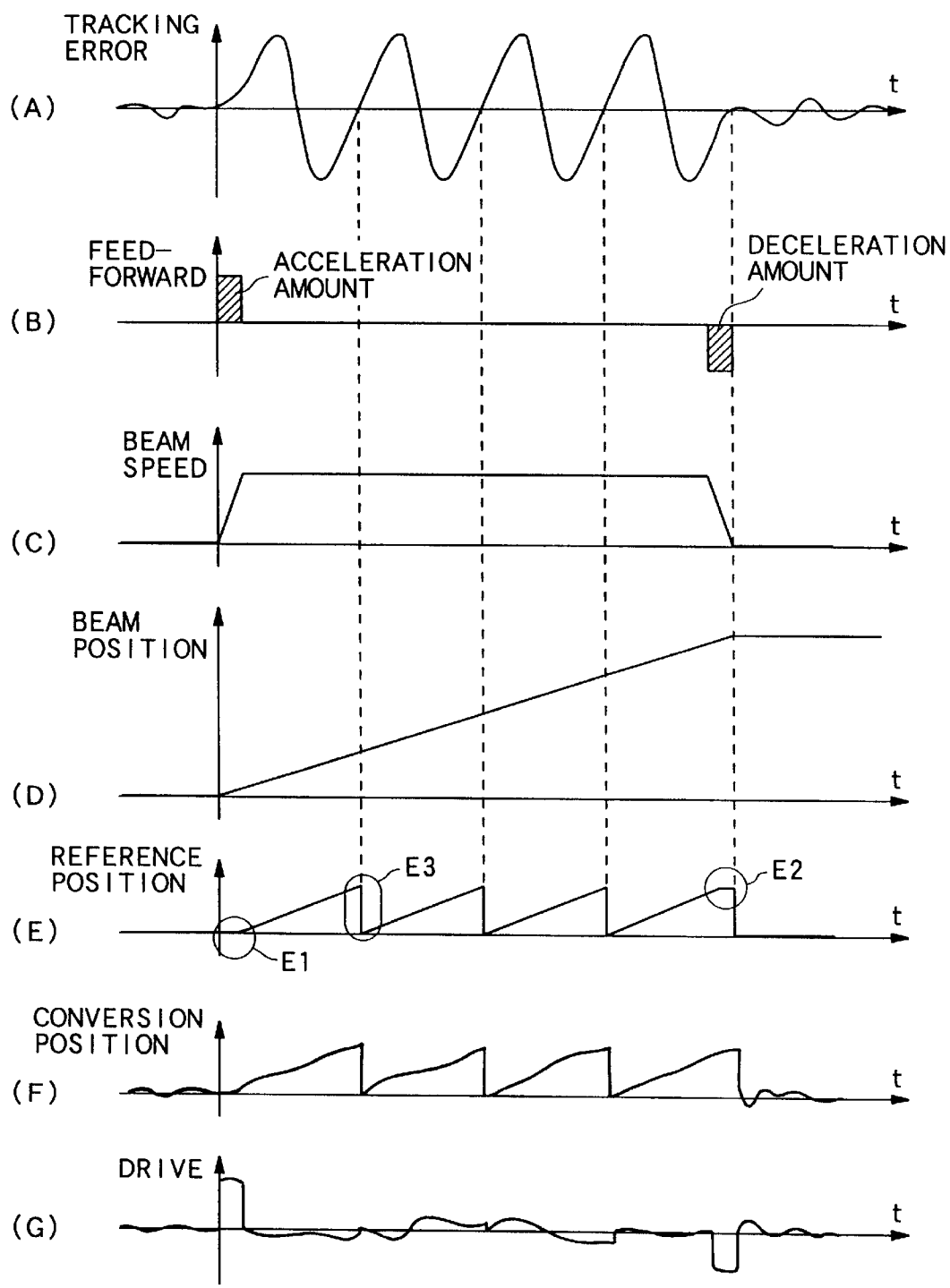
FIG. 35 is a diagram showing waveforms of various signals in the track jump apparatus of FIG. 34, (A) is a waveform diagram of the tracking error signal, (B) is a waveform diagram of a feed forward output, (C) is a waveform diagram of speed change, (D) is a waveform diagram of a beam position, (E) is a waveform diagram of a reference position, (F) is a waveform diagram of a linearization position output, and (G) is a waveform diagram of a drive signal to be inputted to a driver of an actuator.
Figure 36:
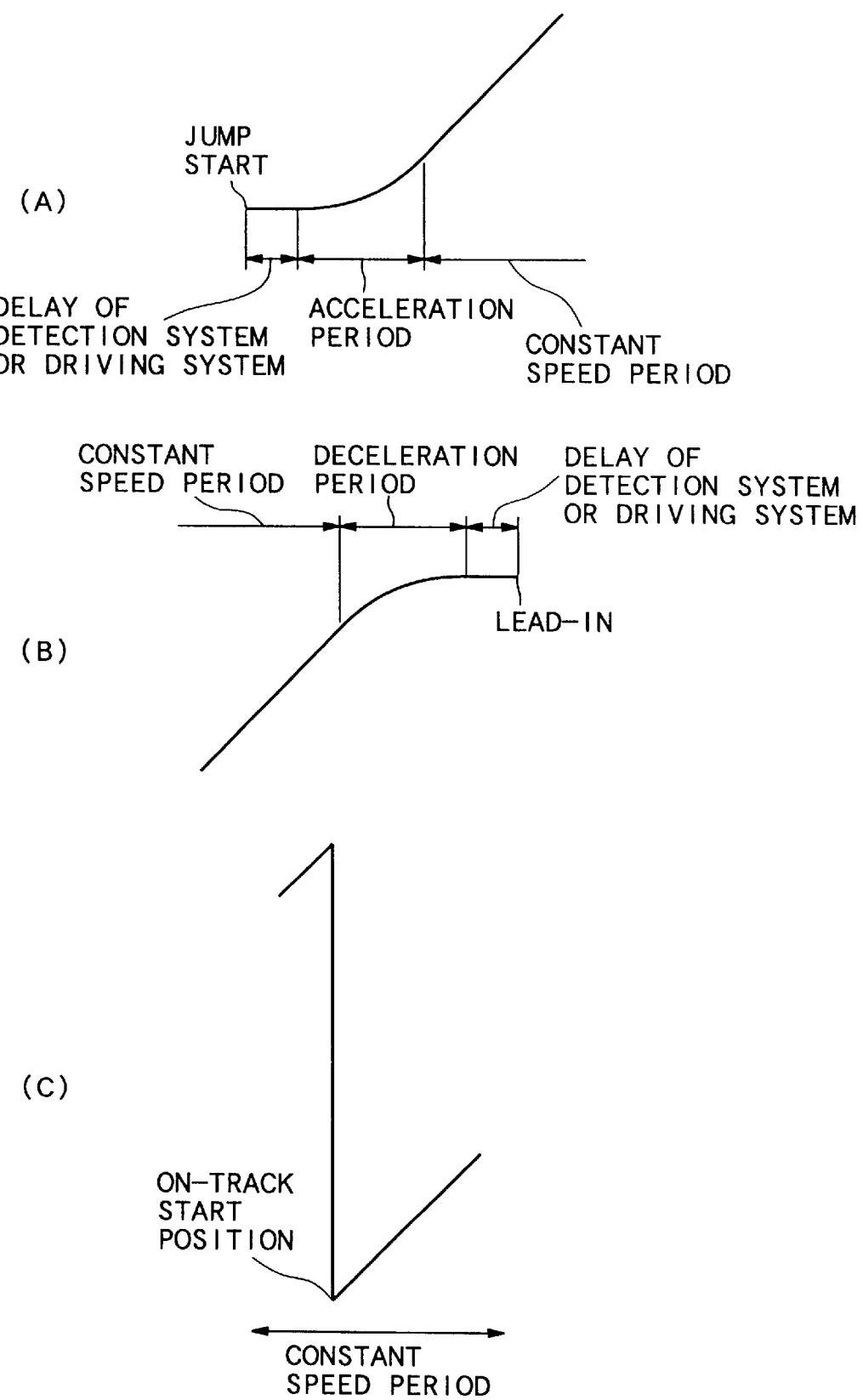
FIG. 36 is a diagram showing how to apply an object value in the track jump apparatus of FIG. 34, (A) is a diagram showing an object value at the time of jump start, (B) is a diagram showing an object value at the time of jump end, and (C) is a diagram showing an object value when a track is crossed.
Figure 37:
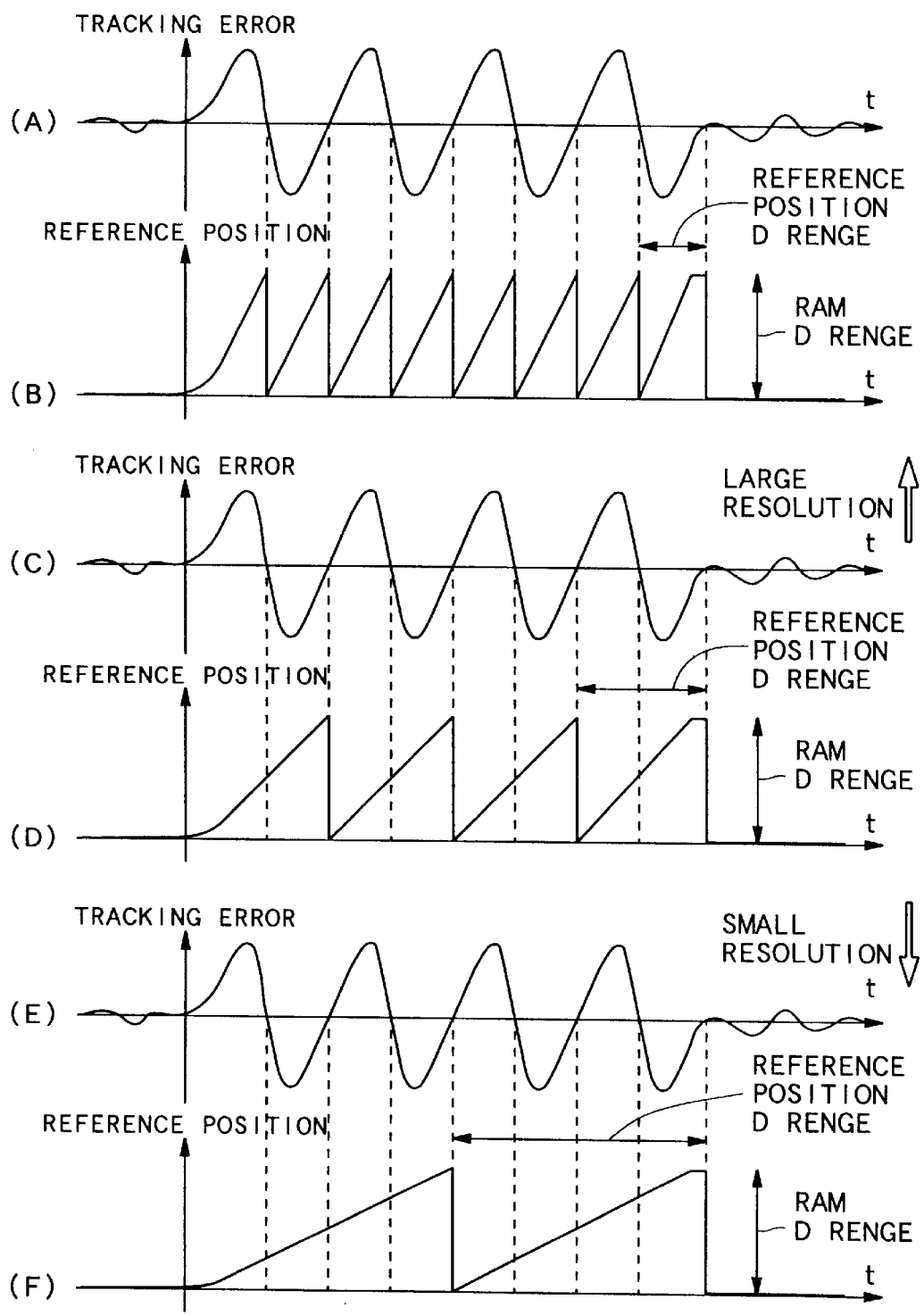
FIG. 37 is a diagram for explaining a modification example of the reference position applicable to the track jump apparatus according to the third embodiment of the present invention, (A) is a waveform diagram of a tracking error signal, (B) is a waveform diagram showing the reference position to be reset every half track, (C) is a waveform diagram of the tracking error signal, (D) is a waveform diagram showing the reference position to be reset every track, (E) is a waveform diagram showing the tracking error signal, and (F) is a waveform diagram showing the reference position to be reset every two tracks.

Referring to FIG. 34, an actuator 1 is a means for moving the objective lens of an optical pickup in the radial direction of DVD based on a feed forward output from the feed forward compensator 2 or a drive signal outputted from the stabilization compensator 6. In a track jump band exceeding an inherent vibration frequency of the actuator 1 like the first embodiment, a frequency characteristic having a gradient of −40 dB/dec is indicated.

The feed forward compensator 2 is a means for supplying a feed forward output as an operating amount so as to make a behavior of the aforementioned actuator 1 coincide with an object value. Like the first embodiment, transmission function Gf of the feed forward compensator 2 may be an inverse function of transmission function of the actuator 1 and has a characteristic which can be approximated as a characteristic of second order differentiator.

A reference position generator 100 is a means for outputting the aforementioned object value and as an example, a profile shown in FIG. 35(E) is outputted as an object value for the feed forward control, and this profile is outputted as an object value for the feed back control. This way in which the object is provided is different from the first embodiment in which a single track jump is carried out, and a characteristic point of the multi-track jump. In the multi-track jump, different object values are provided for one track or several tracks just after jump start, one track or several tracks just before a jump end and tracks therebetween.

Of object values with respect to a track just after jump start within a track having short acceleration/deceleration period, for example, an object value of area indicated with a round mark E1 in FIG. 35(E) is enlarged and indicated in FIG. 36(A). As shown in FIG. 36(A), an object value which rises up in the style of secondary function in an acceleration period with respect to a track just after start and after that, increases at a constant gradient is used. Further, a period considering a delay in the detecting system and driving system is provided between a jump start and an acceleration period. Because often in multi-track jump, its acceleration amount is larger than single track jump, a high precision track jump can be carried out considering a delay of the detecting system and driving system.

Of object values with respect to a track just after jump end, an object value in area indicated with a round mark 2 of FIG. 35(E) is enlarged and indicated in FIG. 36(B). As shown in FIG. 36(B), an object value which converges to a predetermined value in the style of secondary function in the deceleration period with respect to a track just before end is used. Further, a period considering a delay of the detecting system and driving system is provided between an end of the deceleration period and a start of tracking servo lead-in. Therefore, like just after a jump start, in multi-track jump having a higher acceleration amount than the single track jump, a high precision track jump control can be carried out.

Because the acceleration/deceleration period is short, it is permissible to use an object value linearly approximated for even a track just after a jump start and a track just before a jump end.

On the other hand, an object value which increases at a predetermined gradient in entire period is used for other tracks. In case of FIG. 35(E), there is a primary function with predetermined gradient having no increase/decrease period like the secondary function but a predetermined gradient between a second track and a third track and between a third track and a fourth track.

The object value is reset at a start position of on-track each time when each track is passed. If the multi-track jump is carried out, a beam position during a jump increases with an increase of the quantity of the tracks to be jumped as shown in FIG. 35(D). However, because the tracking error signal is a signal which deflects around zero which is an object value in each track, the object value is reset each time when the on-track start position of each track is reached. A portion indicated with a round mark E3 in FIG. 35(E) is indicated in enlargement in FIG. 36(C).

Because according to this embodiment, the object value needs to be reset at the on-track start position as described above, the tracking error signal from the position detector 4 is supplied to a reference position detector 100 as shown in FIG. 34.

If the object value is supplied to the feed forward compensator 2, as shown in FIG. 35(B), an acceleration pulse is outputted from the feed forward compensator 2 which can be approximated as a second order differentiator as shown in FIG. 35(B). After that, no pulse is outputted in a predetermined period and then just before servo lead-in, the deceleration pulse is outputted like a single track jump, so as to ensure a feed forward output.

The speed of the actuator 1 receiving such a feed forward output increases at a predetermined rate first, becomes a constant speed, and just before an end, decreases at a predetermined rate and a position of the beam increases as the number of the tracks increases as shown in FIG. 35(D).

The position detector 4 is a means for detecting a position output as information of a position which changes by traveling of the actuator 1 as a change of an actual signal. If a multi-track jump is carried out, a tracking error signal as shown in FIG. 35(A) is obtained.

A linearization converter 101 corresponds to the linearization converter 5 according to the first embodiment shown in FIG. 1 and is a means for linearization converting a tracking error signal outputted from the aforementioned position detector 4. Like the first embodiment, the converter output is carried out with reference to a table shown in FIG. 6 using the DSP. In a track jump apparatus of this embodiment for carrying out the multi-track jump, the linearization position output is reset at a on-track position of each track. More specifically, if the on-track position is detected during a linearization converting processing using a conversion table for area 3, the linearization conversion processing is carried out using the conversion table for area 1. This corresponds to such a structure in which the object value is reset at the on-track position of each track. If such a linearization converter 101 is used, a linearization position output shown in FIG. 35(F) is obtained with respect to a tracking error signal shown in FIG. 35(A).

As for a method for changing over an area, it is permissible to use either a method for change over with a peak value of the tracking error signal as a criterion or a method for change over with a threshold value of a focus sum which is total of a return light amount as a criterion, like the first embodiment.

The stabilization compensator 6 is a means for outputting a drive signal to the actuator 1 as a control object so as to reduce a linearization position output outputted from the linearization converter 101 described above and a position deviation obtained as a result of comparison with the object value outputted from the reference position generator 100.

FIG. 35(G) shows an example of the drive signal outputted to the actuator 1. As evident from FIG. 35(G), even if the multi-track jump is being carried out, feed-back control is executed in the constant speed period between the acceleration period and deceleration period, a high precision jump to an object track position can be achieved. Therefore, a distortion after the jump is small so that convergence of the tracking servo can be accelerated.

In this embodiment also like the first embodiment, the same stabilization compensator 6 may be used at the times of track jump and tracking servo. However, because an operation of the track jump ends instantaneously, an object of compensation thereof is slightly different from the tracking servo. Thus, the characteristic of the stabilization compensator may be changed corresponding to the track jump or tracking servo. Further, the characteristic of the stabilization compensator may be gradually changed from the time of track jump to the time of tracking servo. For example, as for the constant characteristic, although a large low-band gain is secured to suppress a constant deviation for the tracking servo, because this band is out of the track jump, the low-band gain may be suppressed and a high-band phase allowance may be secured for the track jump. Further, because an object of performance evaluation of the track jump is transient response and on the other hand, it is constant response for ordinary tracking servo, for the track jump, a stabilization compensator in which quick response is stressed may be used and for ordinary tracking servo, a stabilization compensator in which stabilization is stressed may be used. Further, position information to be fed back during a track jump of this embodiment is estimated from non-linearization tracking error signal and includes a disturbance caused due to estimation error particularly at the time of area changeover. Therefore, it is permissible to attach a filter for removing the disturbance or reduce feedback gain upon track jump.

Modification Example 1

Although the object value is reset at on-track starting position as described above, it is permissible to so construct that the object value is reset every half track as shown in FIG. 37(B). That is, the object value is reset at each zero cross position of the tracking error signal of FIG. 37(A). With such a structure, resolution of feed-back control with respect to a traveling distance of the actuator 1 is increased, so that a higher precision track jump control can be achieved. In this case, in the linearization converter 101, a conversion table which is reset every half track needs to be used.

As shown in FIG. 37(F), the object value may be reset for every track. In FIG. 37(F), the object value is reset every two tracks. With such a structure, a wide dynamic range of a reference position may be secured so as to improve an arrival speed to the object track. In this case also, it is necessary to use a conversion table which is reset every several tracks in the linearization converter 101.

In FIGS. 37(B), 37(D), 37(F), a dynamic range of the reference position is gradually increased. As also evident from these figures, as the dynamic range of the reference position is increased, the resolution of the feed-back control with respect to a traveling distance of the actuator 1 drops, so that a precision control is disabled. Although to achieve a precision control when the resolution drops, it can be considered to increase the amount of data which is composed of the object value, the dynamic range of the RAM of the DSP has a limit, and therefore its realization is impossible. Therefore, the number of tracks for resetting the object value and linearization position output should be set up to an appropriate value considering the resolution and a dynamic range of the RAM of the DSP.

Further, it is permissible to use a different reference position depending on the number of tracks to be jumped. That is, if the number of the tracks is small, a reference position having a high resolution is used, and if the number of tracks is large, a reference position having a low resolution is used until an object track is approached. When the object track is approached, a reference position having a high resolution may be used.

Modification Example 2

Figure 38:
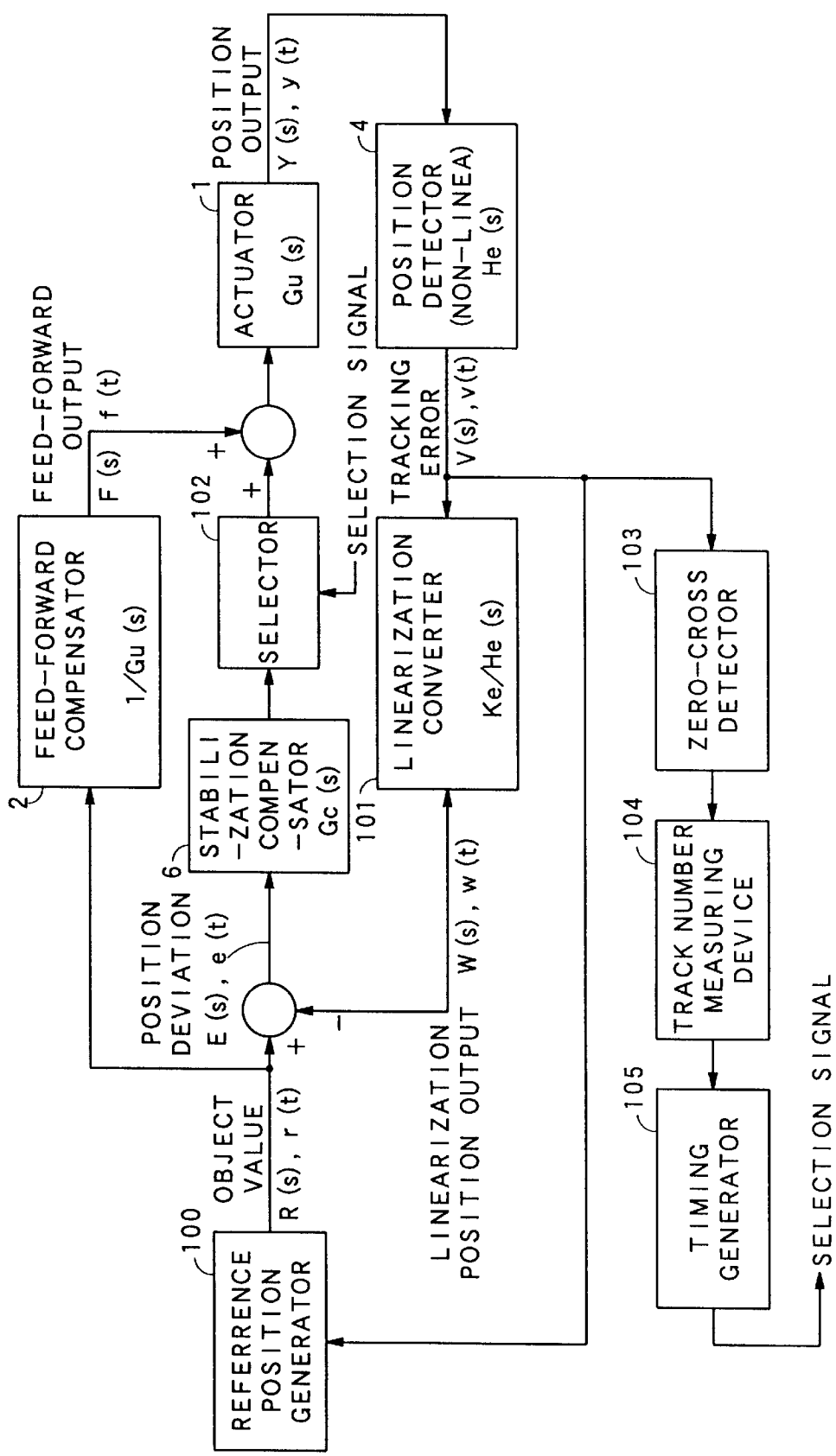
FIG. 38 is a block diagram showing a structure of a track jump apparatus of modification example 2 of the second embodiment of the present invention.
Figure 39:
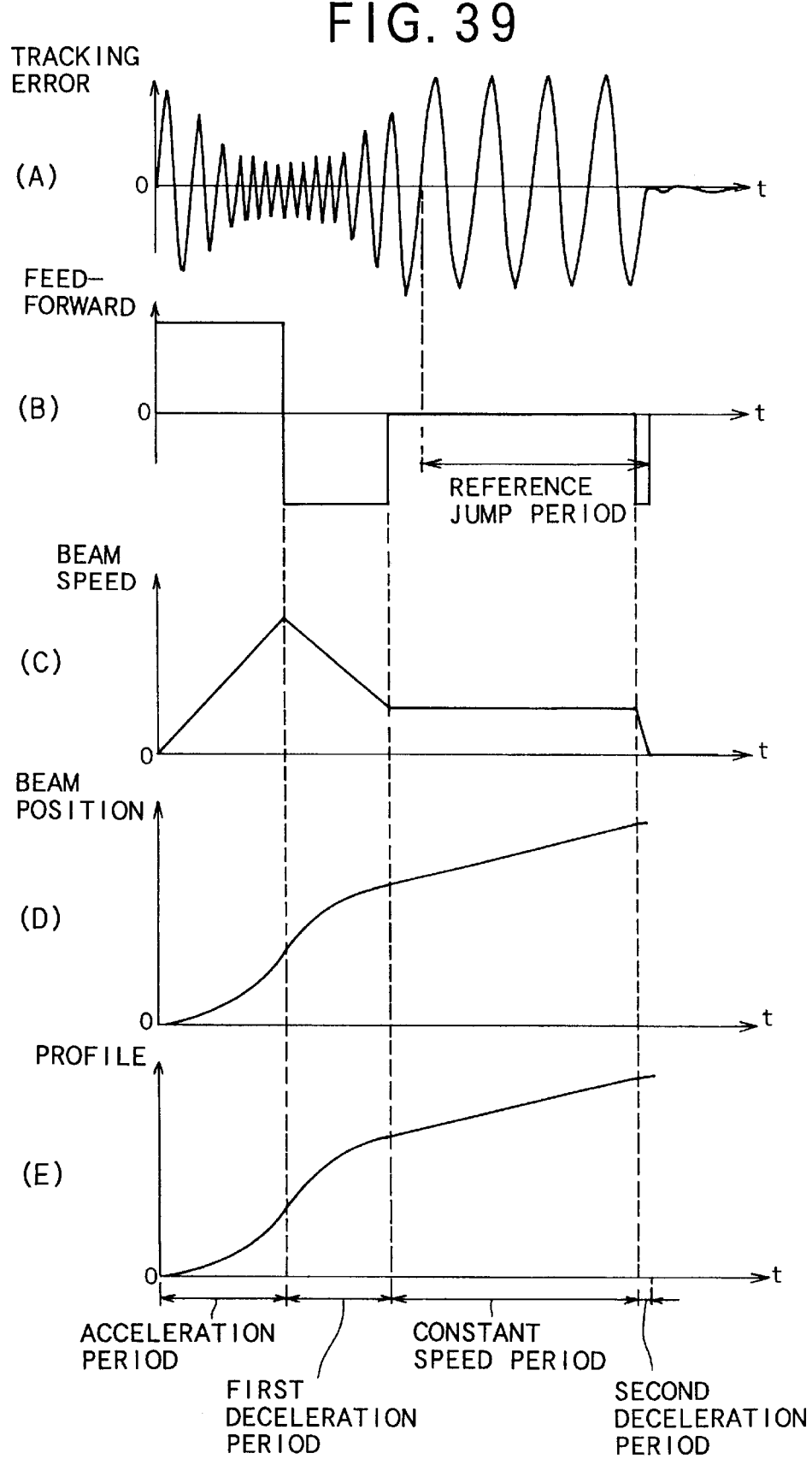
FIG. 39 is a diagram showing waveforms of various signals in the track jump apparatus of FIG. 38, (A) is a waveform diagram of the tracking error signal, (B) is a waveform diagram of a feed forward output, (C) is a waveform diagram of a speed change, (D) is a waveform of a beam position, and (E) is a waveform diagram of the reference position.
Figure 40:
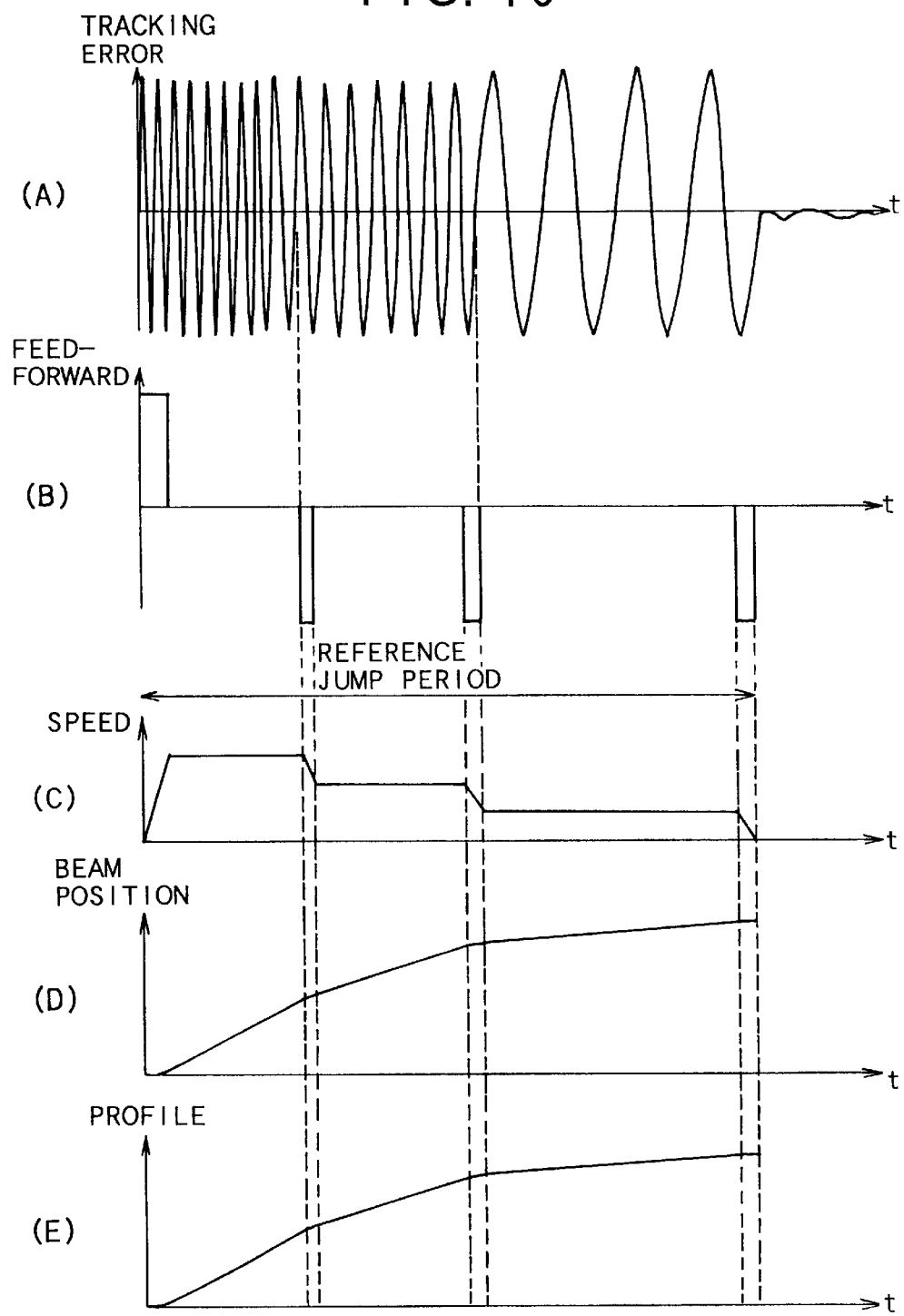
FIG. 40 is a diagram showing waveforms of various signals in the track jump apparatus of modification example 3 of the third embodiment, (A) is a waveform diagram of the tracking error signal, (B) is a waveform diagram of the feed forward output, (C) is a waveform diagram of a speed change, (D) is a waveform diagram of a beam position and (E) is a waveform diagram of the reference position.

FIG. 38 is a block diagram showing a schematic structure of a track jump apparatus according to this modification example. In FIG. 38, like reference numerals are attached to the same components as the track jump apparatus shown in FIG. 34 and a description thereof is omitted.

As shown in FIG. 38, this track jump apparatus is provided with a selector 102 and this selector 102 is connected to the stabilization compensator 6. The selector 102 is a means for switching a connection between the stabilization compensator 6 and actuator 1 to open state or close state. When a selection signal outputted from a timing generator 105 described later is low level, the connection state is switched to open state and when the selection signal is high level, the connection state is switched to close state.

This track jump apparatus is also different from the track jump apparatus shown in FIG. 34 in that it includes a zero cross detector 103, a track number measuring device 104 and a timing generator 105.

The zero cross detector 103 contains a comparator, which at a timing in which a zero cross of a tracking error signal outputted from the position detector 4 is detected, outputs a pulse signal rising from low level to high level or a pulse signal falling from high level to low level.

The track number measuring device 104 consists of a counter, which measures a number of pulse signals rising from low level to high level of pulse signals outputted from the aforementioned zero cross detector 103 so as to measure a number of jumped tracks.

The timing generator 105 monitors track number data outputted from the aforementioned track number measuring device 104, and when the track number reaches a predetermined track number, it raises the selection signal from low level to high level.

The reference position generator 100 outputs a profile shown in FIG. 39(E) to the feed forward compensator 2 and stabilization compensator 6. A profile shown in FIG. 39(E) has an acceleration period enough for jumping to about half of the object track just after the track jump starts and a first deceleration period slightly shorter than the acceleration period after the acceleration period ends. Further, after the first deceleration period, it has a constant speed period the longest of the track jump period and finally has a second deceleration period shorter than the first deceleration period.

The track jump apparatus of this modification example having such a structure does not carry out a track jump (hereinafter referred to as reference jump) with a reference position as an object value by feed back control in an entire period of the track jump, but the reference jump over only a predetermined number of tracks just before the track jump ends.

Hereinafter, a track jump control in this track jump apparatus will be described.

First, if a profile shown in FIG. 39(E) is outputted from the reference position generator 100 and supplied to the feed forward compensator 2, a feed forward output in which acceleration pulse and deceleration pulse having a large pulse width as shown in FIG. 39(B) are continuous is supplied to the actuator 1 from the feed forward compensator 2. As a result, the actuator 1 moves rapidly as shown in FIG. 39(D) and reaches a position several tracks ahead of the object track.

At the same time when the track jump starts, a tracking error signal shown in FIG. 39(A) is obtained from the position detector 4 and a zero cross of the tracking error signal is detected from the zero cross detector 103, so that a pulse signal rising from low level to high level and a pulse signal falling from high level to low level are outputted. The track number measuring device 104 measures pulse signals rising from low level to high level of these pulse signals so as to measure a number of jumped tracks since the track jump starts. This track number is monitored by the timing generator 105. Because a reference truck for starting the reference jump has not been reached when the first deceleration period ends, a selection signal outputted from the timing generator 105 remains low level. Therefore, the selector 102 keeps a connection between the stabilization compensator 6 and actuator 1 open in the acceleration period and first deceleration period and no reference jump is achieved.

Next if the first deceleration period ends and a profile of a constant speed period is supplied from the reference position generator 100 to the feed forward compensator 2, an output of the feed forward becomes zero level as shown in FIG. 39(B), so that the actuator 1 moves at a constant speed.

In this while, the timing generator 105 continues to monitor the number of jumped tracks and if the number of the jumped tracks reaches the aforementioned reference track number, the selection signal from the timing generator 105 changes from low level to high level. As a result, the connection state between the stabilization compensator 6 and actuator 1 is switched to close state, so that the reference jump starts.

That is, the tracking error signal is linearization converted by the linearization converter 101 so that a sawtooth shaped linearization position output which is reset for each track is obtained. As a result, a position deviation between this linearization position output and a reference position shown in FIG. 39(E) is obtained and the drive signal from the actuator 1 is controlled so as to suppress this position deviation in the stabilization compensator 6.

As a result, during latter half period of a track jump, a high precision track jump is carried out to suppress an influence of a disturbance.

After the constant speed period ends, a profile of the short second deceleration period is supplied to the feed forward compensator 2 as shown in FIG. 39(E) and a deceleration pulse having a short pulse width is outputted to the actuator 1 from the feed forward compensator 2 as shown in FIG. 39(B). As a result, the track jump ends so that the tracking servo is closed. However, because a jump following a track at a high precision is carried out in the latter half of a track jump as described above, tracking servo lead-in ends in a short time in even a DVD having a narrow pitch.

Because as described above, the track jump apparatus of this modification example carries out feed forward control with the feed back servo almost open in an entire period of track jump, the jump time can be reduced. Further because the reference jump is carried out with the feed back servo closed in a remaining period, the actuator can be made to jump from a current track to an object track apart by a predetermined number.

Modification Example 3

Next, an example of reducing the speed of the actuator gradually will be described. This modification example can be achieved with a track jump apparatus shown in FIG. 34.

To reduce the speed of the actuator gradually, a profile shown in FIG. 40(E) may be supplied to the feed forward compensator 2 and the stabilization compensator 6 from the reference position generator 100.

If a profile shown in FIG. 40(E) is supplied to the feed forward compensator 2, an acceleration pulse is outputted just after the track jump starts as shown in FIG. 40(B). Then, such a feed forward output that a constant speed period is provided three times after that and a deceleration pulse is outputted after each constant speed period is obtained.

The speed of each constant speed period is set up so as to drop gradually as shown in FIG. 40(C). A traveling distance of the actuator 1 gradually decreases as shown in FIG. 40(D) and then the actuator 1 reaches an object track position.

Reset of the object value in the reference position generator 100 is carried out at every two tracks until second constant speed period after the track jump starts and in a final third constant speed period at every track.

With such a structure, even if the reference jump is executed in an entire period of the track jump, because the actuator is moved at a fast speed since the jump start, the jump time can be reduced and further, because the speed drops as the jump end is approached, a high precision track jump can be achieved.

Although in this modification example, the speed is changed over at three stages, the present invention is not restricted to this example, but it is permissible to change over multiple stages.

(Fourth Embodiment)

A fourth embodiment of the present invention will be described with reference to FIGS. 41–48.

Figure 41:
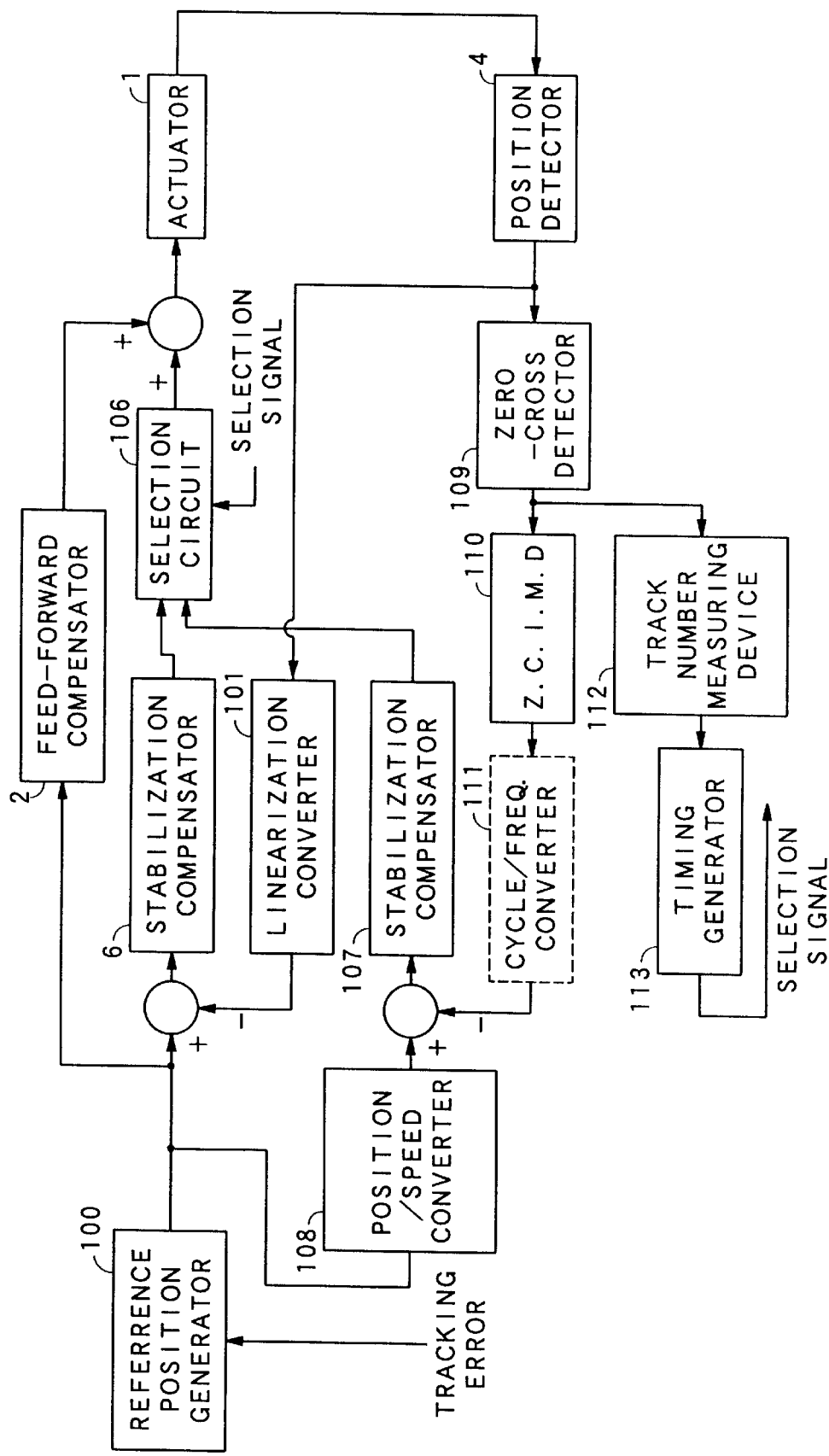
FIG. 41 is a block diagram showing a structure of a track jump apparatus according to a fourth embodiment of the present invention.
Figure 42:
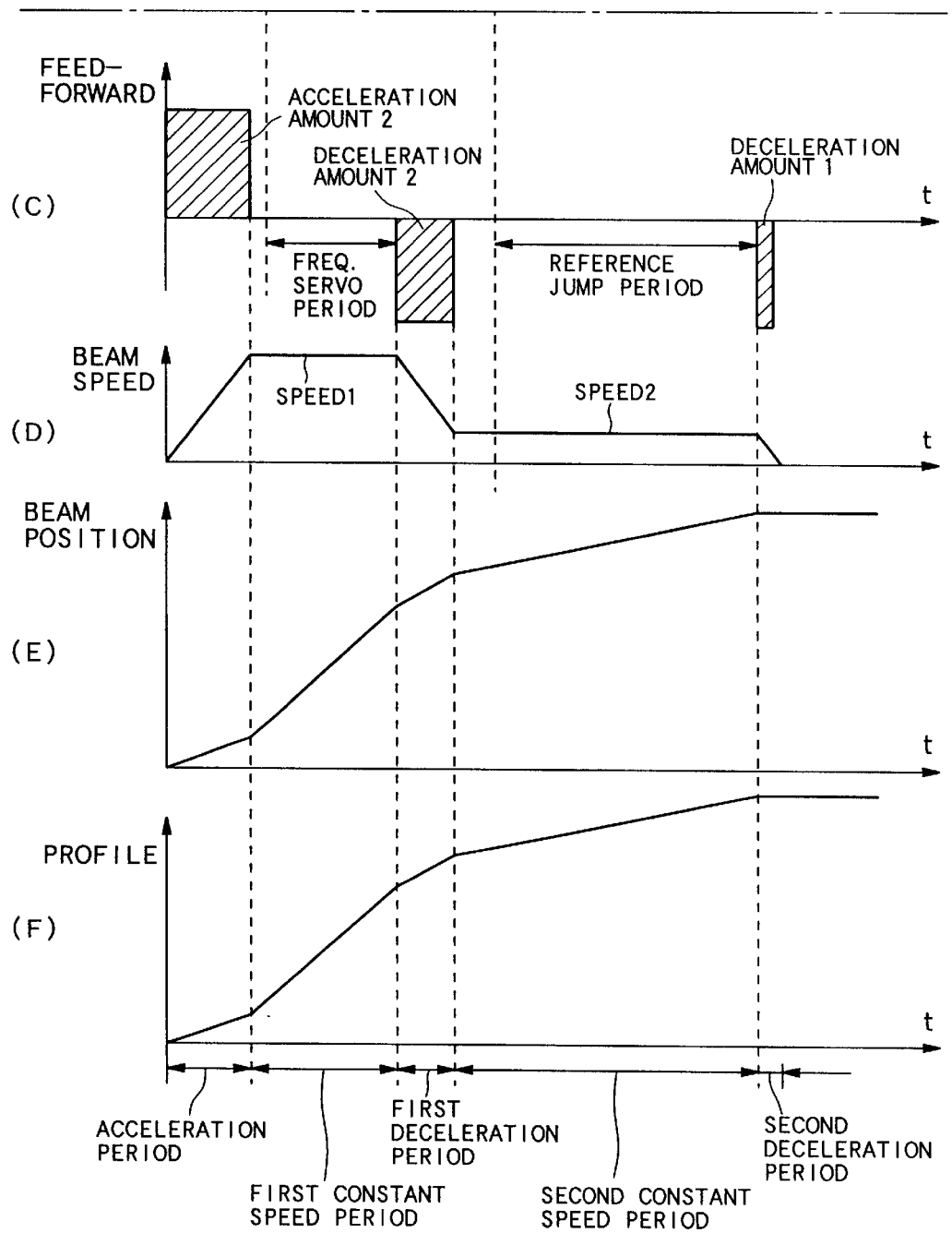
FIG. 42 is a diagram showing waveforms of various signals in a track jump apparatus according to a fourth embodiment, FIG. 42A illustrate (A) a waveform diagram in which part of the tracking error signal of (B) is enlarged, and (B) a tracking error signal.

FIG. 41 is a block diagram showing a schematic structure of a track jump apparatus according to this embodiment. In FIG. 41, like reference numerals are attached to the same components as the first and third embodiments and a description thereof is omitted.

[1] Components of Track Jump Apparatus

As shown in FIG. 41, the track jump apparatus of this embodiment is different from the first embodiment in that it comprises a selector 106 for selecting two stabilization compensators, a stabilization compensator 107 for frequency control for controlling zero cross frequency of the tracking error signal at a constant level, position/speed converter 108, a zero cross detector 109, a zero cross interval measuring device 110, a track number measuring device 112, and a timing generator 113.

This embodiment is different from the track jump apparatus of the third embodiment in that a frequency servo loop is formed of the zero cross detector 109, zero cross interval measuring device 110, position/speed converter 108, stabilization compensator 107 and selector 106.

The selector 106 is connected to the stabilization compensator 6 for reference jump and stabilization compensator 107 for frequency control and selects the stabilization compensator 107 when a selection signal outputted from the timing generator 113 described later is low level, and when the selection signal is high level, selects the stabilization compensator 6.

The zero cross detector 109 contains a comparator, which outputs a pulse signal rising from low level to high level or a pulse signal falling from high level to low level at a timing in which a zero cross of the tracking error signal outputted from the position detector 4 is detected.

The zero cross interval measuring device 110 is composed of a counter, which measures a pulse signal outputted from the zero cross detector 109 so as to measure a zero cross frequency of the tracking error signal.

The position/speed converter 108 is composed of a first order differentiator, which converts a reference position outputted from the reference position generator 100 to an object speed. The zero cross frequency outputted from the aforementioned zero cross interval measuring device 110 is compared with the object speed as speed information and a speed deviation which is obtained as a result of the comparison is outputted to the stabilization compensator 107. Although gain deflection is small because the object speed of this embodiment is a constant speed, if the object speed changes largely, the gain deflection is large. Thus, it is not favorable to use an output of the zero cross interval measuring device 110 as it is. If the gain deflection is large, a cycle/frequency converter 111 is connected to the zero cross interval measuring device 110 and it is recommendable to carry out inversion of an output of the zero cross interval measuring device 110 or gain adjustment.

The stabilization compensator 107 outputs a drive signal to the actuator 1 to zero the aforementioned speed deviation. Therefore, if the stabilization compensator 107 is selected by the aforementioned selector 106 so as to form a frequency servo loop, the actuator 1 controls the speed so as to keep the zero cross frequency of the tracking error signal constant. In this embodiment, the zero cross frequency is controlled to be 10 Khz–20 Khz.

The track number measuring device 112 is composed of a counter, which measures a number of pulses rising from low level to high level of pulse signals outputted from the zero cross detector 109 so as to measure a number of jumped tracks.

The timing generator 113 monitors track number data outputted from the track number measuring device 112 and raises the selection signal from low level to high level when the track number reaches a predetermined track number.

The reference position generator 100 outputs a profile shown in FIG. 42(F) to the feed forward compensator 2, stabilization compensator 6 and stabilization compensator 107. A profile shown in FIG. 42(F) has an acceleration period for jumping several tracks just after the track jump starts and a first constant speed period after the acceleration period. Further, it has a first deceleration period slightly shorter than the acceleration period after the first constant speed period. It has a second constant speed period having a slower speed than the first constant speed period after the first deceleration period and finally a second deceleration period by far shorter than the first deceleration period. Further, the reference position is reset every track in the second constant speed period.

[2] Track Jump Control

The track jump apparatus of this embodiment having such a structure executes reference jump with frequency control. Hereinafter, track jump control with this track jump apparatus will be described.

First, a profile shown in FIG. 42(F) is outputted from the reference position generator 100, and if it is supplied to the feed forward compensator 2, as shown in FIG. 42(C), acceleration pulse is supplied from the feed forward compensator 2 to the actuator 1 as a feed forward output. As a result, the actuator 1 starts to gradually move as shown in FIG. 42(E), and a tracking error signal shown in FIG. 42(B) is obtained from the position detector 4. Further, the zero cross detector 109 detects zero cross of the tracking error signal and outputs a pulse signal rising from low level to high level and a pulse signal falling from high level to low level. The track number measuring device 104 counts pulse signals rising from low level to high level of these pulse signals so as to measure the number of jumped tracks since the track jump starts. Because this track number is monitored by the timing generator 105 and when the acceleration period ends, a reference track number for starting frequency control and a reference track number for starting the reference jump have not been reached, the selection signal outputted from the timing generator 113 remains low level like the first selection signal and second selection signal. Therefore, although the stabilization compensator 107 is selected by the selector 106, because the first selection signal is low level, the zero cross interval measuring device 110 remains stopped so that no frequency control is carried out during an acceleration period.

Next, if the acceleration period ends, a profile of the first constant speed period is supplied from the reference position generator 100 to the feed forward compensator 2, so that as shown in FIG. 42(C), the feed forward output becomes zero level and the actuator 1 moves at a constant speed.

In this while, the timing generator 113 continues to monitor the number of jumped tracks and when the number of tracks reaches a reference track number for starting the reference jump, the first selection signal from the timing generator 113 changes from low level to high level. As a result, the measuring operation of the zero cross interval measuring device 110 starts, thereby forming a frequency servo loop.

That is, the zero cross period obtained from the zero cross interval measuring device 110 is compared with an object speed (speed 1 shown in FIG. 42(D)) obtained from the position/speed converter 108 so as to obtain a speed deviation. Then, the drive signal of the actuator 1 is controlled so as to zero this speed deviation by the stabilization compensator 107.

As a result, the speed of the actuator 1 is controlled so that the zero cross frequency of the tracking error signal is constant at about 10 kHz–20 kHz as shown in FIG. 42(A) which is enlargement of a round mark B1 of FIG. 42(B). Thus, track jump is carried out at high speed with some extent of precision.

If the first constant speed period ends, a profile of the first deceleration period is supplied from the reference position generator 100 to the feed forward compensator 2, so that as shown in FIG. 42(C), a deceleration pulse is supplied to the actuator 1 as feed forward output. Therefore, the speed of the actuator 1 gradually drops and then goes out of a band in which frequency control is enabled, and consequently, the frequency control is disabled.

If the first deceleration period ends, a profile of the second constant speed period is supplied to the feed forward compensator 2 from the reference position generator 100, so that as shown in FIG. 42(C), the feed forward output becomes zero level and then the actuator 1 returns to constant speed traveling.

In this while also, monitoring on the number of jumped tracks is being carried out by the timing generator 113. If the number of the jumped tracks reaches a reference track number upon reference jump start, a selection signal from the timing generator 113 changes from low level to high level. As a result, the selector 106 selects the stabilization compensator 6 so as to form a servo loop for the reference jump control.

In this servo loop, the tracking error signal is linearization converted by the linearization converter 101 so that a reset sawtooth shaped linearization position output is obtained every track. As a result, a position deviation between this linearization position output and the sawtooth shaped reference position reset for every track as shown in FIG. 42(F) is obtained and a drive signal from the actuator 1 is controlled so as to suppress this position deviation in the stabilization compensator 6. At the time of reference jump, the frequency of the tracking error signal drops to 2 kHz.

Although this frequency band exceeds a band in which feed back control acts effectively, because the control is carried out based on a position deviation between the linearization reference position and linearization position output, an apparent band drops to a band in which the feed back act effectively. As a result, in a latter half of the track jump, a high precision track jump is carried out while suppressing a disturbance.

After the second constant speed period ends, as shown in FIG. 42(F), a profile of short second deceleration period is supplied to the feed forward compensator 2 and a deceleration pulse having a short pulse width as shown in FIG. 42(C) is outputted to the actuator 1 from the feed forward compensator 2. Consequently, the track jump ends and the tracking servo is closed. Because as described above, a jump following a track at a high precision is carried out in a latter half of the track jump, tracking servo lead-in is terminated in a short time for even a DVD having a narrow pitch.

[3] Comparison with a Case in which only Reference Jump or Frequency Control is Carried Out The reference jump can only be reduced to about several hundreds $\mu$ sec per track at shortest because of a problem relating to a control band. Therefore, if a jump over several hundred tracks is executed, it takes much time so that accessibility may drop although this jump is stabilized.

On the other hand, although generally, the frequency control is used as a technology for avoiding an inversion or the like of a relative speed of track vs beam during a jump and effective to some extent for lead-in, the sampling is rough so that a high precision control cannot be carried out. Of course, its performance is inferior to a reference jump in which sampling is carried out at 100 kHz. Because the sampling is carried out at zero cross, a portion in which a jump speed is slow at acceleration time and deceleration time has an increased waste time, so that the control band is restricted. Thus, the control is made open before lead-in. Thus, the stability upon lead-in for frequency control is not sufficient.

On the contrary, if frequency control is carried out in a constant speed period after the acceleration period after the jump starts, like this embodiment, an inversion of a relative speed between the track and actuator is prevented, so that a high speed track jump can be executed. In the reference jump, the speed per track is several hundred $\mu$ sec and this is several kHz frequency band, and an object value for frequency control is 10–20 kHz for the tracking error. Thus, the jump time can be reduced more than a case in which the multi-track jump is carried out by only the reference jump.

Further, because deceleration is executed just before a lead-in to reduce the speed and then the reference jump is carried out, the track jump having a high stability upon the lead-in can be carried out. However, several tracks are needed to reduce the tracking error frequency to 10–20 kHz for frequency control, several tracks are needed to reduce it from that level to a band of the reference jump and further several track are needed for the frequency control to act effectively in a constant speed interval. Therefore, if the multi-track jump is carried out with a track 10–20 track away from a current track as an object track, only the reference jump is used, and if a track 20 or more track away from the current track is regarded as an object track, the frequency control and reference jump are used at the same time.

Because an object of use of the frequency control is to reduce the jump time, as shown in FIG. 42(D), the speed 1 for the frequency control and speed 2 for the reference jump are always set to speed 1>speed 2.

Further, because in the frequency control using zero cross, the sampling period is prolonged at the time of acceleration and deceleration and a lamp response is used in the speed control system, the characteristic of the control system is not ensured. Thus, according to this embodiment, open control is used at the time of acceleration and deceleration and then full acceleration and full deceleration are executed with only pulses. As a result, a jump over about two tracks is carried out in this while.

To execute the reference jump after a frequency control, the frequency of the tracking error signal which has risen to 10 kHz–20 kHz needs to be decreased to 2 kHz and a time required for this is about the same as the acceleration time and after that, two or three tracks are jumped. Theoretically, assuming that as shown in FIG. 42(C), an acceleration amount of the acceleration period is acceleration 2, the acceleration amount of the first deceleration period is deceleration 2 and the deceleration amount of the second deceleration period is deceleration 1, the deceleration pulse is applied so as to satisfy:

acceleration amount 2−deceleration amount 2=deceleration amount 1

If an inversion of a relative speed occurs in an open control interval from a deceleration start to a reference jump start because of a disturbance or the like, a disorder may occur in the control procedure, therefore it is preferable to set up the deceleration amount to be smaller than its theoretical value for the safety.

Although the reference jump is so controlled that a jump over a track is achieved in 500 μsec (2 kHz), an initial speed of the objective lens (with respect to a track) is faster than this upon a reference jump start. This initial speed relatively fast and a deflection of the frequency control are absorbed by the reference jump. For example, the reference jump period is set to about 4 tracks with a margin.

Therefore, the deceleration is started seven tracks before an object track and the reference jump is started four tracks before. Because three tracks are necessary in an acceleration period and several tracks (because some extent of frequency control must be applied in a constant speed interval) are necessary in the frequency control interval, the frequency control and reference jump are used at the same time for multi-track jump over 16 tracks or more.

[4] Experimental Example

Figure 44:
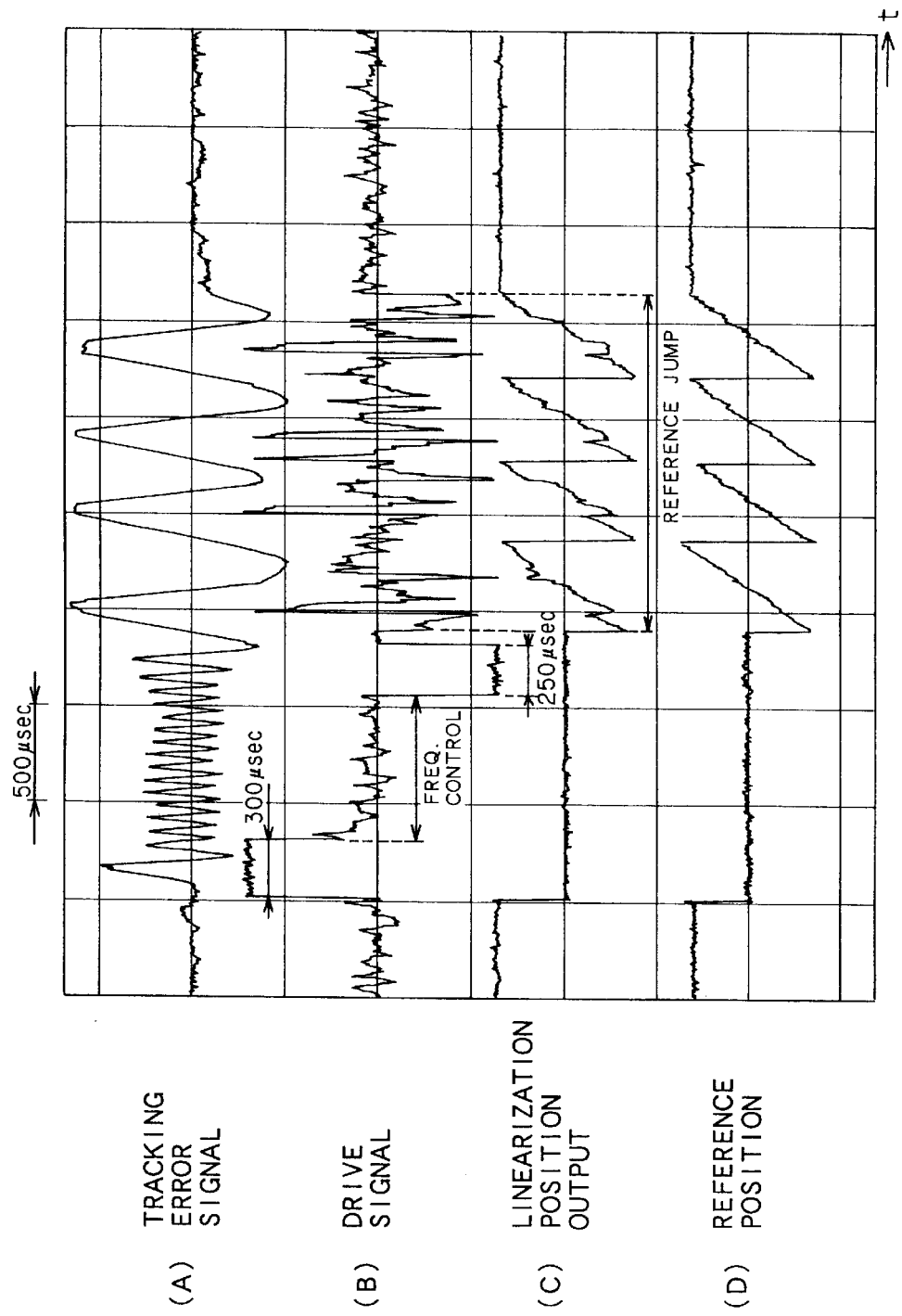
FIG. 44 is a diagram showing waveforms of various signals of a case where a jump from a current track to an object track 20 tracks ahead is executed by carrying out frequency control and reference jump in a constant speed period while feed forward control being carried out in the track jump apparatus of FIG. 43; (A) is a waveform diagram of a tracking error signal, (B) is a waveform diagram of a drive signal to be supplied to a driver of an actuator, (C) is a waveform diagram of a linearization position output and (D) is a waveform diagram of the reference position.

An experimental example of this embodiment will be described with reference to FIGS. 44–46. FIG. 44 is a block diagram showing a structure of a track jump apparatus according to this experimental example. Like reference numerals are attached to the same components as a track jump apparatus shown in FIG. 15 for use in the experimental example of the first embodiment and a description thereof is omitted. In this embodiment also, respective functions are achieved by executing a program in the DSP except the actuator 10, driver 11, photo detector 21 and CPU 20.

Figure 43:
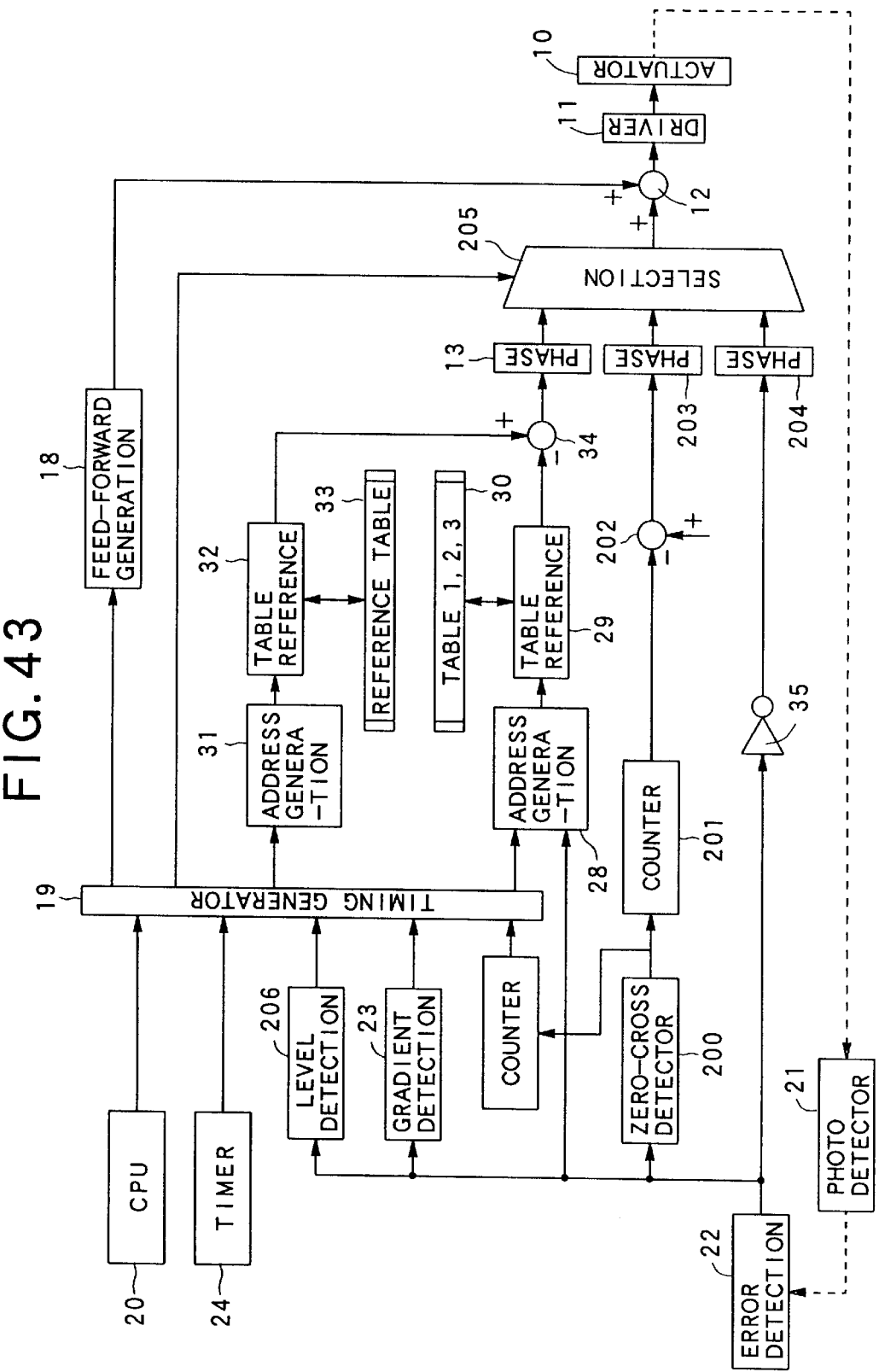
FIG. 43 is a block diagram showing a structure of a track jump apparatus used for experimental example of the fourth embodiment of the present invention.

A track jump apparatus of this experimental example comprises a zero cross detector 200, a track interval counter portion 201, an adding/subtracting portion 202, a phase compensating portion 203 and a selector portion 205 as shown in FIG. 44 and is different from the track jump apparatus of an experimental example shown in FIG. 15. This track jump apparatus is also different from the track jump apparatus of the experimental example shown in FIG. 15 in that the phase compensator portion 204 for tracking servo control is provided separately from the phase compensator portion 13 for reference jump. Further, this is also different from the track jump apparatus of the experimental example shown in FIG. 15 in that the reference position outputted from the table reference portion 32 is reset every track or every several tracks and linearization position output outputted from the table reference portion 29 is reset every track or every several tracks corresponding to the aforementioned reference position. Further, this is also different from the track jump apparatus of this experimental example shown in FIG. 15 in that the feed forward output outputted from the feed forward generating portion 18 is provided with two constant speed periods for frequency control and reference jump and a deceleration period from a constant speed for frequency control to a constant speed for reference jump is provided. A level detector portion 206 shown in FIG. 43 is a portion corresponding to comparators 25, 26, upper level setting portion 27a and lower level setting portion 27b.

The zero cross detector portion 200 generates a pulse having a rising edge or falling edge synchronous with the zero cross of a tracking error signal. This zero cross detector portion 200 is a portion corresponding to the zero cross detector portion 109 of FIG. 41.

The track interval counter portion 201 counts a frequency of a pulse signal outputted from the aforementioned zero cross detector portion 200 so as to output a result of this count as a relative speed detection signal of beam. This track interval counter portion 201 is a portion corresponding to the zero cross interval measuring portion 110 of FIG. 41.

The adding/subtracting portion 202 computes a speed deviation by subtracting the relative speed detection signal of the track interval counter portion 201 from the object speed signal. The object speed signal is a signal corresponding to a period of a pulse signal whose frequency is 10–20 kHz. A circuit for outputting this object speed signal corresponds to a position/speed converter 108 shown in FIG. 41.

The phase compensator portion 203 is a portion corresponding to the stabilization compensator 107 of FIG. 41 which outputs a drive signal for the driver 11 to zero the speed deviation obtained by the adding/subtracting portion 202.

The selector portion 205 selects the phase compensator portion 13 upon a reference jump corresponding to a timing signal outputted from the timing generating portion 19, the phase compensating portion upon frequency control, and the phase compensator portion 204 at the time of tracking servo. The selector portion 205 corresponds to the selector 106 of FIG. 41.

A result of an experiment carried out with the track jump apparatus described above is shown in FIGS. 44, 45 and 46.

FIG. 44 is a result of jumping from a current track to an object track 20 tracks ahead thereof by carrying out the frequency control and reference jump in a constant speed period while the feed forward control is being executed. The object value of the frequency control for use in multi-track jump is about 15 kHz. FIG. 44(A) is a diagram showing a tracking error signal outputted from the tracking error signal detecting portion 22, FIG. 44(C) is a diagram showing a linearization position output outputted from the table reference portion 29 and FIG. 44(D) is a diagram showing a reference position outputted from the table reference portion 32.

Figure 45:
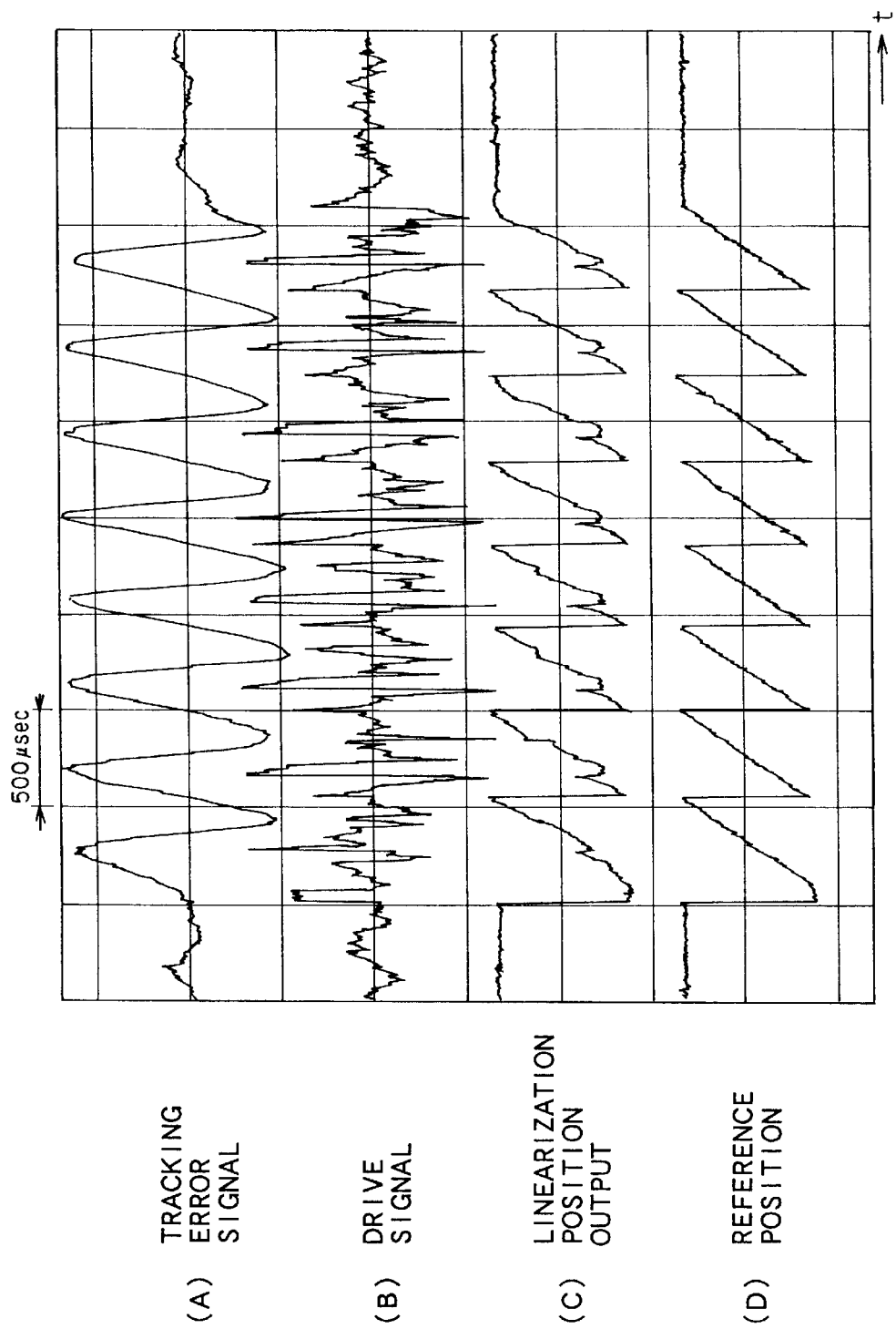
FIG. 45 is a diagram showing waveforms of various signals of a case where a jump from a current track to an object track 8 tracks ahead is executed by carrying out only the reference jump in a constant speed period while feed forward control being carried out in the track jump apparatus of FIG. 43; (A) is a waveform diagram of a tracking error signal, (B) is a waveform diagram of a drive signal to be supplied to a driver of an actuator, (C) is a waveform diagram of a linearization position output and (D) is a waveform diagram of the reference position.

FIG. 45 is a result of jumping from a current track to an object track, eight tracks ahead thereof by carrying out only the reference jump in the constant speed period while the feed forward control is being executed. FIG. 45(A) is a diagram showing a tracking error signal outputted from the tracking error signal detecting portion 22, FIG. 45(C) is a diagram showing a linearization position output outputted from the table reference portion 29 and FIG. 45(D) is a diagram showing the reference position outputted from the table reference portion 32.

Figure 46:
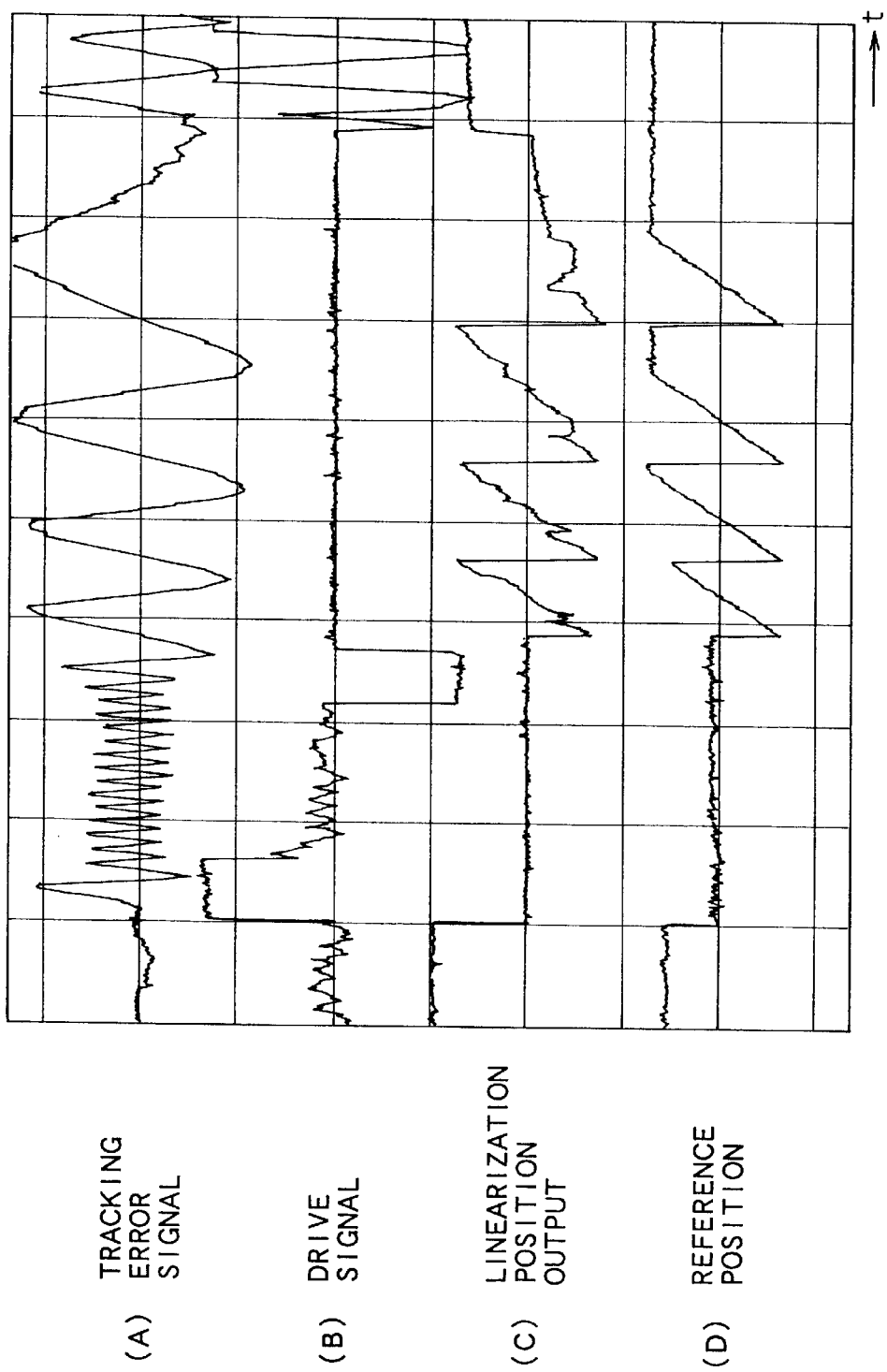
FIG. 46 is a diagram showing waveforms of various signals of a case where a jump from a current track to an object track 20 tracks ahead is executed by carrying out only the frequency control in a constant speed period while feed forward control being carried out in the track jump apparatus of FIG. 43; (A) is a waveform diagram of a tracking error signal, (B) is a waveform diagram of a drive signal to be supplied to a driver of an actuator, (C) is a waveform diagram of a linearization position output and (D) is a waveform diagram of the reference position.

FIG. 46 is a result of jumping from a current track to an object track, eight tracks ahead thereof by carrying out only the frequency control in the constant speed period while the feed forward control is being executed. FIG. 46(A) is a diagram showing a tracking error signal outputted from the tracking error signal detecting portion 22, FIG. 46(C) is a diagram showing linearization position output outputted from the table reference portion 29 and FIG. 46(D) is a diagram showing the reference position outputted from the table reference portion 32.

Because as shown in FIG. 44(A), when the track jump is executed by the frequency control, the object value for the frequency control for use in the multi-track jump is about 15 kHz in terms of the frequency of the tracking error signal and about 30 kHz in the terms of zero cross frequency detected on both edges, time required for one-track jump is about 66.7 μsec. On the other hand, as shown in FIG. 45, only the reference jump takes about 500 μsec for a track jump. For the frequency control, the jump time can be reduced to about 1/7 as compared to the reference jump.

On the other hand, if only the frequency control is used, as shown in FIG. 46, the position of the actuator deflects largely when the tracking servo is led in so that it becomes unstable.

If the frequency control and reference jump are used at the same time, as shown in FIG. 44, the position of the actuator is stabilized immediately after the track jump ends, so that it is led into the object track.

Because at the time of acceleration and deceleration, the period of sampling about the tracking error signal is prolonged and the characteristic of the control system is not secured because lamp response is used in the speed control system, open control is used. Time until the zero cross frequency (detected on both edges) becomes about 30 kHz since a jump starts from the track ON state is about 300 $\mu$sec at full acceleration as shown in FIG. 44(A), so that two tracks are jumped in this while.

Although to carry out the reference jump after the frequency control, the frequency of the tracking error signal has to be lowered from 15 kHz to 2 kHz, time required for this deceleration is about 250 $\mu$sec at full acceleration as shown in FIG. 44(A), so that two or three tracks are jumped in this while.

As a result of carrying out multiple experiments, it is made evident that time required for the acceleration and deceleration can be settled in two or three tracks if converted in terms of the number of jumped tracks.

Although the reference jump is controlled to be carried out in 500 $\mu$sec (2 kHz) for each track, the initial speed of the objective lens (with respect to the track) is faster than this one upon startup of the reference jump. Therefore, this relatively fast initial speed and deflection of the frequency control are absorbed in the reference jump and in this experiment, the reference jump section is set to four tracks including a margin.

Therefore, the deceleration has to be started seven tracks ahead of an object track considering four tracks for the reference jump section and three tracks for a period required for the deceleration. Several tracks are necessary for carrying out the frequency control securely and further three tracks are necessary for the acceleration. Therefore, it is made evident that the multi-track jump in which the frequency control and reference jump are combined is desired to be executed when a track, 16 tracks apart from a current track is an object track.

Modification Example 1

Figure 47:
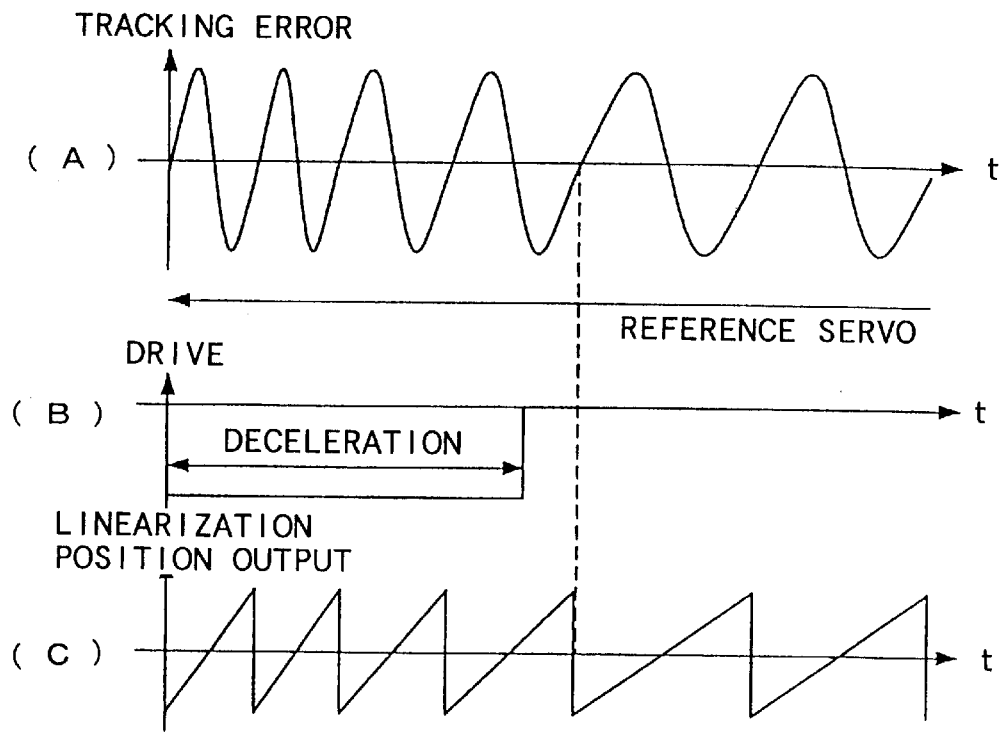
FIG. 47 is a diagram showing waveforms of various signals in modification example 1 using a reference position in which the speed gradually decreases in a deceleration interval and in an interval after the deceleration ends up to on-track, according to the fourth embodiment, (A) is a waveform diagram of a tracking error signal, (B) is a waveform diagram of a drive signal to be supplied to a driver of an actuator and (C) is a waveform diagram of a linearization position output.

In the above example, because at the time of acceleration and deceleration, the sampling period is prolonged and lamp response is used in the speed control system, the characteristic of the control system is not secured, open control is used. As shown in FIG. 47, it is permissible that the reference servo may be applied using such a reference position in which the speed is gradually decreased in the deceleration interval or an interval after the deceleration ends up to on-track.

FIG. 47(A) shows a tracking error signal after the deceleration, FIG. 47(B) shows a drive signal and FIG. 47(C) shows a linearization position output. It is necessary to use the reference position adjusted to the linearization position output of FIG. 47(C) to execute the reference servo after the deceleration or after the deceleration ends.

Modification Example 2

Figure 48:
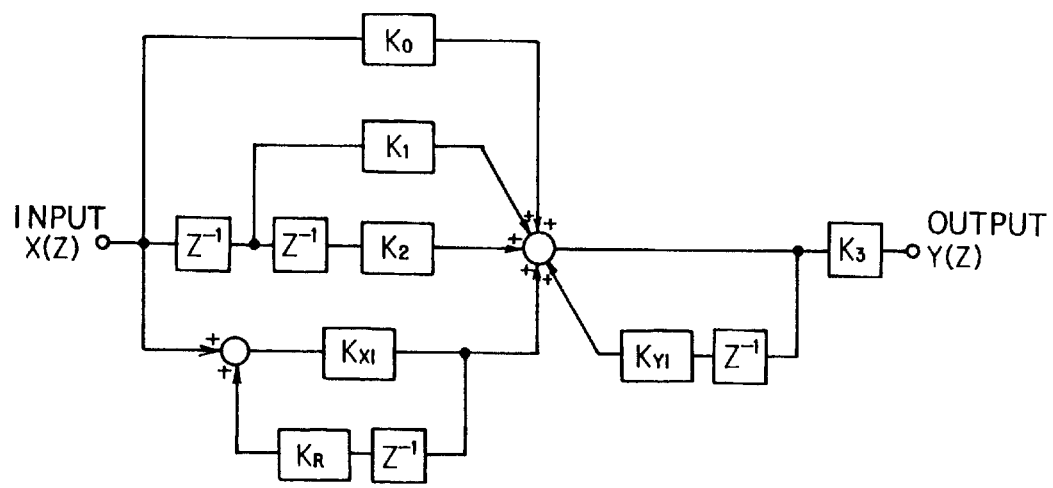
FIG. 48 is a block diagram showing a structure of a digital equalizer for use as a phase compensator for frequency control, a phase compensator for reference jump and a phase compensator for tracking servo according to modification example 2 of the fourth embodiment.

The track jump apparatus of this modification example includes a digital equalizer shown in FIG. 48 as a phase compensator for frequency control, a phase compensator for reference jump and a phase compensator for tracking servo and the digital equalizer is controlled by the CPU.

In FIG. 48, $K_0$ indicates primary term coefficient, $K_2$ indicates secondary term coefficient, $K_{X1}$ indicates an integration term gain (integration coefficient), $K_R$ indicates a low pass filter having a cut-off frequency of 20 Hz, $K_{Y1}$ indicates a low pass filter having a cut-off frequency of 4 kHz, $K_3$ indicates a gain and $K^{-1}$ indicates a last sampling value.

Assuming that input is $X(z)$, output is $Y(z)$ and equalizer characteristic is $EQ(z)$, input/output relationship is as follows.

$Y(z)=EQ(z) \cdot X(z)$.

$EQ(z)$ is expressed by
$EQ(z)=K_3 \times \{1-K_1Z^{-1}+K_2Z^{-2}+(K_{X1}/(1-K_RZ^{-1}))\}/(1-K_{Y1}Z^{-1})$ This digital equalizer is so composed that the secondary term coefficient $K_2$ and integration coefficient $K_{X1}$ for determining that characteristic are variable. Although these coefficients are fixed so that the characteristic of the equalizer is a predetermined characteristic for compensating a low band gain boost, it is changed by a CPU (not shown) at the time of servo lead-in after the track jump or the like.

More specifically, the CPU resets a counter value in an internal timer counter for measuring a passage time for servo lead-in at a timing for servo loop closing after the track jump ends and sets initial values of the secondary term coefficient $K_2$ and integration coefficient $K_{XI}$ of the digital equalizer.

Particularly, the initial value of the integration term $K^{xI}/(1-KRZ^{-1})$ is not zero and an integration term $K_{XI}/(1-K_RZ^{-1})$ transferred from frequency control during a track jump to the reference jump and then transferred to the tracking servo is used.

Then, $EQ(z)$ operation is carried out based on initial values of the secondary term coefficient $K_2$ and integration coefficient $K_{XI}$ and preliminarily set other coefficients (fixed value) so as to compensate for the frequency characteristic with respect to the tracking error signal. In total open characteristic at the time of lead-in start determined by initial values of the secondary term coefficient $K_2$ and integration coefficient $K_{XI}$, gain of an intermediate range (near 100 kHz) drops, however phase allowance increases. In a low range (below 30 Hz), low range components driven via the reference jump are transferred from the frequency control so that gain boost compensated characteristic is ensured.

If after $EQ(z)$ operation, a count value n of the aforementioned timer counter is incremented so as to set an execution cycle, for example, sampling time of the equalizer to t 0 $\mu$sec, a passage time since lead-in start can be obtained by n·t0. Thus, it is determined whether or this passage time exceeds a predetermined lead-in time. If the lead-in time T is not exceeded, the secondary term coefficient $K_2$ and integration coefficient $K_{XI}$ are increased by $\Delta K_2$ and $\Delta K_{XI}$ respectively and then $EQ(z)$ is computed based on the $K_2$ and $K_{XI}$. This operation is repeated until it is determined that the passage time n·t0 exceeds the lead-in time. That is, the secondary coefficient $K_2$ and integration coefficient $K_{XI}$ change by $\Delta K_2$ and $\Delta K_{XI}$ for each cycle t0 and the total open loop characteristic changes corresponding to changes of these coefficients.

If it is determined that the lead-in time T is exceeded, the secondary term coefficient $K_2$ and integration coefficient $K_{XI}$ are set to $K_{2N}$, values set for ordinary playback time and $K_{IN}$, integration coefficient. Then, the servo lead-in operation ends so that the operation changes to ordinary playback operation. As for the total open loop characteristic upon ordinary playback determined by $K_{2N}$ and $K_{IN}$, gains of the low range (below 30 Hz) and intermediate range (near 100 Hz) are increased.

At the time when the lead-in of the equalizer characteristic starts, there is a large phase allowance in the intermediate range and other low range components transferred from other control are given to the low range. When the intermediate range gain gradually increases with a time passage so that the lead-in time T is elapsed, the secondary term coefficient $K_2$ and integration coefficient $K_{XI}$ are changed to return to the characteristic at the ordinary playback time, so that the intermediate range gain drops in an initial period of the lead-in while the phase allowance is increased sufficiently. Thus, overshoot upon the lead-in can be minimized. Because after the servo is stabilized, low range and intermediate range gains increase, so that a sufficient error compression characteristic is obtained. As a result, follow-up performance with respect to a deflection component of the disk can be improved.

Further, the low range is compensated by only an amount corresponding to the low range components transferred from other controls in the initial period of the lead-in. As a result, like when a multi-track jump is executed over several hundreds tracks, the jump time is long and the actuator shifts the objective lens largely with the slider stopped. Thus, even if an influence of the spring system is applied, there never occurs a swing-back due to a restoration force of the spring when the lead-in occurs, so that a jump failure never occurs.

If the integration term is transferred from the frequency control to the reference jump or from the reference jump to the tracking servo, because the loop gain or gain distribution of each control system are different, it is necessary to adjust the gain upon the transfer.

Instead of the integration term of the phase compensator, it is permissible to transfer the integration value of the drive amount to a next processing. Further, because the number of jumped tracks indicates a deflection amount, this may be used instead of the integration term.

In the reference jump interval or open control interval for deceleration or the like, instead of receiving the integration term, it is permissible to execute feed forward addition by offsetting with the integration term of a last processing or integrated drive amount.

In any case, a disorder at the time of transition of the servo mode can be removed. Even after the multi-track jump over several hundreds tracks ends, there never occurs a swing-back due to a restoration force of the spring upon the lead-in, so that the tracking servo is stabilized. According to an experiment, 500 tracks at the maximum can be jumped over.

In this modification example, the tracking servo, frequency control and reference jump have been described about a case in which the phase compensator is provided for each thereof. Because the tracking servo and reference jump are controls over positions, the same phase compensator may be used.

As described above, the reference jump method may be used for the track jump so as to improve the stability upon the lead-in operation. Therefore, upon use in the DVD, it can be considered possible to prevent an escape from a capture range thereby jumping over the track by suppressing a disorder upon the lead-in with a narrow track pitch. Further, this embodiment can exert its excellent effect in a system having a higher density than the DVD and having a narrower track pitch.

According to this embodiment, the lead surely into the object track is enabled so as to improve its accessibility. On the contrary, in a conventional multi-track jump, it is difficult to jump over a specified number of tracks accurately and therefore an error of several % is allowed. Thus, address confirmation is carried out after PLL lock, so that rejump is executed thereby producing a waste of time.

The improved stability and reliability according to this embodiment are effective for vibration countermeasure.

Although according to this embodiment, an accurate jump is possible up to 500 tracks at the maximum, if considering a further number of the tracks, it is necessary to move the slider during a jump because of physical reason.

In the aforementioned multi-track jump according to the third embodiment and fourth embodiment, control is executed based on the tracking error signal. Thus, if a deflection occurs in the tracking error signal, it is desirable to provide a gain/offset controller between the linearization converter portion and tracking error signal detecting portion as shown in FIG. 27.

The third and fourth embodiments have been described about a case in which the multi-track jump is carried out. If it is so constructed that the reference position and linearization position output for use in the single track jump described in the first embodiment can be outputted using the reference position generator 100 and linearization converter 101 and in case of executing a single track jump, control is made according to a method according to the first embodiment while in case of executing multi-track jump, control is made according to the third embodiment or fourth embodiment, an appropriate track jump can be carried out for both single track jump and multi-track jump.

(Fifth Embodiment) A fifth embodiment of the present invention will be described with reference to FIGS. 49–52. Like reference numerals are attached to the same components as FIGS. 3, 4 and a description thereof is omitted.

According to this embodiment, in a disk in which land/groove recording is made, the track jump apparatus of the present invention is applied to a half track jump from land track to groove track and from groove track to land track.

The land groove recording refers to a technology for recording data in a pre-groove used for a guide groove conventionally and allows to achieve a capacity ideally twofold of recording with only the conventional land portion. Currently, this land groove recording is used in the DVD-RAM recording.

In a disk for use in this land groove recording, a pitch between the land tracks and a pitch between the groove tracks are 0.74×$\mu$m like the DVD in which only the land portion is recorded. Using the track jump apparatus of the first embodiment, a single track jump from the land track to other land track or a single track jump from a groove track to other groove track can be carried out.

On the other hand, a pitch between the land track and groove track is 0.74 $\mu$m. A tracking error signal detected when a jump from the land track to the groove track is made or a jump from the groove track to the land track is made is half a tracking error signal obtained upon the last single track jump.

Therefore, according to this embodiment, a profile corresponding to the track pitch and a linearization conversion table corresponding to th e tracking error signal are used. Hereinafter, the track jump apparatus of this embodiment will be described with reference to FIGS. 49, 50.

Figure 49:
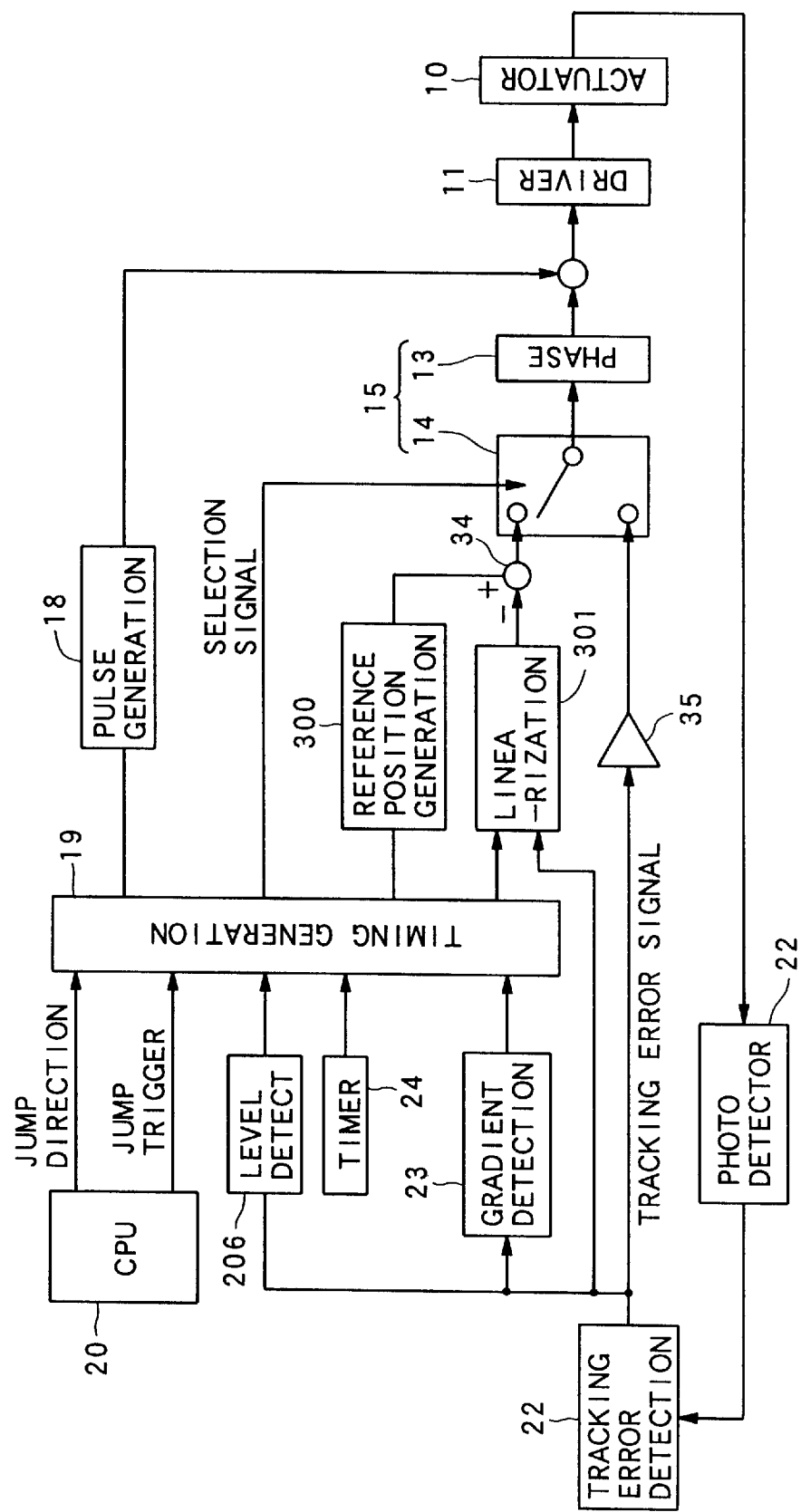
FIG. 49 is a block diagram showing a structure of a track jump apparatus according to a fifth embodiment of the present invention.
Figure 50:
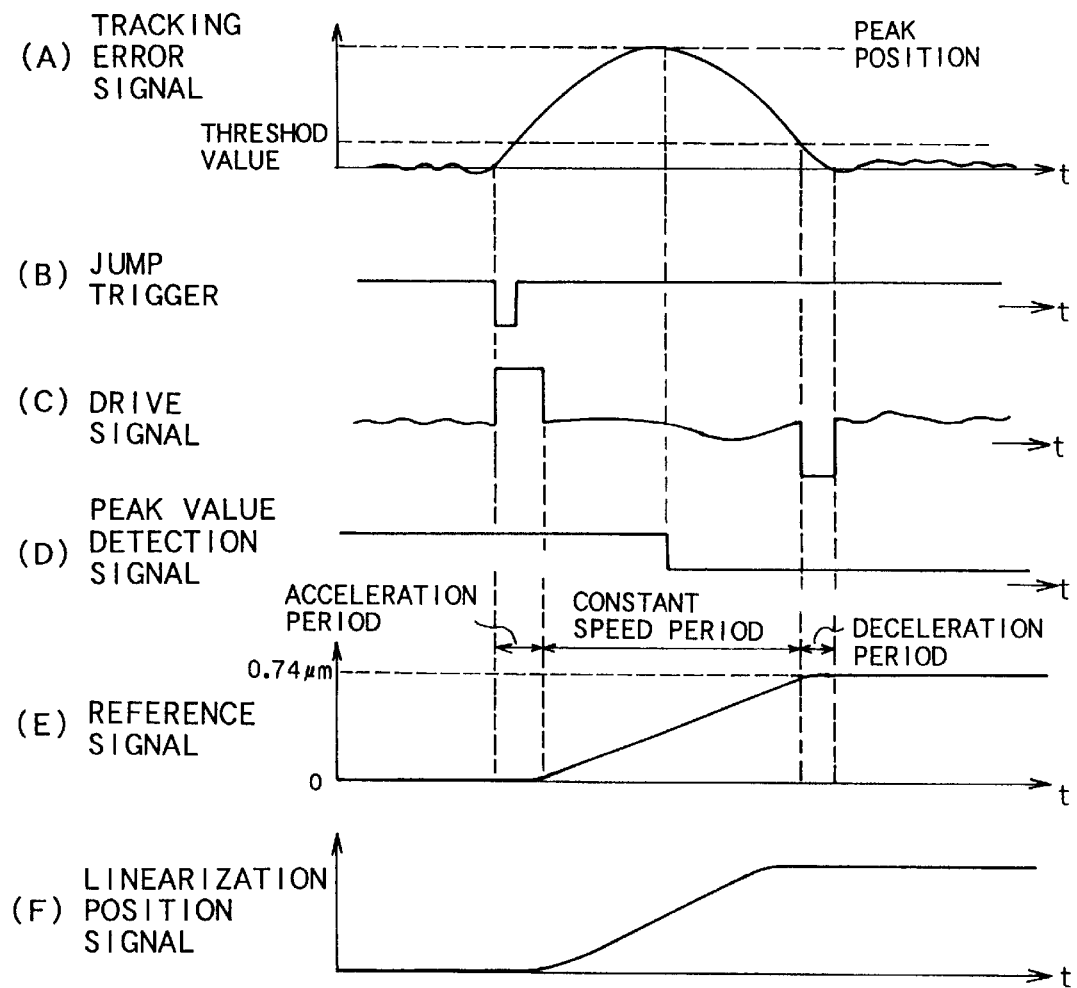
FIG. 50 is a diagram showing waveforms of various signals in the track jump apparatus of FIG. 49, (A) is a waveform diagram of a tracking error signal, (B) is a waveform diagram of jump trigger, (C) is a waveform diagram of a drive signal to be supplied to a driver of an actuator, (D) is a waveform diagram of a peak valve detection signal, (E) is a waveform diagram of the reference position, and (F) is a waveform diagram of the linearization position output.
Figure 51:
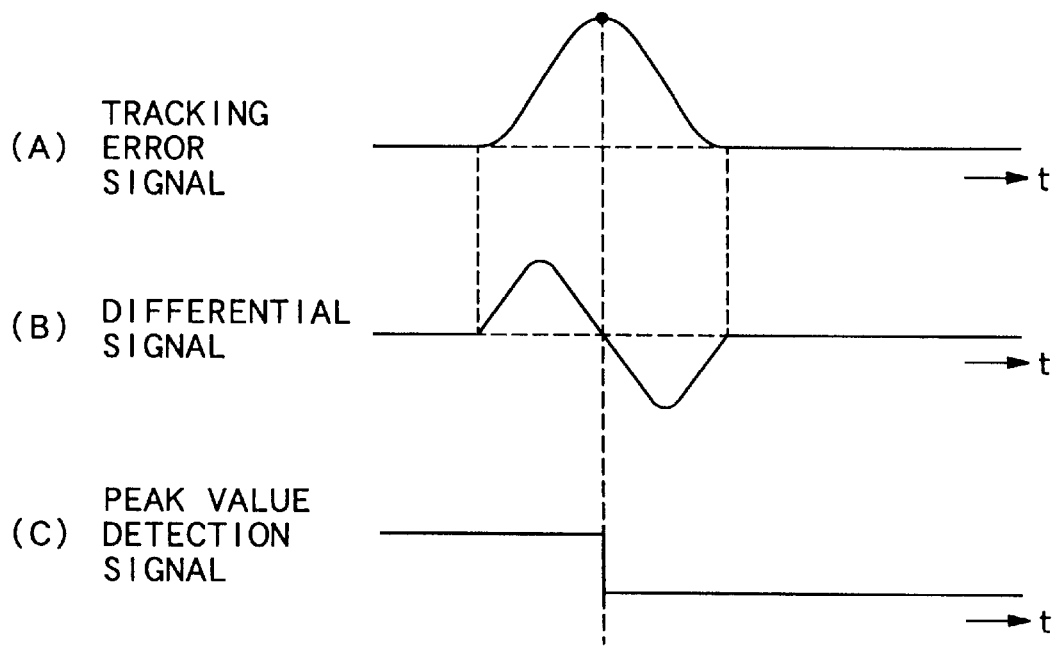
FIG. 51 is a diagram showing waveforms of various signals in modification example 1 of the fifth embodiment for obtaining a peak value detection signal from a differential signal of the tracking error signal for area changeover, (A) is a waveform diagram of the tracking error signal, (B) is a waveform diagram of the differential signal of the tracking error signal of (A) and (C) is a waveform diagram of the peak detection signal.

FIG. 49 is a block diagram showing a schematic structure of a track jump apparatus of this embodiment. Like reference numerals are attached to the same components as the experimental example 1 of the first embodiment shown in FIG. 15.

As shown in FIG. 49, the track jump apparatus of this embodiment is different from the aforementioned experimental example 1 in the structures of the reference position generator portion 300 and linearization converter portion 301. Other components are the same as the track jump apparatus for use in the aforementioned experimental example 1. An overlapping description of the same components is omitted.

The reference position generator portion 300 comprises an address generator portion, a table reference portion and a reference table portion like the track jump apparatus shown in FIG. 15. As for a profile supplied from the reference position generator portion 300, as shown in FIG. 50(E), a traveling distance is increased gradually in the acceleration period, after that, the traveling distance is increased at a constant rate in the constant speed period and in the deceleration period, an increase rate of the traveling distance is decreased gradually, so that an object track 0.74 μm apart from a current track is reached. This profile is supplied to a feed forward compensator which can be approximated to second order differentiator. As a result, a feed forward output comprising an acceleration pulse and a deceleration pulse as shown in FIG. 50(C) is obtained. According to this embodiment, the acceleration pulse and deceleration pulse are outputted directly from the pulse generator portion 18. Although the output timing of the deceleration pulse is determined based on experimental data, for example as shown in FIG. 50(A), it may be set to a timing in which the value of the tracking error signal is smaller than a predetermined threshold value or a timing in which the value of the tracking error signal is 1/n the peak value. Further, it is permissible to so construct that a deceleration pulse is outputted after a predetermined time elapses after the value of the tracking error signal reaches a peak value.

Although the aforementioned profile is supplied to the feed back control system as a reference position, according to this embodiment, the constant speed period is provided between the acceleration period and deceleration period in case of carrying out a half track jump and a reference position which can be approximated linearly is obtained. Thus, using the reference position and linearization position output of the tracking error signal, a stabilized feed back control can be achieved easily.

On the other hand, the linearization converter portion 301 comprises an address generator portion, a table reference portion and a conversion table like the track jump apparatus shown in FIG. 15. As the conversion table, the conversion table for area 1 and the conversion table for area 2, described in the first embodiment, can be used. Because the detected tracking error signal has a waveform half a case of the single track jump as shown in FIG. 50(A), a half conversion table corresponding until the tracking error signal reaches zero cross may be used as the conversion table for area 2. Changeover of the area in this embodiment is carried out based on a peak value detection signal outputted from the inclination detector portion 23 as shown in FIG. 50(D). That is, in a period in which the peak value detection signal is of high level, the conversion table for area 1 is referred to and in a period in which it is of low level, the conversion table for area 2 is referred to. FIG. 50(F) shows an example of the linearization position output.

If a jump trigger shown in FIG. 50(B) is outputted from the CPU 20 with such a structure, an acceleration pulse is outputted from the pulse generating circuit 18 as shown in FIG. 50(C), based on a timing signal from the timing generating circuit 19. As a result, the actuator 10 starts to move and a tracking error signal shown in FIG. 50(A) is obtained with that move.

This tracking error signal is linearization converted by the linearization converter 301 so as to obtain a position deviation relative to the reference position as a linearization position output. This position deviation is supplied to the phase compensator 13 and then the phase compensator 13 outputs a drive signal for the driver 11 so as to zero this position deviation. As a result, a feed back loop is formed and a stabilized track jump not affected by a disturbance is carried out.

Next, if the tracking error signal reaches its peak value, a peak value detecting signal which changes to low level as shown in FIG. 50(D) is obtained from the inclination detecting portion 23 and outputted to the timing generator portion 19. The timing generator portion 19 outputs a signal indicating that the area is changed from area 1 to area 2 based on this peak value detecting signal to the linearization converter portion 301 and then, the linearization converter portion 301 carries out linearization conversion using the conversion table for area 2.

Then, a deceleration pulse shown in FIG. 50(C) is outputted to the driver 11 from the pulse generator portion 18 at a timing in which the tracking error signal becomes smaller than a predetermined threshold value shown in FIG. 50(A). As a result, the actuator 10 reaches an object track 0.37 μm from a current track thereby the tracking servo being lead in.

Because according to this embodiment, as described above, a profile in which a constant speed period is provided between the acceleration period and deceleration period is used for carrying out the feed forward control and feed back control, even if a half track jump from land track to groove track or from groove track to land track is carried out in a disk for carrying out the land/groove recording, a high precision track jump can be executed with some extent of time secured, so that convergence for tracking servo lead-in can be accelerated.

Modification Example

Although in the above example, the inclination detecting portion 23 is used and it is so constructed that a peak value detection signal is changed over from high level to low level at a timing when the tracking error signal reaches the peak value, the present invention is not restricted to this structure, but it is permissible that the peak value detection signal is changed over from high level to low level based on a differential signal of the tracking error signal.

More specifically, the tracking error signal detecting portion 22 shown in FIG. 49 is connected to a differential circuit portion so as to obtain a differential signal shown in FIG. 51(B) with respect to a tracking error signal shown in FIG. 51(A). Then, the polarity of the peak value detecting signal is changed over at a zero cross of this differential signal.

Even with such a structure, changeover of the area can be achieved favorably so as to carry out the linearization conversion processing appropriately.

(Sixth Embodiment)

Next, the sixth embodiment of the present invention will be described with reference to FIGS. 52, 53. Like reference numerals are attached to the same components as the fifth embodiment or fourth embodiment and a description thereof is omitted.

In this embodiment, the present invention is applied to a track jump apparatus for carrying out track jump from a current land track to a groove track apart by multiple tracks or carrying out track jump from a groove track to land track apart by multiple tracks with respect to a disk subjected to land/groove recording.

Although a schematic structure of the track jump apparatus is the same as the track jump apparatus shown in FIG. 49, this is different from the fifth embodiment in that the reference position outputted from the reference position generating portion is reset each on-track of a single track or multiple tracks.

This embodiment is different from the fifth embodiment in that the output of the linearization conversion portion is reset each on-track of a single track or multiple tracks corresponding to the reference position.

Figure 52:
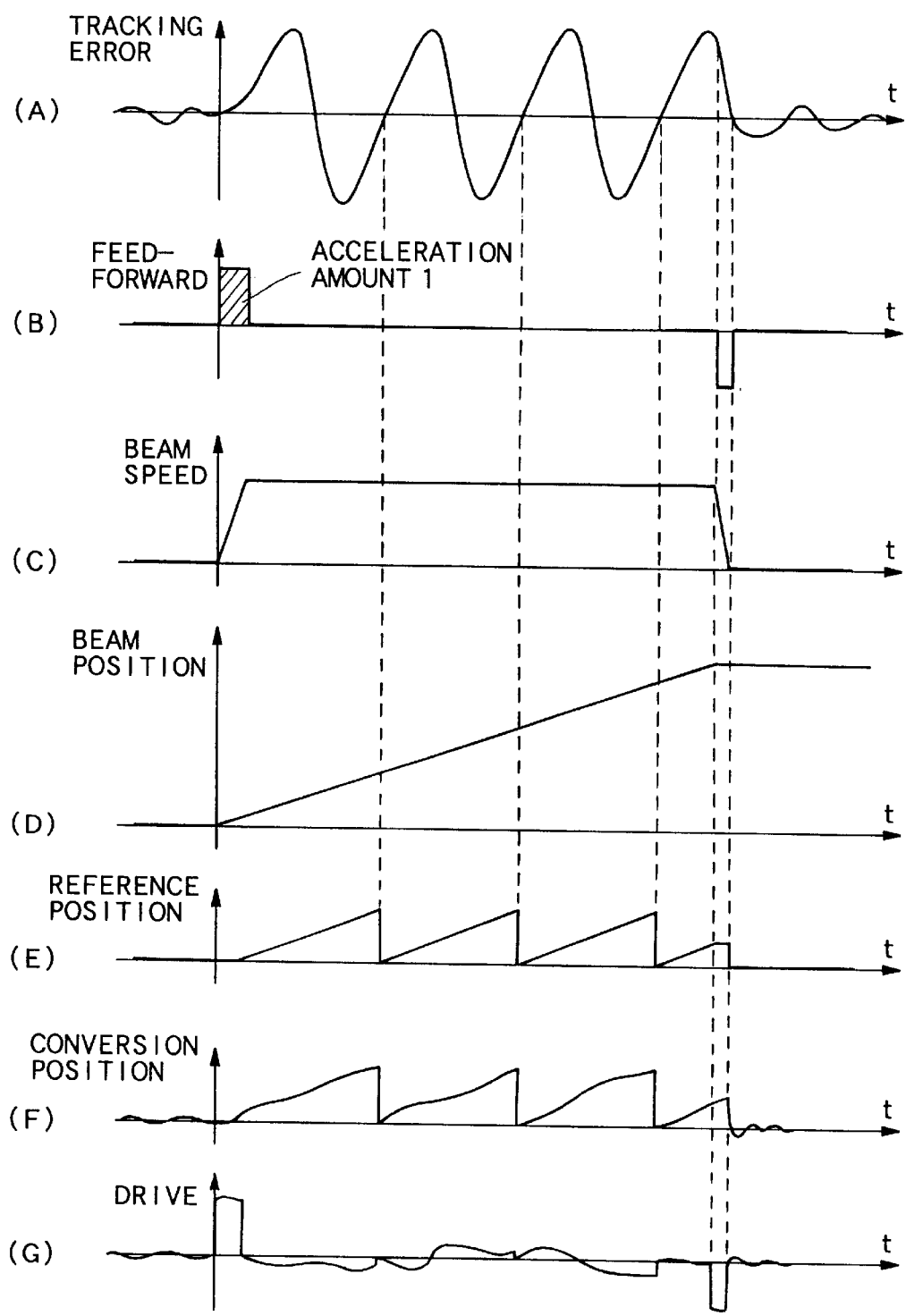
FIG. 52 is a diagram showing waveforms of various signals in the track jump apparatus of the sixth embodiment of the present invention, (A) is a waveform diagram of the tracking error signal, (B) is a waveform diagram of the feed forward output, (C) is a waveform diagram of a beam speed change, (D) is a waveform diagram of a beam position change, (E) is a waveform diagram of the reference position, (F) is a waveform diagram of the linearization position output, and (G) is a waveform diagram of a drive signal to be supplied to a driver of an actuator.

FIG. 52 shows a case in which track jump is executed to an object track apart by 3.5 tracks using the track jump apparatus of this embodiment. Meanwhile, 0.5 track means a half track. In this example, as shown in FIG. 52(E), the reference position is reset each on-track of a single track and as shown in FIG. 52(F), the linearization position output is reset each on-track of a single track.

Because the single track jump from a groove track to the other groove track or from a land track to the other land track can be carried out in the same condition as that indicated for the first embodiment, a stabilized, high precision multi-track jump can be executed using the reference position shown in FIG. 52(E). Then, for the last half track, as shown in FIG. 52(E), a shorter reference position than the other reference position is used, so that an object track apart by 3.5 tracks can be reached at a high precision.

Modification Example

In a track jump from a current land track to a groove track apart by multiple tracks or a track jump from a current groove track to a land track apart by multiple tracks, if the total number of the tracks is large, it is permissible to use the frequency control and reference jump at the same time.

Figure 53:
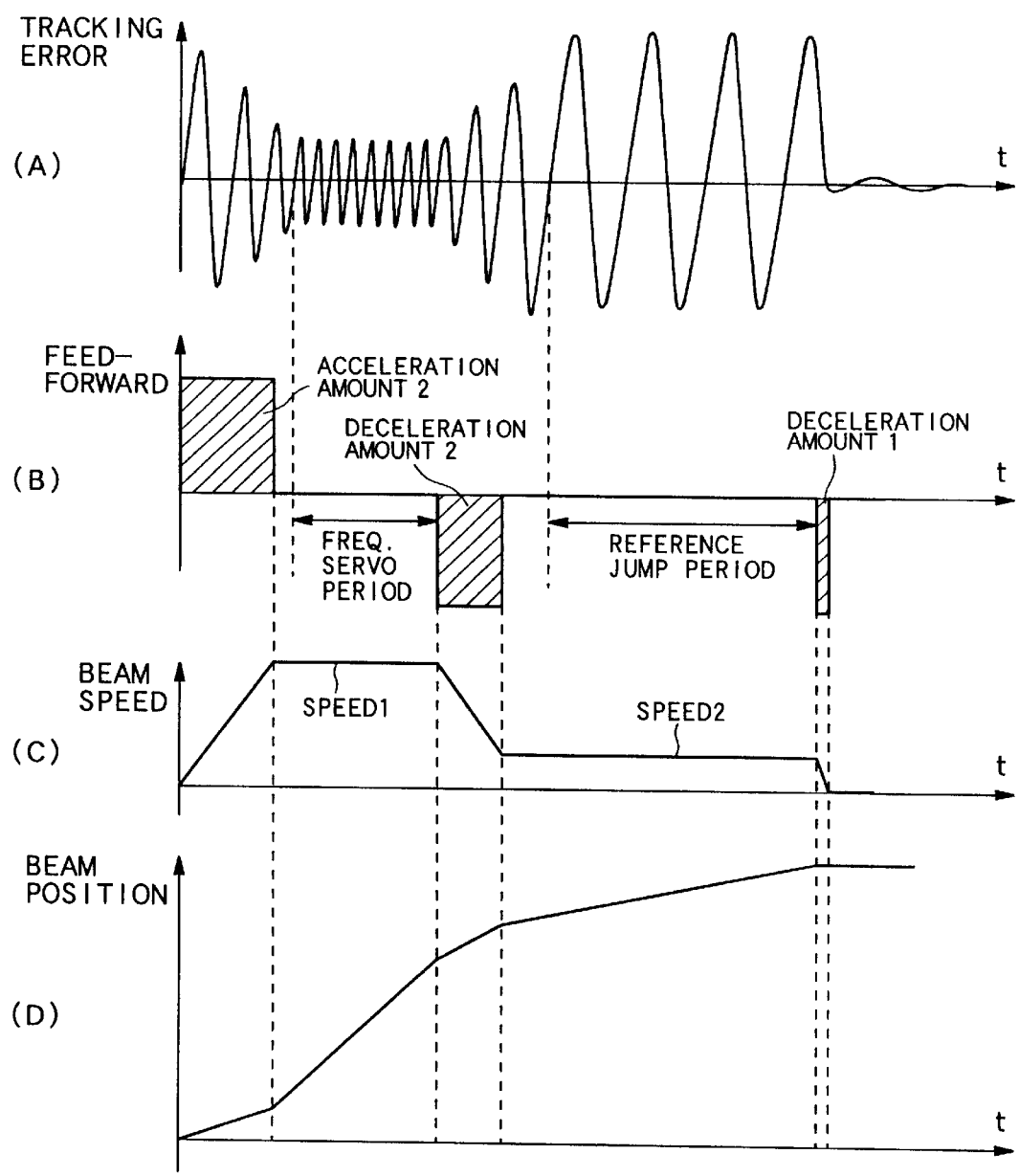
FIG. 53 is a diagram showing waveforms of various signals in the track jump apparatus of the sixth embodiment, (A) is a waveform diagram of the tracking error signal, (B) is a waveform diagram of the feed forward output, (C) is a waveform diagram of a speed change and (D) is a waveform diagram of a beam position.

FIG. 53 shows an example in which a track apart by 17.5 tracks from a current track is an object track. The frequency control and feed forward control are used up to the thirteenth track and the reference jump is used for remaining 3.5 tracks.

With such a structure, even if a half track jump is executed from a current track to a track apart by multiple tracks, a stabilized, high precision track jump can be executed and further the jump time can be reduced.

Because in case of half track jump like the fifth embodiment and sixth embodiment, control based on the tracking error signal is carried out, when a deflection occurs in the tracking error signal, it is desirable to provide a gain/offset controller as shown in FIG. 27 between the linearization converter portion and tracking error signal detecting portion.

In the fifth and sixth embodiments, a case in which a disk in which land/groove recording is made is used as a recording medium has been described and it is so constructed that even if an ordinary disk used in the first-fourth embodiment is used, reference position and linearization position output can be outputted with the reference position generator and linearization converter used in those embodiments. Depending on a recording medium for use, the reference position and linearization position output are selected appropriately and outputted. An ordinary disk is controlled by the method described about the first-fourth embodiments and a disk in which land/groove recording is made is controlled according to the fifth embodiment or sixth embodiment. As a result, single track jump and multi-track jump on ordinary DVD, single track jump or multi-track jump from land track to the other land track or from groove track to the other groove track on a land/groove disk, further a half track jump on the land/groove disk and multi-track jump with a half track jump can be controlled appropriately.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-308081 filed on Oct. 29, 1998 including the specification, claims, drawings and summary is incorporated herein by reference in its entirety.

What is claimed is:

1. A track jump apparatus for making an actuator jump in order to move a spot position of a laser beam emitted through an objective lens of the actuator from a current position to an object position corresponding to a desired recording track on a recording medium, the track jump apparatus comprising:

an actuator driving device that moves the actuator in accordance with a driving signal;

a tracking error signal detecting device that detects a tracking error signal on the basis of a change of return light from the recording medium caused by a change of the spot position of the laser beam relative to the recording track;

a feed-forward control device that applies an acceleration pulse and a deceleration pulse to the actuator driving device; and a position control device that controls a position of the actuator using a feedback of the driving signal so as to reduce a difference between an object value and the tracking error signal detected by the tracking error signal detecting device, when making the actuator jump in order to move the spot position of the laser beam from the current position to the object position, wherein the feed-forward control device sets a constant speed period during which neither of the acceleration pulse and the deceleration pulse is applied to the actuator driving device between an acceleration period during which the acceleration pulse is applied to the actuator driving device and a deceleration period during which the deceleration pulse is applied to the actuator driving device.

2. The track jump apparatus according to claim 1, wherein the constant speed period is longer than the acceleration period and is longer than the deceleration period.

3. The track jump apparatus according to claim 1, wherein the feed-forward control device executes application of the acceleration pulse, and then executes a non-pulse operation that application of the acceleration pulse and application of the deceleration pulse are suspended during a predetermined period, and then executes application of the deceleration pulse.

4. The track jump apparatus according to claim 1, wherein the feed-forward control device executes application of the acceleration pulse, and then executes a non-pulse operation that application of the acceleration pulse and application of the deceleration pulse are suspended during a predetermined period, and then executes application of the deceleration pulse, and then alternately repeats the non-pulse operation and the application of the deceleration pulse in this order.

5. The track jump apparatus according to claim 1, wherein the feed-forward control device executes application of the acceleration pulse, and then executes a non-pulse operation that application of the acceleration pulse and application of the deceleration pulse are suspended during a predetermined period, and then alternately repeats application of the acceleration pulse and the non-pulse operation in this order, and then executes application of the deceleration pulse.

6. The track jump apparatus according to claim 1, wherein the feed-forward control device has a plurality of application patterns of the acceleration pulse and a plurality of application patterns of the deceleration pulse, and selects one of the plurality of application patterns of the acceleration pulse and one of the plurality of application patterns of the deceleration pulse depending on a distance that the actuator jumps.

7. The track jump apparatus according to claim 1, wherein the feed-forward control device comprises: a profile setting device that sets a profile which represents a change of a position of the actuator as time passes; and a feed-forward compensation device that includes a second order differentiator and that uses the profile set by the profile setting device as an internal object value, the profile includes a acceleration part representing the change of the position of the actuator when a movement of the actuator is accelerated, a constant speed part representing the change of the position of the actuator when a speed of the movement of the actuator is constant, and a deceleration part representing the change of the position of the actuator when the movement of the actuator is decelerated, the constant speed part is located between the acceleration part and the deceleration part, and the feed-forward compensation device carries out a second order differential to the profile to apply the acceleration pulse and the deceleration pulse.

8. The track jump apparatus according to claim 1 further comprising:

a linearization conversion device that carries out a linearization conversion to the tracking error signal; and a reference position setting device that sets, as the object value, a reference position representing a change of a position of the actuator as time passes, wherein the position control device controls the driving signal so as to reduce a difference between an output value obtained from the linearization conversion device and the reference position.

9. The track jump apparatus according to claim 7 further comprising a linearization conversion device that carries out a linearization conversion to the tracking error signal, wherein the position control device uses the profile as the object value, and controls the driving signal so as to reduce a difference between an output value obtained from the linearization conversion device and the object value.

10. The track jump apparatus according to claim 9 further comprising a determining device that determines at least whether a value of the tracking error signal increases or decreases, wherein the linearization conversion device includes a first conversion table used when the value of the tracking error signal increases and a second conversion table used when the value of the tracking error signal decreases, and the linearization conversion device selects one of the first conversion table and the second conversion table depending on whether the tracking error signal increases or decreases.

11. The track jump apparatus according to claim 9 further comprising:

a first determining device that determines at least whether a value of the tracking error signal increases or decreases; and a second determining device that determines a detection method of the tracking error signal, wherein the linearization conversion device includes a plurality of first conversion tables used when the value of the tracking error signal increases and a plurality of second conversion tables used when the value of the tracking error signal decreases, and the linearization conversion device selects a conversion table from among the plurality of first conversion tables and the plurality of second conversion tables depending on the detection method and depending on whether the traking error signal increases or decreases.

12. The track jump apparatus according to claim 10, wherein the determining device further determines whether the value of the tracking error signal is a positive value or a negative value, when determining that the value of the tracking error signal increases.

13. The track jump apparatus according to claim 10, wherein the determining device detects a timing at which the value of the tracking error signal reaches a peak value of the tracking error signal, and determines on the basis of the detected timing whether the value of the tracking error signal increases or decreases.

14. The track jump apparatus according to claim 10, wherein the determining device detects a total amount of the return light obtained from the recording medium, and determines on the basis of the detected total amount whether the value of the tracking error signal increases or decreases.

15. The track jump apparatus according to claim 11, wherein the first determining device further determines whether the value of the tracking error signal is a positive value or a negative value, when determining that the value of the tracking error signal increases.

16. The track jump apparatus according to claim 11, wherein the first determining device detects a timing at which the value of the tracking error signal reaches a peak value of the tracking error signal, and determines on the basis of the detected timing whether the value of the tracking error signal increases or decreases.

17. The track jump apparatus according to claim 11, wherein the first determining device detects a total amount of the return light obtained from the recording medium, and determines on the basis of the detected total amount whether the value of the tracking error signal increases or decreases.

18. The track jump apparatus according to claim 9, wherein, in a case where the recording track corresponding to the current position and the recording track corresponding to the object position are adjacent to each other, the profile including the acceleration part, the constant speed part and the deceleration part is used.

19. The track jump apparatus according to claim 9, wherein, in a case where there is one or more than one recording track between the recording track corresponding to the current position and the recording track corresponding to the object position, the profile including the acceleration part, the constant speed part and the deceleration part is used, and the object value and the output value obtained from the linearization conversion device are replaced with initial values at a timing that the spot position of the laser beam matches an on-track position of the recording track when the spot position traverses the recording track, and wherein the initial values are values used as the object value and the output value when the actuator starts to jump.

20. The track jump apparatus according to claim 19, wherein the object value and the output value are replaced with the initial values each time the spot position of the laser beam traverses the recording track.

21. The track jump apparatus according to claim 19, wherein the object value and the output value are replaced with the initial values when the spot position of the laser beam traverses a predetermined number of the recording tracks.

22. The track jump apparatus according to claim 9, wherein, in a case where there is one or more than one recording track between the recording track corresponding to the current position and the recording track corresponding to the object position, the profile including the acceleration part, the constant speed part and the deceleration part is used, and the object value and the output value obtained from the linearization conversion device are replaced with initial values at a timing that the spot position of the laser beam matches a middle position of the recording tracks adjacent to each other when the spot position traverses the recording tracks, and wherein the initial values are values used as the object value and the output value when the actuator starts to jump.

23. The track jump apparatus according to claim 1 further comprising a speed control device that controls a speed of a movement of the actuator using the feedback of the driving signal so as to reduce a difference between a zero cross frequency of the tracking error signal and an object frequency.

24. The track jump apparatus according to claim 23, wherein, when a number of the recording tracks between the recording track corresponding to the current position and the recording track corresponding to the object position is not greater than a predetermined number, only a control of the position of the actuator with the position control device is carried out, and when the number of the recording tracks between the recording track corresponding to the current position and the recording track corresponding to the object position is greater than the predetermined number, a control of the speed of the movement of the actuator with the speed control device and the control of the position of the actuator with the position control device are carried out.

25. The track jump apparatus according to claim 23, wherein the speed of the movement of the actuator when a control of the speed control device is carried out is faster than the speed of the movement of the actuator when a control of the position control device is carried out.

26. The track jump apparatus according to claim 23, wherein a control of the speed of the movement of the actuator with the speed control device is carried out during the constant speed period, and a control of the position of the actuator with the position control device is carried out during the deceleration period or until the spot position of the laser beam matches an on-track position corresponding to the object position after the deceleration of the movement of the actuator is finished.

27. The track jump apparatus according to claim 23 further comprising a tracking servo control device that controls the position of the actuator using the feedback of the driving signal so as to set a value of the tracking error signal at zero after a jump of the actuator is finished,
wherein the speed control device includes a first phase compensation device, the position control device includes a second phase compensation device, and the tracking servo control device includes a third phase compensation device.

28. The track jump apparatus according to claim 27, wherein the second phase compensation device receives an integration term of the first phase compensation device when shifting from a control of the speed control device to a control of the position control device, and
the third phase compensation device receives an integration term of the second phase compensation device when shifting from the control of the position control device to a control of the tracking servo control device.

29. The track jump apparatus according to claim 27, wherein the position control device receives an integration term of a drive amount from the speed control device when shifting from a control of the speed control device to a control of the position control device, and
the tracking servo control device receives the integration term of the drive amount from the position control device when shifting from the control of the position control device to a control of the tracking servo control device.

30. The track jump apparatus according to claim 27, wherein the position control device receives information representing a number of the recording tracks that the actuator jumps from the speed control device when shifting from a control of the speed control device to a control of the position control device, and
the tracking servo control device receives the information representing the number of the recording tracks that the actuator jumps from the position control device when shifting from the control of the position control device to a control of the tracking servo control device.

31. The track jump apparatus according to claim 27, wherein, in a case where a control of the speed control device, a control of the position control device and a control of the tracking servo control device are sequentially carried out, an integration term used in a previous control or an integrated drive amount is added as an offset in a feed-forward manner during the control of the position control device or during an open control period during which acceleration or deceleration of a movement of the actuator is executed under a feed-forward control.

32. The track jump apparatus according to claim 1, wherein, in a case where the recording medium has a land track and a groove track and information is recorded onto the land track and the groove track, the position control device uses a half wave of the tracking error signal to move the spot position of the laser beam from the land track to the groove track or from the groove track to the land track.

33. The track jump apparatus according to claim 10, wherein, in a case where the recording medium has a land track and a groove track and information is recorded onto the land track and the groove track, the position control device uses a half wave of the tracking error signal to move the spot position of the laser beam from the land track to the groove track or from the groove track to the land track.

34. The track jump apparatus according to claim 33, wherein the determining device determines on the basis of a differential of the tracking error signal whether the value of the tracking error signal increases or decreases.

35. The track jump apparatus according to claim 11, wherein, in a case where the recording medium has a land track and a groove track and information is recorded onto the land track and the groove track, the position control device uses a half wave of the tracking error signal to move the spot position of the laser beam from the land track to the groove track or from the groove track to the land track.

36. The track jump apparatus according to claim 35, wherein the first determining device determines on the basis of a differential of the tracking error signal whether the value of the tracking error signal increases or decreases.

37. The track jump apparatus according to claim 1 further comprising:

a gain control device that adjusts a gain of the tracking error signal; and an offset control device that adjusts an offset of the tracking error signal.

* * * * *